US008130306B2

(12) United States Patent
Kitaura

(10) Patent No.: US 8,130,306 B2
(45) Date of Patent: Mar. 6, 2012

(54) ELECTRONIC APPLIANCE USING VIDEO CAMERA RESPONSIVE TO DETECTED MOTION OF AN OPERATOR WITHIN DETECTION ZONES WHEN THE MOTION EXCEEDS A THRESHOLD

(75) Inventor: Masahiro Kitaura, Kanagawa-ken (JP)

(73) Assignee: Victor Company of Japan, Limited, Yokohama (JP)

( * ) Notice: Subject to any disclaimer, the term of this patent is extended or adjusted under 35 U.S.C. 154(b) by 1482 days.

(21) Appl. No.: 11/638,489

(22) Filed: Dec. 14, 2006

(65) Prior Publication Data

US 2007/0132725 A1 Jun. 14, 2007

(30) Foreign Application Priority Data

Dec. 14, 2005 (JP) ................................ P2005-360131
Nov. 1, 2006 (JP) ................................ P2006-297432

(51) Int. Cl.

| | |
|---|---|
| *H04N 7/18* | (2006.01) |
| *H04N 3/14* | (2006.01) |
| *H04N 5/335* | (2011.01) |
| *H04N 7/01* | (2006.01) |
| *H04N 11/20* | (2006.01) |
| *H04N 5/14* | (2006.01) |
| *H04N 9/64* | (2006.01) |

(52) U.S. Cl. ......... 348/312; 348/452; 348/700; 348/155

(58) Field of Classification Search ........................ None
See application file for complete search history.

(56) References Cited

U.S. PATENT DOCUMENTS 4,853,782 A * 8/1989 Asano et al. .................. 348/695
(Continued)

FOREIGN PATENT DOCUMENTS

JP 11-338614 12/1999
(Continued)

*Primary Examiner* — David England
(74) *Attorney, Agent, or Firm* — The Nath Law Group; Jerald L. Meyer; Stanley N. Protigal

(57) ABSTRACT

An electronic appliance includes a display. A screen of the display on which an image from a video camera is displayed is divided horizontally by N and vertically by M, to define a plurality of detection zones. A detection unit of the electronic appliance includes detectors assigned to the detection zones, respectively. In response to a motion conducted by an operator, the detectors generate first detection signals. From the first detection signals, a signal generator of the electronic appliance generates second detection signals. Each of the second detection signals is accumulated. If any one of the cumulative values exceeds a threshold, a flag is set. A plurality of detectors including the detector related to the flag-set cumulative value are chosen to receive timing pulses from a timing pulse generator.

5 Claims, 38 Drawing Sheets

U.S. PATENT DOCUMENTS

| | | | | |
|---|---|---|---|---|
| 5,005,040 | A * | 4/1991 | Norita et al. | 396/96 |
| 5,049,731 | A * | 9/1991 | Ishida et al. | 250/201.2 |
| 5,130,735 | A * | 7/1992 | Kusaka et al. | 396/104 |
| 5,235,428 | A * | 8/1993 | Hirota et al. | 348/355 |
| 5,581,309 | A * | 12/1996 | Okino et al. | 348/699 |
| 5,671,447 | A * | 9/1997 | Tokunaga | 396/51 |
| 6,005,612 | A * | 12/1999 | Kikuchi et al. | 348/222.1 |
| 6,160,900 | A * | 12/2000 | Miyawaki et al. | 382/107 |
| 6,208,385 | B1 * | 3/2001 | Konishi et al. | 348/558 |
| 6,677,887 | B2 * | 1/2004 | Harman | 342/28 |
| 6,704,057 | B1 * | 3/2004 | Ueda | 348/460 |
| 6,819,360 | B1 * | 11/2004 | Ide et al. | 348/340 |
| 6,876,618 | B2 * | 4/2005 | Tonami et al. | 369/59.21 |
| 6,879,321 | B2 * | 4/2005 | Santou | 345/213 |
| 7,136,581 | B2 * | 11/2006 | Fujii | 396/54 |
| 7,629,959 | B2 * | 12/2009 | Kitaura | 345/156 |
| 7,733,956 | B1 * | 6/2010 | Kalra et al. | 375/240.1 |
| 7,894,527 | B2 * | 2/2011 | Paniconi et al. | 375/240.16 |
| 2001/0004810 | A1 * | 6/2001 | Tasaki | 40/1 |
| 2002/0047922 | A1 * | 4/2002 | Minami et al. | 348/500 |
| 2002/0060639 | A1 * | 5/2002 | Harman | 342/28 |
| 2002/0087934 | A1 * | 7/2002 | Kondo et al. | 714/764 |
| 2003/0095182 | A1 * | 5/2003 | Imoto | 348/148 |
| 2004/0227817 | A1 * | 11/2004 | Oya et al. | 348/155 |
| 2005/0013599 | A1 * | 1/2005 | Nakanishi et al. | 396/2 |
| 2005/0031325 | A1 * | 2/2005 | Fujii | 396/54 |
| 2006/0061548 | A1 * | 3/2006 | Kitaura | 345/156 |
| 2006/0152607 | A1 * | 7/2006 | Noguchi | 348/248 |
| 2006/0256224 | A1 * | 11/2006 | Kitaura | 348/333.01 |
| 2007/0064140 | A1 * | 3/2007 | Kitaura | 348/333.01 |
| 2007/0132725 | A1 * | 6/2007 | Kitaura | 345/156 |
| 2008/0088588 | A1 * | 4/2008 | Kitaura | 345/158 |
| 2008/0151103 | A1 * | 6/2008 | Asamura et al. | 348/448 |

FOREIGN PATENT DOCUMENTS

| | | |
|---|---|---|
| JP | 2003-283866 | 10/2003 |
| JP | 2006-091948 | 4/2006 |

* cited by examiner

FIG. 18

| | CYCLE | 1 | 1 | 1 | 1 | 1 | 1 | 1 | 1 | 2 | 2 | 2 | 2 | 2 | 2 | 2 | 2 | |
|---|---|---|---|---|---|---|---|---|---|---|---|---|---|---|---|---|---|---|
| | n | 0 | 1 | 2 | 3 | 4 | 5 | 6 | 7 | 8 | 9 | 10 | 11 | 12 | 13 | 14 | 15 | |
| | Ph | A | B | C | D | D | C | B | A | A | B | C | D | D | C | B | A | |
| | x(7) | 0 | 0 | 0 | 0 | 0 | 0 | 0 | 0 | 0 | 0 | 0 | 0 | 0 | 0 | 0 | 0 | |
| | x(6) | 12 | 12 | 12 | 12 | 12 | 12 | 12 | 12 | 12 | 12 | 12 | 12 | 12 | 12 | 12 | 12 | |
| MAX | x(5) | 120 | 120 | 120 | 120 | 120 | 120 | 120 | 120 | 120 | 120 | 120 | 120 | 120 | 120 | 120 | 120 | MAX |
| | x(4) | 12 | 12 | 12 | 12 | 12 | 12 | 12 | 12 | 12 | 12 | 12 | 12 | 12 | 12 | 12 | 12 | |
| | x(3) | 0 | 0 | 0 | 0 | 0 | 0 | 0 | 0 | 0 | 0 | 0 | 0 | 0 | 0 | 0 | 0 | |
| | x(2) | 0 | 0 | 0 | 0 | 0 | 0 | 0 | 0 | 0 | 0 | 0 | 0 | 0 | 0 | 0 | 0 | |
| | x(1) | 0 | 0 | 0 | 0 | 0 | 0 | 0 | 0 | 0 | 0 | 0 | 100 | 0 | 0 | 0 | 0 | |
| | x(0) | 0 | 0 | 0 | 0 | 0 | 0 | 0 | 0 | 0 | 0 | 0 | 0 | 0 | 0 | 0 | 0 | |
| | x(-1) | 0 | 0 | 0 | 0 | 0 | 0 | 0 | 0 | 0 | 0 | 0 | 0 | 0 | 0 | 0 | 0 | |
| | x(-2) | 0 | 0 | 0 | 0 | 0 | 0 | 0 | 0 | 0 | 0 | 0 | 0 | 0 | 0 | 0 | 0 | |
| | x(-3) | 0 | 0 | 0 | 0 | 0 | 0 | 0 | 0 | 0 | 0 | 0 | 0 | 0 | 0 | 0 | 0 | |
| | x(-4) | 0 | 0 | 0 | 0 | 0 | 0 | 0 | 0 | 0 | 0 | 0 | 0 | 0 | 0 | 0 | 0 | |
| | x(-5) | 0 | 0 | 0 | 0 | 0 | 0 | 0 | 0 | 0 | 0 | 0 | 0 | 0 | 0 | 0 | 0 | |
| | x(-6) | 0 | 0 | 0 | 0 | 0 | 0 | 0 | 0 | 0 | 0 | 0 | 0 | 0 | 0 | 0 | 0 | |
| | x(-7) | 0 | 0 | 0 | 0 | 0 | 0 | 0 | 0 | 0 | 0 | 0 | 0 | 0 | 0 | 0 | 0 | |
| | x(-8) | 0 | 0 | 0 | 0 | 0 | 0 | 0 | 0 | 0 | 0 | 0 | 0 | 0 | 0 | 0 | 0 | |
| | XVS | 144 | 144 | 144 | 144 | 144 | 144 | 144 | 144 | 144 | 144 | 144 | 244 | 144 | 144 | 144 | 144 | |
| | XVSG | 720 | 720 | 720 | 720 | 720 | 720 | 720 | 720 | 720 | 720 | 720 | 820 | 720 | 720 | 720 | 720 | |
| | XG | 5 | 5 | 5 | 5 | 5 | 5 | 5 | 5 | 5 | 5 | 5 | 3.361 | 5 | 5 | 5 | 5 | |
| | y(4) | 0 | 0 | 0 | 0 | 0 | 0 | 0 | 0 | 0 | 0 | 0 | 0 | 0 | 0 | 0 | 0 | |
| | y(3) | 72 | 0 | 0 | 0 | 0 | 0 | 0 | 72 | 72 | 0 | 0 | 0 | 0 | 0 | 0 | 72 | |
| | y(2) | 72 | 72 | 0 | 0 | 0 | 0 | 72 | 72 | 72 | 72 | 0 | 0 | 0 | 0 | 72 | 72 | |
| | y(1) | 0 | 72 | 96 | 24 | 24 | 96 | 72 | 0 | 0 | 72 | 96 | 24 | 24 | 96 | 72 | 0 | |
| | y(0) | 0 | 0 | 48 | 96 | 96 | 48 | 0 | 0 | 0 | 0 | 48 | 96 | 96 | 48 | 0 | 0 | |
| | y(-1) | 0 | 0 | 0 | 24 | 24 | 0 | 0 | 0 | 0 | 0 | 0 | 24 | 24 | 0 | 0 | 0 | |
| | y(-2) | 0 | 0 | 0 | 0 | 0 | 0 | 0 | 0 | 0 | 0 | 0 | 50 | 0 | 0 | 0 | 0 | |
| | y(-3) | 0 | 0 | 0 | 0 | 0 | 0 | 0 | 0 | 0 | 0 | 0 | 50 | 0 | 0 | 0 | 0 | |
| | y(-4) | 0 | 0 | 0 | 0 | 0 | 0 | 0 | 0 | 0 | 0 | 0 | 0 | 0 | 0 | 0 | 0 | |
| | YVS | 144 | 144 | 144 | 144 | 144 | 144 | 144 | 144 | 144 | 144 | 144 | 244 | 144 | 144 | 144 | 144 | |
| | YVSG | 360 | 216 | 98 | 0 | 0 | 96 | 216 | 360 | 360 | 216 | 96 | -250 | 0 | 96 | 216 | 360 | |
| | YG | 2.5 | 1.5 | 0.667 | 0 | 0 | 0.667 | 1.5 | 2.5 | 2.5 | 1.5 | 0.667 | -1.02 | 0 | 0.667 | 1.5 | 2.5 | |

FIG. 24

| CYCLE | 1 | 1 | 1 | 1 | 1 | 1 | 1 | 1 | 2 | 2 | 2 | 2 | 2 | 2 | 2 | 2 |
|---|---|---|---|---|---|---|---|---|---|---|---|---|---|---|---|---|
| n | 0 | 1 | 2 | 3 | 4 | 5 | 6 | 7 | 8 | 9 | 10 | 11 | 12 | 13 | 14 | 15 |
| Ph | A | B | C | D | D | C | B | A | A | B | C | D | D | C | B | A |
| x(7) | 0 | 0 | 0 | 0 | 0 | 0 | 0 | 0 | 0 | 0 | 0 | 0 | 0 | 0 | 0 | 0 |
| x(6) | 12 | 12 | 12 | 12 | 12 | 12 | 12 | 12 | 12 | 12 | 12 | 12 | 12 | 12 | 12 | 12 |
| x(5) | 120 | 120 | 120 | 120 | 120 | 120 | 120 | 120 | 120 | 120 | 120 | 120 | 120 | 120 | 120 | 120 |
| x(4) | 12 | 12 | 12 | 12 | 12 | 12 | 12 | 12 | 12 | 12 | 12 | 12 | 12 | 12 | 12 | 12 |
| x(3) | 0 | 0 | 0 | 0 | 0 | 0 | 0 | 0 | 0 | 0 | 0 | 0 | 0 | 0 | 0 | 0 |
| x(2) | 0 | 0 | 0 | 0 | 0 | 0 | 0 | 0 | 0 | 0 | 0 | 0 | 0 | 0 | 0 | 0 |
| x(1) | 0 | 0 | 0 | 0 | 0 | 0 | 0 | 0 | 0 | 0 | 0 | 0 | 0 | 0 | 0 | 0 |
| x(0) | 0 | 0 | 0 | 0 | 0 | 0 | 0 | 0 | 0 | 0 | 0 | 0 | 0 | 0 | 0 | 0 |
| x(-1) | 0 | 0 | 0 | 0 | 0 | 0 | 0 | 0 | 0 | 0 | 0 | 0 | 0 | 0 | 0 | 0 |
| x(-2) | 0 | 0 | 0 | 0 | 0 | 0 | 0 | 0 | 0 | 0 | 0 | 0 | 0 | 0 | 0 | 0 |
| x(-3) | 0 | 0 | 0 | 0 | 0 | 0 | 0 | 0 | 0 | 0 | 0 | 0 | 0 | 0 | 0 | 0 |
| x(-4) | 0 | 0 | 0 | 0 | 0 | 0 | 0 | 0 | 0 | 0 | 0 | 0 | 0 | 0 | 0 | 0 |
| x(-5) | 0 | 0 | 0 | 0 | 0 | 0 | 0 | 0 | 0 | 0 | 0 | 0 | 0 | 0 | 0 | 0 |
| x(-6) | 0 | 0 | 0 | 0 | 0 | 0 | 0 | 0 | 0 | 0 | 0 | 0 | 0 | 0 | 0 | 0 |
| x(-7) | 0 | 0 | 0 | 0 | 0 | 0 | 0 | 0 | 0 | 0 | 0 | 0 | 0 | 0 | 0 | 0 |
| x(-8) | 0 | 0 | 0 | 0 | 0 | 0 | 0 | 0 | 0 | 0 | 0 | 0 | 0 | 0 | 0 | 0 |
| XVS | 144 | 144 | 144 | 144 | 144 | 144 | 144 | 144 | 144 | 144 | 144 | 144 | 144 | 144 | 144 | 144 |
| XVSG | 720 | 720 | 720 | 720 | 720 | 720 | 720 | 720 | 720 | 720 | 720 | 720 | 720 | 720 | 720 | 720 |
| XG | 5 | 5 | 5 | 5 | 5 | 5 | 5 | 5 | 5 | 5 | 5 | 5 | 5 | 5 | 5 | 5 |
| y(4) | 0 | 0 | 0 | 0 | 0 | 0 | 0 | 0 | 0 | 0 | 0 | 0 | 0 | 0 | 0 | 0 |
| y(3) | 72 | 0 | 0 | 0 | 0 | 0 | 0 | 72 | 72 | 0 | 0 | 0 | 0 | 0 | 0 | 72 |
| y(2) | 72 | 72 | 0 | 0 | 0 | 0 | 72 | 72 | 72 | 72 | 0 | 0 | 0 | 0 | 72 | 72 |
| y(1) | 0 | 72 | 96 | 24 | 24 | 96 | 72 | 0 | 0 | 72 | 96 | 24 | 24 | 96 | 72 | 0 |
| y(0) | 0 | 0 | 48 | 96 | 96 | 48 | 0 | 0 | 0 | 0 | 48 | 96 | 96 | 48 | 0 | 0 |
| y(-1) | 0 | 0 | 0 | 24 | 24 | 0 | 0 | 0 | 0 | 0 | 0 | 24 | 24 | 0 | 0 | 0 |
| y(-2) | 0 | 0 | 0 | 0 | 0 | 0 | 0 | 0 | 0 | 0 | 0 | 0 | 0 | 0 | 0 | 0 |
| y(-3) | 0 | 0 | 0 | 0 | 0 | 0 | 0 | 0 | 0 | 0 | 0 | 0 | 0 | 0 | 0 | 0 |
| y(-4) | 0 | 0 | 0 | 0 | 0 | 0 | 0 | 0 | 0 | 0 | 0 | 0 | 0 | 0 | 0 | 0 |
| YVS | 144 | 144 | 144 | 144 | 144 | 144 | 144 | 144 | 144 | 144 | 144 | 144 | 144 | 144 | 144 | 144 |
| YVSG | 360 | 216 | 96 | 0 | 0 | 96 | 216 | 360 | 360 | 216 | 96 | 0 | 0 | 96 | 216 | 360 |
| YG | 2.5 | 1.5 | 0.667 | 0 | 0 | 0.667 | 1.5 | 2.5 | 2.5 | 1.5 | 0.667 | 0 | 0 | 0.667 | 1.5 | 2.5 |

FIG. 28

| CYCLE | 1 | 1 | 1 | 1 | 1 | 1 | 1 | 1 | 2 | 2 | 2 | 2 | 2 | 2 | 2 | 2 |
|---|---|---|---|---|---|---|---|---|---|---|---|---|---|---|---|---|
| n | 0 | 1 | 2 | 3 | 4 | 5 | 6 | 7 | 8 | 9 | 10 | 11 | 12 | 13 | 14 | 15 |
| Ph | 0 | 1 | 2 | 3 | 3 | 2 | 1 | 0 | 0 | 1 | 2 | 3 | 3 | 2 | 1 | 0 |
| x(7) | 0 | 0 | 0 | 0 | 0 | 0 | 0 | 0 | 0 | 0 | 0 | 70 | 0 | 0 | 0 | 0 |
| x(6) | 0 | 0 | 0 | 0 | 0 | 0 | 0 | 0 | 0 | 0 | 0 | 0 | 0 | 0 | 0 | 0 |
| x(5) | 0 | 0 | 0 | 0 | 0 | 0 | 0 | 0 | 0 | 0 | 0 | 0 | 0 | 0 | 0 | 0 |
| x(4) | 0 | 0 | 0 | 0 | 0 | 0 | 0 | 0 | 0 | 0 | 0 | 50 | 0 | 0 | 0 | 0 |
| x(3) | 0 | 0 | 0 | 0 | 0 | 0 | 0 | 0 | 0 | 0 | 0 | 0 | 0 | 0 | 0 | 0 |
| x(2) | 0 | 0 | 0 | 0 | 0 | 0 | 0 | 0 | 0 | 0 | 0 | 0 | 0 | 0 | 0 | 0 |
| x(1) | 0 | 0 | 0 | 0 | 0 | 0 | 0 | 0 | 0 | 0 | 0 | 0 | 0 | 0 | 0 | 0 |
| x(0) | 0 | 0 | 0 | 0 | 0 | 0 | 0 | 0 | 0 | 0 | 0 | 0 | 0 | 0 | 0 | 0 |
| x(-1) | 0 | 0 | 0 | 33 | 33 | 0 | 0 | 0 | 0 | 0 | 0 | 33 | 33 | 0 | 0 | 0 |
| x(-2) | 0 | 0 | 33 | 168 | 168 | 33 | 0 | 0 | 0 | 0 | 33 | 168 | 168 | 33 | 0 | 0 |
| x(-3) | 0 | 33 | 168 | 135 | 135 | 168 | 33 | 0 | 0 | 33 | 168 | 135 | 135 | 168 | 33 | 0 |
| x(-4) | 33 | 168 | 135 | 0 | 0 | 135 | 168 | 33 | 33 | 168 | 135 | 0 | 0 | 135 | 168 | 33 |
| x(-5) | 168 | 135 | 0 | 0 | 0 | 0 | 135 | 168 | 168 | 135 | 0 | 0 | 0 | 0 | 135 | 168 |
| x(-6) | 135 | 0 | 0 | 0 | 0 | 0 | 0 | 135 | 135 | 0 | 0 | 0 | 0 | 0 | 0 | 135 |
| x(-7) | 0 | 0 | 0 | 0 | 0 | 0 | 0 | 0 | 0 | 0 | 0 | 0 | 0 | 0 | 0 | 0 |
| x(-8) | 0 | 0 | 0 | 0 | 0 | 0 | 0 | 0 | 0 | 0 | 0 | 0 | 0 | 0 | 0 | 0 |
| XVS | 336 | 336 | 336 | 336 | 336 | 336 | 336 | 336 | 336 | 336 | 336 | 456 | 336 | 336 | 336 | 336 |
| XVSG | -1782 | -1446 | -1110 | -774 | -774 | -1110 | -1446 | -1782 | -1782 | -1446 | -1110 | -204 | -774 | -1110 | -1446 | -1782 |
| XG | -5.3 | -4.3 | -3.3 | -2.3 | -2.3 | -3.3 | -4.3 | -5.3 | -5.3 | -4.3 | -3.3 | -0.45 | -2.3 | -3.3 | -4.3 | -5.3 |
| y(4) | 0 | 0 | 0 | 0 | 0 | 0 | 0 | 0 | 0 | 0 | 0 | 0 | 0 | 0 | 0 | 0 |
| y(3) | 100 | 100 | 100 | 100 | 100 | 100 | 100 | 100 | 100 | 100 | 100 | 100 | 100 | 100 | 100 | 100 |
| y(2) | 200 | 200 | 200 | 200 | 200 | 200 | 200 | 200 | 200 | 200 | 200 | 200 | 200 | 200 | 200 | 200 |
| y(1) | 36 | 36 | 36 | 36 | 36 | 36 | 36 | 36 | 36 | 36 | 36 | 36 | 36 | 36 | 36 | 36 |
| y(0) | 0 | 0 | 0 | 0 | 0 | 0 | 0 | 0 | 0 | 0 | 0 | 0 | 0 | 0 | 0 | 0 |
| y(-1) | 0 | 0 | 0 | 0 | 0 | 0 | 0 | 0 | 0 | 0 | 0 | 120 | 0 | 0 | 0 | 0 |
| y(-2) | 0 | 0 | 0 | 0 | 0 | 0 | 0 | 0 | 0 | 0 | 0 | 0 | 0 | 0 | 0 | 0 |
| y(-3) | 0 | 0 | 0 | 0 | 0 | 0 | 0 | 0 | 0 | 0 | 0 | 0 | 0 | 0 | 0 | 0 |
| y(-4) | 0 | 0 | 0 | 0 | 0 | 0 | 0 | 0 | 0 | 0 | 0 | 0 | 0 | 0 | 0 | 0 |
| YVS | 336 | 336 | 336 | 336 | 336 | 336 | 336 | 336 | 336 | 336 | 336 | 456 | 336 | 336 | 336 | 336 |
| YVSG | 736 | 736 | 736 | 736 | 736 | 736 | 736 | 736 | 736 | 736 | 736 | 616 | 736 | 736 | 736 | 736 |
| YG | 2.19 | 2.19 | 2.19 | 2.19 | 2.19 | 2.19 | 2.19 | 2.19 | 2.19 | 2.19 | 2.19 | 1.351 | 2.19 | 2.19 | 2.19 | 2.19 |

FIG. 33

| CYCLE | 1 | 1 | 1 | 1 | 1 | 1 | 1 | 1 | 2 | 2 | 2 | 2 | 2 | 2 | 2 | 2 |
|---|---|---|---|---|---|---|---|---|---|---|---|---|---|---|---|---|
| n | 0 | 1 | 2 | 3 | 4 | 5 | 6 | 7 | 8 | 9 | 10 | 11 | 12 | 13 | 14 | 15 |
| Ph | 0 | 1 | 2 | 3 | 3 | 2 | 1 | 0 | 0 | 1 | 2 | 3 | 3 | 2 | 1 | 0 |
| x(7) | 0 | 0 | 0 | 0 | 0 | 0 | 0 | 0 | 0 | 0 | 0 | 0 | 0 | 0 | 0 | 0 |
| x(6) | 0 | 0 | 0 | 0 | 0 | 0 | 0 | 0 | 0 | 0 | 0 | 0 | 0 | 0 | 0 | 0 |
| x(5) | 0 | 0 | 0 | 0 | 0 | 0 | 0 | 0 | 0 | 0 | 0 | 0 | 0 | 0 | 0 | 0 |
| x(4) | 0 | 0 | 0 | 0 | 0 | 0 | 0 | 0 | 0 | 0 | 0 | 0 | 0 | 0 | 0 | 0 |
| x(3) | 0 | 0 | 0 | 0 | 0 | 0 | 0 | 0 | 0 | 0 | 0 | 0 | 0 | 0 | 0 | 0 |
| x(2) | 0 | 0 | 0 | 100 | 0 | 0 | 0 | 0 | 0 | 0 | 0 | 0 | 0 | 0 | 0 | 0 |
| x(1) | 0 | 0 | 0 | 0 | 0 | 0 | 0 | 0 | 0 | 0 | 0 | 0 | 0 | 0 | 0 | 0 |
| x(0) | 0 | 0 | 0 | 0 | 0 | 0 | 0 | 0 | 0 | 0 | 0 | 0 | 0 | 0 | 0 | 0 |
| x(-1) | 0 | 0 | 0 | 33 | 33 | 0 | 0 | 0 | 0 | 0 | 0 | 33 | 33 | 0 | 0 | 0 |
| x(-2) | 0 | 0 | 33 | 168 | 168 | 33 | 0 | 0 | 0 | 0 | 33 | 168 | 168 | 33 | 0 | 0 |
| x(-3) | 0 | 33 | 168 | 135 | 135 | 168 | 33 | 0 | 0 | 33 | 168 | 135 | 135 | 168 | 33 | 0 |
| x(-4) | 33 | 168 | 135 | 0 | 0 | 135 | 168 | 33 | 33 | 168 | 135 | 0 | 0 | 135 | 168 | 33 |
| x(-5) | 168 | 135 | 0 | 0 | 0 | 0 | 135 | 168 | 168 | 135 | 0 | 0 | 0 | 0 | 135 | 168 |
| x(-6) | 135 | 0 | 0 | 0 | 0 | 0 | 0 | 135 | 135 | 0 | 0 | 0 | 0 | 0 | 0 | 135 |
| x(-7) | 0 | 0 | 0 | 0 | 0 | 0 | 0 | 0 | 0 | 0 | 0 | 0 | 0 | 0 | 0 | 0 |
| x(-8) | 0 | 0 | 0 | 0 | 0 | 0 | 0 | 0 | 0 | 0 | 0 | 0 | 0 | 0 | 0 | 0 |
| XVS | 336 | 336 | 336 | 436 | 336 | 336 | 336 | 336 | 336 | 336 | 336 | 336 | 336 | 336 | 336 | 336 |
| XVSG | -1782 | -1446 | -1110 | -574 | -774 | -1110 | -1446 | -1782 | -1782 | -1446 | -1110 | -774 | -774 | -1110 | -1446 | -1782 |
| XG | -5.3 | -4.3 | -3.3 | -1.32 | -2.3 | -3.3 | -4.3 | -5.3 | -5.3 | -4.3 | -3.3 | -2.3 | -2.3 | -3.3 | -4.3 | -5.3 |
| y(4) | 0 | 0 | 0 | 0 | 0 | 0 | 0 | 0 | 0 | 0 | 0 | 0 | 0 | 0 | 0 | 0 |
| y(3) | 100 | 100 | 100 | 100 | 100 | 100 | 100 | 100 | 100 | 100 | 100 | 100 | 100 | 100 | 100 | 100 |
| y(2) | 200 | 200 | 200 | 200 | 200 | 200 | 200 | 200 | 200 | 200 | 200 | 200 | 200 | 200 | 200 | 200 |
| y(1) | 36 | 36 | 36 | 36 | 36 | 36 | 36 | 36 | 36 | 36 | 36 | 36 | 36 | 36 | 36 | 36 |
| y(0) | 0 | 0 | 0 | 0 | 0 | 0 | 0 | 0 | 0 | 0 | 0 | 0 | 0 | 0 | 0 | 0 |
| y(-1) | 0 | 0 | 0 | 0 | 0 | 0 | 0 | 0 | 0 | 0 | 0 | 0 | 0 | 0 | 0 | 0 |
| y(-2) | 0 | 0 | 0 | 0 | 0 | 0 | 0 | 0 | 0 | 0 | 0 | 0 | 0 | 0 | 0 | 0 |
| y(-3) | 0 | 0 | 0 | 0 | 0 | 0 | 0 | 0 | 0 | 0 | 0 | 0 | 0 | 0 | 0 | 0 |
| y(-4) | 0 | 0 | 0 | 0 | 0 | 0 | 0 | 0 | 0 | 0 | 0 | 0 | 0 | 0 | 0 | 0 |
| YVS | 336 | 336 | 336 | 336 | 336 | 336 | 336 | 336 | 336 | 336 | 336 | 336 | 336 | 336 | 336 | 336 |
| YVSG | 736 | 736 | 736 | 736 | 736 | 736 | 736 | 736 | 736 | 736 | 736 | 736 | 736 | 736 | 736 | 736 |
| YG | 2.19 | 2.19 | 2.19 | 2.19 | 2.19 | 2.19 | 2.19 | 2.19 | 2.19 | 2.19 | 2.19 | 2.19 | 2.19 | 2.19 | 2.19 | 2.19 |

FIG. 41

| | CYCLE | 1 | 1 | 1 | 1 | 1 | 1 | 1 | 1 | 2 | 2 | 2 | 2 | 2 | 2 | 2 | 2 | |
|---|---|---|---|---|---|---|---|---|---|---|---|---|---|---|---|---|---|---|
| | n | 0 | 1 | 2 | 3 | 4 | 5 | 6 | 7 | 8 | 9 | 10 | 11 | 12 | 13 | 14 | 15 | |
| | Ph | A | B | C | D | D | C | B | A | A | B | C | D | D | C | B | A | |
| | x(7) | 0 | 0 | 0 | 0 | 0 | 0 | 0 | 0 | 0 | 0 | 0 | 0 | 0 | 0 | 0 | 0 | |
| | x(6) | 0 | 0 | 0 | 0 | 0 | 0 | 0 | 0 | 0 | 0 | 0 | 0 | 0 | 0 | 0 | 0 | |
| MAX | x(5) | 2 | 2 | 2 | 3 | 3 | 2 | 2 | 2 | 2 | 2 | 2 | 3 | 3 | 2 | 2 | 2 | MAX |
| | x(4) | 0 | 0 | 0 | 0 | 0 | 0 | 0 | 0 | 0 | 0 | 0 | 0 | 0 | 0 | 0 | 0 | |
| | x(3) | 0 | 0 | 0 | 0 | 0 | 0 | 0 | 0 | 0 | 0 | 0 | 0 | 0 | 0 | 0 | 0 | |
| | x(2) | 0 | 0 | 0 | 0 | 0 | 0 | 0 | 0 | 0 | 0 | 0 | 0 | 0 | 0 | 0 | 0 | |
| | x(1) | 0 | 0 | 0 | 0 | 0 | 0 | 0 | 0 | 0 | 0 | 0 | 2 | 0 | 0 | 0 | 0 | |
| | x(0) | 0 | 0 | 0 | 0 | 0 | 0 | 0 | 0 | 0 | 0 | 0 | 0 | 0 | 0 | 0 | 0 | |
| | x(-1) | 0 | 0 | 0 | 0 | 0 | 0 | 0 | 0 | 0 | 0 | 0 | 0 | 0 | 0 | 0 | 0 | |
| | x(-2) | 0 | 0 | 0 | 0 | 0 | 0 | 0 | 0 | 0 | 0 | 0 | 0 | 0 | 0 | 0 | 0 | |
| | x(-3) | 0 | 0 | 0 | 0 | 0 | 0 | 0 | 0 | 0 | 0 | 0 | 0 | 0 | 0 | 0 | 0 | |
| | x(-4) | 0 | 0 | 0 | 0 | 0 | 0 | 0 | 0 | 0 | 0 | 0 | 0 | 0 | 0 | 0 | 0 | |
| | x(-5) | 0 | 0 | 0 | 0 | 0 | 0 | 0 | 0 | 0 | 0 | 0 | 0 | 0 | 0 | 0 | 0 | |
| | x(-6) | 0 | 0 | 0 | 0 | 0 | 0 | 0 | 0 | 0 | 0 | 0 | 0 | 0 | 0 | 0 | 0 | |
| | x(-7) | 0 | 0 | 0 | 0 | 0 | 0 | 0 | 0 | 0 | 0 | 0 | 0 | 0 | 0 | 0 | 0 | |
| | x(-8) | 0 | 0 | 0 | 0 | 0 | 0 | 0 | 0 | 0 | 0 | 0 | 0 | 0 | 0 | 0 | 0 | |
| | XVS | 2 | 2 | 2 | 3 | 3 | 2 | 2 | 2 | 2 | 2 | 2 | 5 | 3 | 2 | 2 | 2 | |
| | XVSG | 10 | 10 | 10 | 15 | 15 | 10 | 10 | 10 | 10 | 10 | 10 | 17 | 15 | 10 | 10 | 10 | |
| | XG | 5 | 5 | 5 | 5 | 5 | 5 | 5 | 5 | 5 | 5 | 5 | 3.4 | 5 | 5 | 5 | 5 | |
| | y(4) | 0 | 0 | 0 | 0 | 0 | 0 | 0 | 0 | 0 | 0 | 0 | 0 | 0 | 0 | 0 | 0 | |
| | y(3) | 1 | 0 | 0 | 0 | 0 | 0 | 0 | 1 | 1 | 0 | 0 | 0 | 0 | 0 | 0 | 1 | |
| | y(2) | 1 | 1 | 0 | 0 | 0 | 0 | 1 | 1 | 1 | 1 | 0 | 0 | 0 | 0 | 1 | 1 | |
| | y(1) | 0 | 1 | 1 | 1 | 1 | 1 | 1 | 0 | 0 | 1 | 1 | 1 | 1 | 1 | 1 | 0 | |
| | y(0) | 0 | 0 | 1 | 1 | 1 | 1 | 0 | 0 | 0 | 0 | 1 | 1 | 1 | 1 | 0 | 0 | |
| | y(-1) | 0 | 0 | 0 | 1 | 1 | 0 | 0 | 0 | 0 | 0 | 0 | 1 | 1 | 0 | 0 | 0 | |
| | y(-2) | 0 | 0 | 0 | 0 | 0 | 0 | 0 | 0 | 0 | 0 | 0 | 1 | 0 | 0 | 0 | 0 | |
| | y(-3) | 0 | 0 | 0 | 0 | 0 | 0 | 0 | 0 | 0 | 0 | 0 | 1 | 0 | 0 | 0 | 0 | |
| | y(-4) | 0 | 0 | 0 | 0 | 0 | 0 | 0 | 0 | 0 | 0 | 0 | 0 | 0 | 0 | 0 | 0 | |
| | YVS | 2 | 2 | 2 | 3 | 3 | 2 | 2 | 2 | 2 | 2 | 2 | 5 | 3 | 2 | 2 | 2 | |
| | YVSG | 5 | 3 | 1 | 0 | 0 | 1 | 3 | 5 | 5 | 3 | 1 | -5 | 0 | 1 | 3 | 5 | |
| | YG | 2.5 | 1.5 | 0.5 | 0 | 0 | 0.5 | 1.5 | 2.5 | 2.5 | 1.5 | 0.5 | -1 | 0 | 0.5 | 1.5 | 2.5 | |

(A)

(B)

ELECTRONIC APPLIANCE USING VIDEO CAMERA RESPONSIVE TO DETECTED MOTION OF AN OPERATOR WITHIN DETECTION ZONES WHEN THE MOTION EXCEEDS A THRESHOLD

BACKGROUND OF THE INVENTION

1. Field of the Invention

The present invention relates to an electronic appliance with a video camera, such as a television set, and particularly, to an electronic appliance with a video camera that recognizes a motion in images of, for example, a human hand and remotely controls an electronic appliance according to the recognized motion.

2. Description of Related Art

In the 1980s, infrared remote controllers started to be attached to home appliances such as television sets. The remote control user interfaces have widely spread and greatly changed the usage of home appliances. At present, the operation with remote controllers is in the mainstream. The remote controller basically employs a one-push, one-function operation. A television remote controller, for example, has ON/OFF, CHANNEL, VOLUME, and INPUT SELECT keys for conducting respective functions. The remote controllers are very useful for remotely controlling the television set and electronic devices connected to the television set.

When the remote controller is not present nearby, or when it is unclear where the remote controller is, the user experiences dreadful inconvenience. To cope with this, a method is studied that recognizes the motion and shape of an objective image, and according to a result of recognition, conducts an operation such as a power ON/OFF operation. A technique of recognizing the motion and shape of a hand and operating an appliance according to a result of recognition is disclosed in Japanese Unexamined Patent Application Publication No. Hei11(1999)-338614. To detect the motion and shape of a hand, the disclosure employs a dedicated infrared sensor and a special image sensor.

Data broadcasting that has started recently requires UP, DOWN, LEFT, RIGHT, and OK keys of a remote controller to be pushed several times to display a required menu. This is troublesome for the user. An EPG (electronic program guide) displays a matrix of guides and prompts the user to select a desired one of the guides by pushing keys on a remote controller. This is also troublesome for the user. For such a detailed selection operation, there is a need for a method that can recognize the motion and shape of an objective image and conduct a control operation accordingly.

A solution disclosed in Japanese Unexamined Patent Application Publication No. 2003-283866 is a controller that obtains positional information with a pointing device such as a mouse, encodes the positional information into a time-series code string which is a time-series pattern of codes representative of pushed keys, and transmits the time-series code string to a television set.

Home AV appliances such as audio units, video devices, and television sets realize remote control with use of remote controllers. If a remote controller is not present nearby, the user must find the remote controller, pick up it, and selectively manipulate keys on the remote controller to, for example, turn on the home appliance. These actions are inconvenient for the user to take. If the remote controller is unfound, the user must turn on the appliance by manipulating a main power switch on the appliance itself. This is the problem frequently experienced with the remote controller.

An operation of turning off the appliance can smoothly be carried out if the remote controller is in the user's hand. If, however, the remote controller is not in the user's hand, the user must feel inconvenience.

The control method disclosed in the Japanese Unexamined Patent Application Publication No. Hei11(1999)-338614 employs motions such as a circular motion, vertical motion, and horizontal motion. These motions are simple, and therefore, the method will be easy to use for a user if images of the motions are correctly recognized. The simple motions, however, involve erroneous recognition, increase apparatus size for achieving motion recognition, and need a special recognition device that is incompatible with other image recognition devices.

The controller disclosed in the Japanese Unexamined Patent Application Publication No. 2003-283866 allows a user to conduct a pointing operation similar to that of a personal computer and remotely control a television set. This controller, therefore, is inconvenient for a person who is unfamiliar with the operation of a personal computer. From the view point of information literacy (ability of utilizing information), the related art is somewhat unreasonable because it forcibly introduces the handling scheme of personal computers into the handling scheme of home appliances such as television sets. A need exists in a new remote control method appropriate for television sets.

To provide inexpensive home appliances, there is a need of a control unit that can be materialized in a proper size and can achieve an image recognition for a two-alternative selection operation such as a power ON/OFF operation and an image recognition for a multiple selection operation such as one carried out on a menu screen. An image recognition of a simple motion easily causes an erroneous recognition. Such an erroneous recognition will cause a critical error such as turning off a television set while a user is watching the same, and therefore, must be avoided.

SUMMARY OF THE INVENTION

An object of the present invention is to provide an electronic appliance capable of correctly detecting a simple motion through image recognition and controlling the electronic appliance accordingly without the interference of noise.

In order to accomplish the object, a first aspect of the present invention provides an electronic appliance including a display (23), a video camera (2) configured to photograph an operator (3) who is in front of the display, a detection unit (19) having a plurality of detectors assigned to a plurality of detection zones, respectively, the detection zones being defined by dividing a screen of the display horizontally by N (an integer equal to or larger than 2) and vertically by M (an integer equal to or larger than 2), each of the detectors generating a first detection signal representative of a motion of the operator that is photographed with the video camera and is detected in the assigned detection zone, a timing pulse generator (12) configured to supply timing pulses to operate the detectors, a signal generator (20-1 to 20-5) configured to generate a second detection signal according to the first detection signal, a flag generator (20) configured to generate a flag when a cumulative value of one of the second detection signals accumulated for a predetermined period exceeds a predetermined threshold, and a controller (20) configured to enable the second detection signals derived from specified ones of the detection zones and disable the second detection signals derived from the other detection zones. For a predetermined period after the flag generator generates a flag, the timing pulse generator selectively supplies timing pulses to the detector that has caused the flag generator to generate the flag and to the detectors whose detection zones are in the vicinity of the detection zone of the flag-caused detector.

According to a second aspect of the present invention, the detectors in the detection unit are N first detectors (317 to 325) assigned to the N detection zones, respectively, and M second detectors (301 to 316) assigned to the M detection zones, respectively. For a predetermined period after the flag generator generates a flag, the timing pulse generator narrows the width of a timing pulse supplied to the N first detectors or the M second detectors under the control of the controller according to a motion of the operator.

According to a third aspect of the present invention, the detectors in the detection unit are N×M detectors assigned to N×M detection zones, respectively, the N×M detection zones being defined by dividing a screen of the display horizontally by N and vertically by M. For a predetermined period after the flag generator generates a flag, the controller enables the second detection signal derived from the detector that has caused the flag generator to generate the flag, as well as the second detection signals derived from the detectors whose detection zones are in the vicinity of the detection zone of the flag-caused detector and disables the second detection signals derived from the other detectors.

According to a fourth aspect of the present invention, the electronic appliance further includes a mirror image converter (14) configured to convert an image photographed with the video camera into a mirror image of the image, an operational image generator (16) configured to generate at least one operational image, and a mixer (17) configured to mix a mirror image signal provided by the mirror image converter with an operational image signal provided by the operational image generator. With the mixed image provided by the mixer being displayed on the display, the detection unit generates the first detection signals representative of a motion of the displayed operator conducted with respect to the operational image.

According to a fifth aspect of the present invention, the detection unit includes a digital filter (kn) configured to multiply the second detection signals by tap coefficients representative of a first reference waveform corresponding to a first motion that is a vertical motion of an object photographed with the video camera and a motion detector (20-1 to 20-5) configured to determine, according to a signal waveform provided by the digital filter, whether or not the motion of the operator is the first motion.

According to a sixth aspect of the present invention, the detection unit includes a digital filter (kn) configured to multiply the second detection signals by tap coefficients representative of a second reference waveform corresponding to a second motion that is a horizontal motion of an object photographed with the video camera and a motion detector (20-1 to 20-5) configured to determine, according to a signal waveform provided by the digital filter, whether or not the motion of the operator is the second motion.

The electronic appliance according to the present invention can correctly detect and recognize a simple motion without the interference of noise and control the appliance according to the recognized motion.

The nature, principle and utility of the invention will become more apparent from the following detailed description when read in conjunction with the accompanying drawings.

BRIEF DESCRIPTION OF THE DRAWINGS

In the accompanying drawings:

FIG. 18 is a table showing data detected on the vertically moving hand by the x- and y-axis detectors and barycentric values calculated from the data;

FIG. 24 is a table showing data detected on the vertically moving hand by the x- and y-axis detectors and barycentric values calculated from the data with unnecessary data removed according to the flag (Flg_x);

FIG. 28 is a table showing data detected on the horizontally moving hand by the x- and y-axis detectors and barycentric values calculated from the data;

FIG. 33 is a table showing data detected on the horizontally moving hand by the x- and y-axis detectors and barycentric values calculated from the data with unnecessary data removed according to the flag (Flg_y);

FIG. 41 is a table showing data detected by x- and y-axis detectors according to the second embodiment;

DETAILED DESCRIPTION OF EMBODIMENTS

Embodiments of the present invention will be explained with reference to the accompanying drawings.

Figure 1:
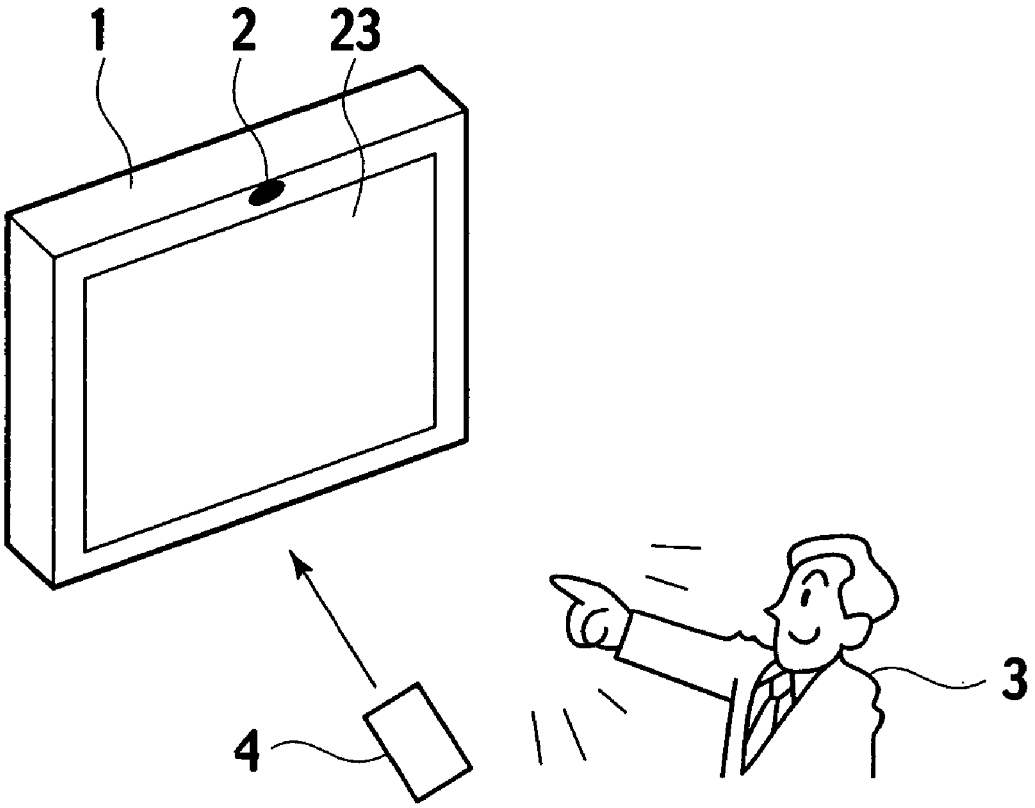
FIG. 1 is a view showing a control operation of a television set which is an example of an electronic appliance according to an embodiment of the present invention.

FIG. 1 shows the difference between an operation using a remote controller according to a related art and an operation according to the present invention. A user (operator) 3 operates a television set 1. According to the related art, the user 3 must hold the remote controller 4, direct the remote controller 4 toward the television set 1, and push a key of required function on the remote controller 4. If the remote controller 4 is not present nearby, the user 3 must feel inconvenience.

On the other hand, the present invention provides the television set 1 with a video camera 2. The video camera 2 photographs the user 3. From an image of the user 3 provided by the video camera 2, a motion of the user 3 is detected and a control operation corresponding to the detected motion is carried out with respect to the television set 1 or any other device connected to the television set 1.

A motion of the user 3 to be detected is a motion of the body (hand, foot, face, and the like) of the user 3 intended to carry out a power ON/OFF operation, menu ON/OFF operation, menu button selection operation, and the like with respect to the television set 1. Such a specific motion of the user 3 is detected to control the television set 1 and other electronic appliances connected to the television set 1. The embodiment mentioned below employs practical hand motions to control electronic appliances.

Figure 2:
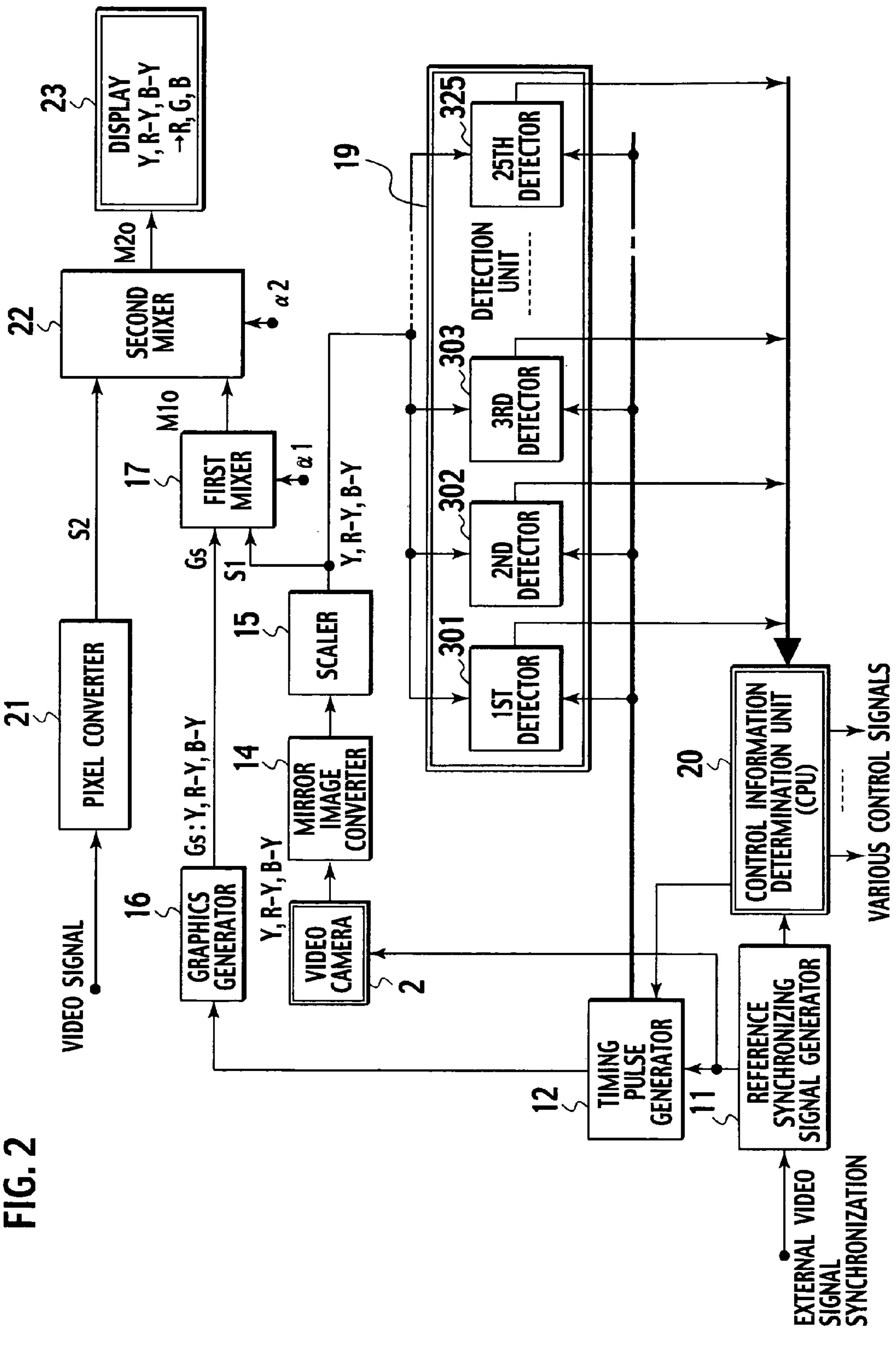
FIG. 2 is a block diagram showing parts of a television set according to an embodiment of the present invention.

FIG. 2 is a block diagram showing a television set according to an embodiment of the present invention. The television set 1 is an example of an electronic appliance to which the present invention is applicable. The television set 1 has a reference synchronizing signal generator 11, a timing pulse generator 12, a graphics generator 16, a video camera 2, a mirror image converter 14, a scaler 15, a first mixer 17, a pixel converter 21, a second mixer 22, a display 23, a detection unit 19, and a control information determination unit (realized in a CPU, and therefore, hereinafter referred to as CPU) 20.

The reference synchronizing signal generator 11 generates horizontal periodic pulses and vertical periodic pulses as reference signals for the television set 1. When receiving a television broadcasting signal or a video signal from an external device, the generator 11 generates pulses synchronized with a synchronizing signal of the input signal. The timing pulse generator 12 generates pulses having optional phases and widths in horizontal and vertical directions for detection zones shown in FIG. 4 to be explained later.

The video camera 2 is arranged on the front side of the television set 1 and photographs the user (operator) 3 or an object in front of the television set 1. The video camera 2 outputs a brightness signal (Y) and color difference signals (R−Y, B−Y) in synchronization with the horizontal and vertical periodic pulses provided by the reference synchronizing signal generator 11. According to this embodiment, the number of pixels of an image photographed with the video camera 2 is equal to the number of pixels of the display 23. If they are not equal to each other, a pixel converter is needed.

The mirror image converter 14 horizontally inverts an image (of the user 3) from the video camera 2 into a mirror image, which is displayed on the display 23. If the video camera 2 provides an image of a character, it is horizontally inverted like a character image reflected from a mirror. This embodiment employs memories to horizontally invert an image into a mirror image.

If the display 23 is a CRT (cathode ray tube), a horizontal deflecting operation may be reversely carried out to horizontally invert an image. In this case, other images or graphics to be mixed with an image from the video camera 2 must be horizontally inverted in advance.

The scaler 15 adjusts the size of an image photographed with the video camera 2. Under the control of the CPU 20, the scaler 15 two-dimensionally adjusts an expansion ratio or a contraction ratio of a given image. Instead of expansion or contraction, the scaler 15 may adjust horizontal and vertical phases.

The graphics generator 16 forms a menu according to a menu signal transferred from the CPU 20. If the menu signal is a primary color signal involving R (red), G (green), and B (blue) signals, the graphics generator 16 generates, from the primary color signal, a Y (brightness) signal and color difference (R−Y, B−Y) signals, which are synthesized or mixed with an image signal in a later stage. The number of planes of the generated graphics is optional. In this embodiment, the number of planes is one.

The number of pixels of the generated graphics according to this embodiment is equal to the number of pixels of the display 23. If they are not equal to each other, a pixel converter is necessary to equalize them.

The first mixer 17 mixes an output signal Gs of the graphics generator 16 with an output signal S1 of the scaler 15 according to a control value α1 that controls a mixing ratio. The first mixer 17 provides an output signal M1$o$ as follows:

$$M1o=\alpha 1\cdot S1+(1-\alpha 1)\cdot Gs$$

The control value α1 is a value between 0 and 1. As the control value α1 increases, a proportion of the scaler output signal S1 increases and a proportion of the output signal Gs of the graphics generator 16 decreases. The mixer is not limited to the one explained above. The same effect will be achievable with any mixer that receives two systems of signal information.

The detection unit 19 includes a first detector 301, a second detector 302, a third detector 303, . . . , and an "n"th detector 300+n. The number of detectors included in the detection unit 19 is not particularly limited. According to the first embodiment, there are 25 detectors including the first to sixteenth detectors 301 to 316 that operate in response to horizontal timing pulses and the seventeenth to twenty-fifth detectors 317 to 325 that operate in response to vertical timing pulses.

The number of detectors is not limited to the above-mentioned one. The larger the number of detectors the higher the detection accuracy increases. It is preferable to determine the number of detectors depending on requirements. The first embodiment of the present invention employs 25 detectors and the second embodiment 144 detectors.

The CPU 20 analyzes data provided by the detection unit 19 and outputs various control signals. Operation of the CPU 20 is realized by software. Algorithms of the software will be explained later. To carry out various operations, the embodiment employs hardware (functional blocks) and software (in the CPU 20). Classification of operations into hardware executable operations and software executable operations in the embodiment does not limit the present invention.

The pixel converter 21 converts pixel counts, to equalize the number of pixels of an external input signal with the number of pixels of the display 23. The external input signal is a signal coming from the outside of the television set 1, such as a broadcasting television signal (including a data broadcasting signal) or a video (VTR) signal. From the external input signal, horizontal and vertical synchronizing signals are extracted, and the reference synchronizing signal generator 11 provides synchronized signals. The details of a synchronizing system for external input signals will not be explained here.

The second mixer 22 functions like the first mixer 17. The second mixer 22 mixes the output signal M1$o$ of the first mixer 17 with an output signal S2 of the pixel converter 21 at a control value α2 that controls a mixing ratio. The second mixer 22 provides an output signal M2$o$ as follows:

$$M2o=\alpha 2\cdot M1o+(1-\alpha 2)\cdot S2$$

The control value α2 is a value between 0 and 1. As the control value α2 increases, a proportion of the output signal M1$o$ from the first mixer 17 increases and a proportion of the output signal S2 from the pixel converter 21 decreases. The mixer 22 is not limited to the one explained above. The same effect will be provided with any mixer that receives two systems of signal information.

The display 23 may be a CRT, an LCD (liquid crystal display), a PDP (plasma display panel), a projection display, or the like. The display 23 may employ any proper display method. The display 23 receives a brightness signal and color difference signals, converts them into R, G, and B primary color signals, and displays an image accordingly.

Figure 3B:
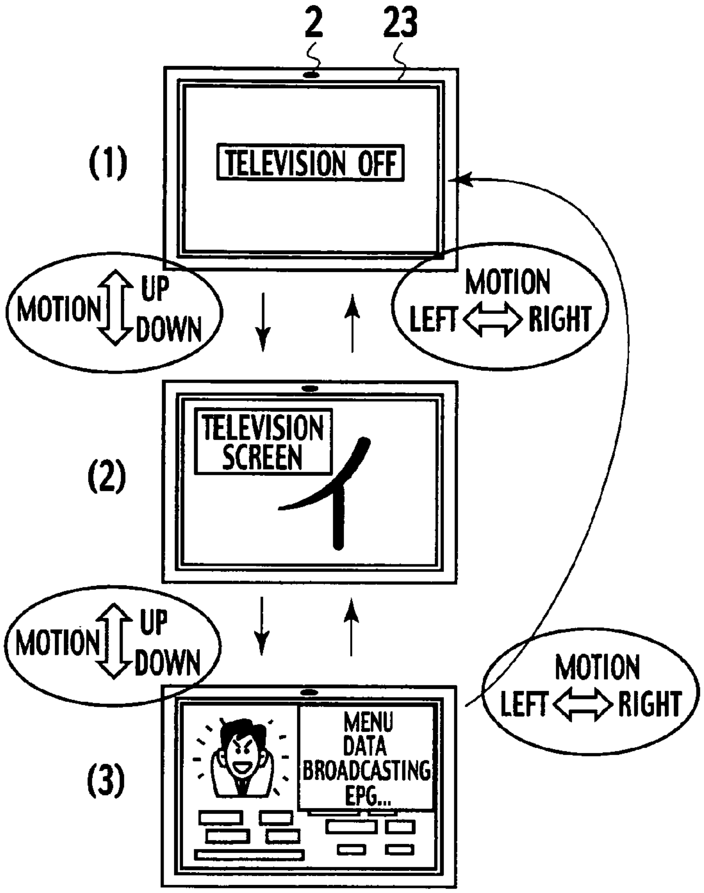
FIGS. 3A and 3B are views explaining motions of an operator to be recognized to control the television set of FIG. 2.
Figure 3A:
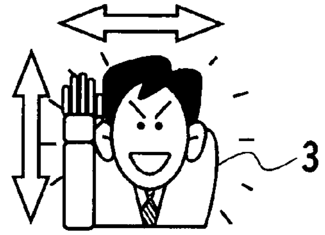

Operation of the television set 1 having the above-mentioned structure, as well as operation conducted by the user 3 will be explained. FIGS. 3A and 3B show hand motions conducted by the user 3 and control operations of the television set 1 corresponding to the hand motions. In FIG. 3A, the user 3 is in front of the television set 1 and conducts hand motions as indicated with arrows. According to this embodiment, the user 3 conducts two motions, i.e., a vertical (up-and-down) hand motion and a horizontal (left-and-right) hand motion.

In FIG. 3B, states (1) to (3) appear on the display 23 of the television set 1 according to hand motions of the user 3. A hand motion of the user 3 may activate a power ON operation, a menu display operation, a menu erase operation, or a power OFF operation with respect to the television set 1.

For example, a vertical hand motion of the user 3 turns on the television set 1 if the television set 1 is OFF, or displays a menu if the television set 1 is ON. A horizontal hand motion of the user 3 turns off the television set 1 without regard to the present state of the television set 1.

In the state (1) of FIG. 3B, the television set 1 is OFF and the display 23 displays nothing. If the user 3 carries out a vertical hand motion, the video camera 2 photographs the motion and the television set 1 turns on to display a program on the display 23 as shown in the state (2) of FIG. 3B.

In the state (1) of FIG. 3B, the display 23 displays nothing, and therefore, the user 3 is unable to view an image of the user 3 photographed with the video camera 2. Accordingly, the user 3 must be at a position where the user 3 is surely caught by the video camera 2. At the same time, the television set 1 must recognize a motion of the user 3 wherever the position of the user 3 in an image photographed with the video camera 2 is. In this case, the display 23 and graphics generator 16 may not be needed.

If the user 3 carries out a vertical hand motion in the state (2) of FIG. 3B, the state (2) changes to the state (3) displaying a menu on the display 23. In the state (3), the user 3 can carry out, for example, a channel selecting operation. Also in this case, the display 23 initially displays a program, and therefore, the user 3 is unable to see on the display 23 an image of the user 3 photographed with the video camera 2. Accordingly, the television set 1 must recognize a motion of the user 3 wherever the position of the user 3 in an image photographed with the video camera 2 is.

If the user 3 carries out a horizontal hand motion in the state (2) of FIG. 3B with the display 23 displaying a program, the television set 1 turns off to restore the state (1) of FIG. 3B. If the user 3 conducts a horizontal hand motion in the state (3) of FIG. 3B with the display 23 displaying a menu, a data broadcasting screen, an EPG, or the like, the display 23 goes to the state (2) or (1) of FIG. 3B.

The vertical and horizontal hand motions of a person employed by the embodiment are usual human motions. The vertical hand motion generally means beckoning, and therefore, can appropriately be assigned to an operation of entering (shifting to) the next state. The horizontal hand motion generally means parting (bye-bye), and therefore, can appropriately be assigned to an operation of exiting the present state. The meaning of a motion differs depending on nations and races, and therefore, other motions maybe employed for the present invention. It is preferable for convenience of use to employ motions according to their meanings.

The above-mentioned control examples of the television set 1 are simple for the sake of easy understanding of the present invention. The present invention can properly set control operations of the television set 1 according to the functions and scheme of the television set 1.

When turning on the television set 1, the user 3 may be not in an optimum watching area of the television set 1. Accordingly, the photographing area of the video camera 2 must be wide to expand a range for recognizing a motion of the user 3. When displaying a menu while watching the television set 1, the user 3 must be in the optimum watching area, and therefore, the photographing area of the video camera 2 may be narrowed to some extent.

Figure 4:
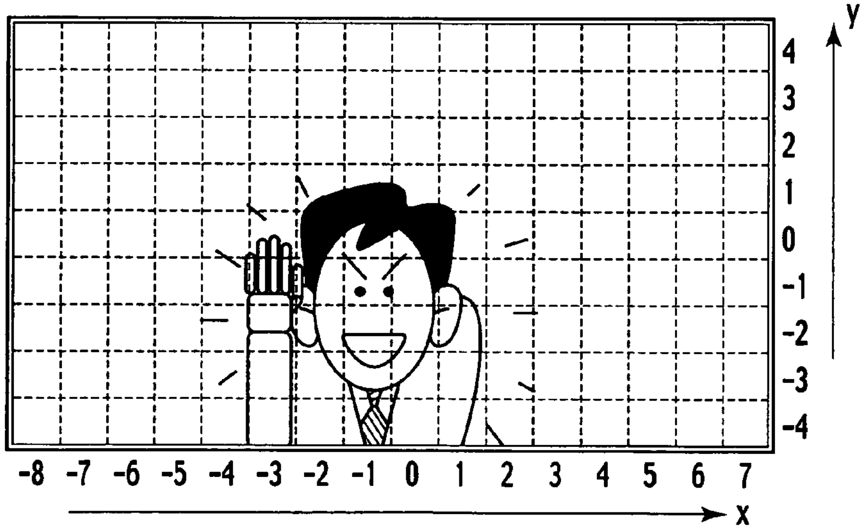
FIG. 4 is a view showing an image of the operator photographed with a video camera installed in the television set of FIG. 2.

FIG. 4 is a view explaining detection zones defined to detect a hand motion of the user 3. In FIG. 4, there are shown an image of the user 3 photographed with the video camera 2 and x-coordinates in a horizontal direction and y-coordinates in a vertical direction. This embodiment divides a screen of the display 23 on which an image provided by the video camera 2 is displayed into 16 detection zones in the horizontal direction and nine detection zones in the vertical directions, to recognize a hand motion of the user 3. According to the embodiment, the display 23 has a horizontal-to-vertical aspect ratio of 16:9. Accordingly, dividing the display 23 by 16 in the horizontal direction and by 9 in the vertical direction forms 144 sections each having a square shape. The divisors of 16 and 9 may each be any integer equal to or larger than 2.

A hand motion of the user 3 is detectable with the 25 linear detection zones including the 16 detection zones defined by dividing a screen of the display 23 in the x-axis direction and the nine detection zones defined by dividing a screen of the display 23 in the y-axis direction. A hand motion of the user 3 is also detectable with two-dimensionally arranged 144 detection zones defined by dividing a screen of the display 23 by 16 in the x-axis direction and by 9 in the y-axis direction. Employing the 25 detection zones is preferable to reduce hardware scale. Employing the 144 detection zones is scalable like employing the 25 detection zones by converting data obtained from the 144 detection zones into x-axis data and y-axis data.

Figure 5:
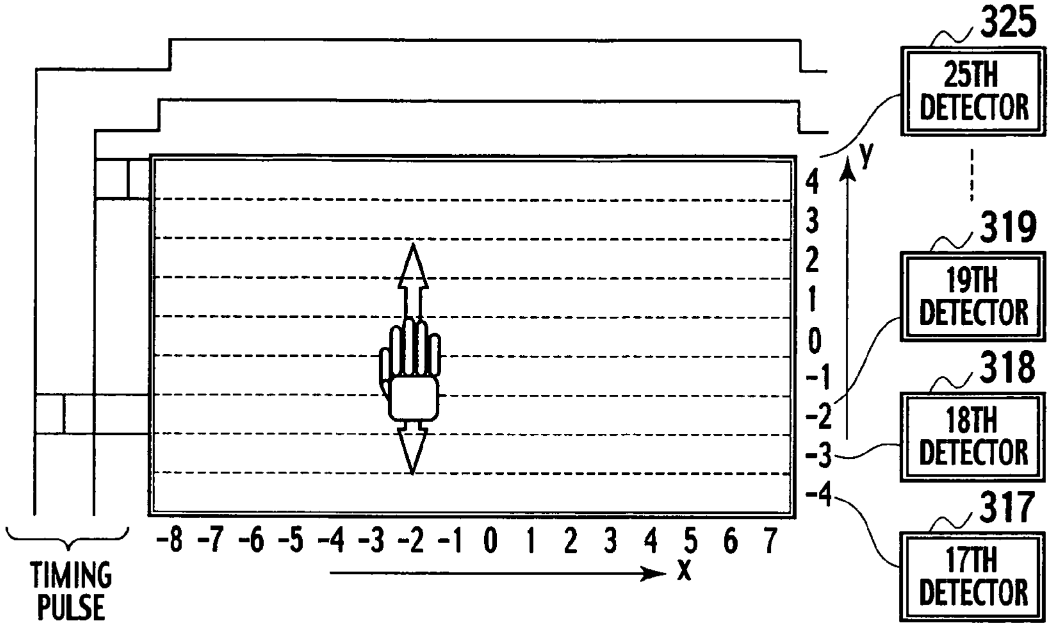
FIG. 5 is a view explaining relationships among y-axis detectors, detection zones to which the detectors are assigned, and timing pulses for driving the detectors.

The first embodiment of the present invention employs the 25 detection zones. FIG. 5 shows the nine detection zones defined by dividing a screen of the display 23 on which an image provided by the video camera 2 is displayed in the y-axis direction. In FIG. 5, there are shown an image of the hand of the user 3 photographed with the video camera 2, the nine detection zones divided in the y-axis direction and depicted with dotted quadrangles, and timing pulses. The nine detection zones are assigned to the 17th to 25th detectors (y-axis detectors) 317 to 325, respectively.

The nine detection zones are represented with positional coordinates −4 to +4, respectively, on the y-axis around the center 0 of the y-axis. The 17th detector 317 is assigned to the detection zone having a y-coordinate of −4, the 18th detector 318 to the detection zone having a y-coordinate of −3, and the 19th detector 319 to the detection zone having a y-coordinate of −2. Similarly, the 20th to 25th detectors 320 to 325 are assigned to the detection zones having y-coordinates of −1 to +4, respectively. The y-axis detectors 317 to 325 generate detection signals representative of a hand motion of the user 3.

The y-axis detectors 317 to 325 operate in response to timing pulses supplied by the timing pulse generator 12. FIG. 5 shows y-axis (vertical) and x-axis (horizontal) timing pulses to operate the 19th detector 319 of the detection zone having the y-coordinate of −2 and y-axis and x-axis timing pulses to operate the 25th detector 325 of the detection zone having the y-coordinate of +4.

Each x-axis timing pulse has a pulse width corresponding to an effective horizontal image period and each y-axis timing pulse has a pulse width corresponding to an effective vertical image period divided by nine. Like timing pulses are supplied to the other y-axis detectors.

Figure 6:
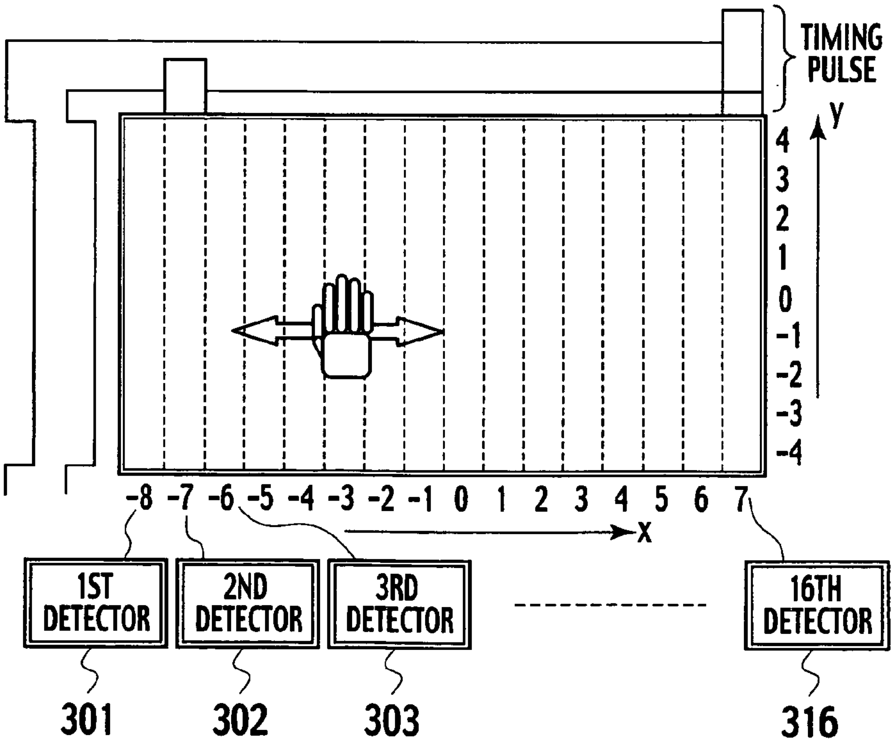
FIG. 6 is a view explaining relationships among x-axis detectors, detection zones to which the detectors are assigned, and timing pulses for driving the detectors.

FIG. 6 shows the 16 detection zones defined by dividing a screen of the display 23 on which an image provided by the video camera 2 is displayed in the x-axis direction. In FIG. 6, there are shown an image of the hand of the user 3 photographed with the video camera 2, the 16 detection zones divided in the x-axis direction and depicted with dotted quadrangles, and timing pulses. The 16 detection zones are assigned to the 1st to 16th detectors (x-axis detectors) 301 to 316, respectively.

The 16 detection zones are represented with positional coordinates −8 to +7, respectively, on the x-axis around the center 0 of the x-axis. The 1st detector 301 is assigned to the detection zone having an x-coordinate of −8, the 2nd detector 302 to the detection zone having an x-coordinate of −7, and the 3rd detector 303 to the detection zone having an x-coordinate of −6. Similarly, the 4th to 16th detectors 304 to 316 are assigned to the detection zones having x-coordinates of −5 to +7, respectively. The x-axis detectors 301 to 316 generate detection signals representative of a hand motion of the user 3.

The x-axis detectors 301 to 316 operate in response to timing pulses supplied by the timing pulse generator 12. FIG. 6 shows x-axis (horizontal) and y-axis (vertical) timing pulses to operate the 2nd detector 302 of the detection zone having the x-coordinate of −7 and x-axis and y-axis timing pulses to operate the 16th detector 316 of the detection zone having the x-coordinate of +7. Each y-axis timing pulse has a pulse width corresponding to an effective vertical image period and each x-axis timing pulse has a pulse width corresponding to an effective horizontal image period divided by 16. Like timing pulses are supplied to the other x-axis detectors.

Figure 7:
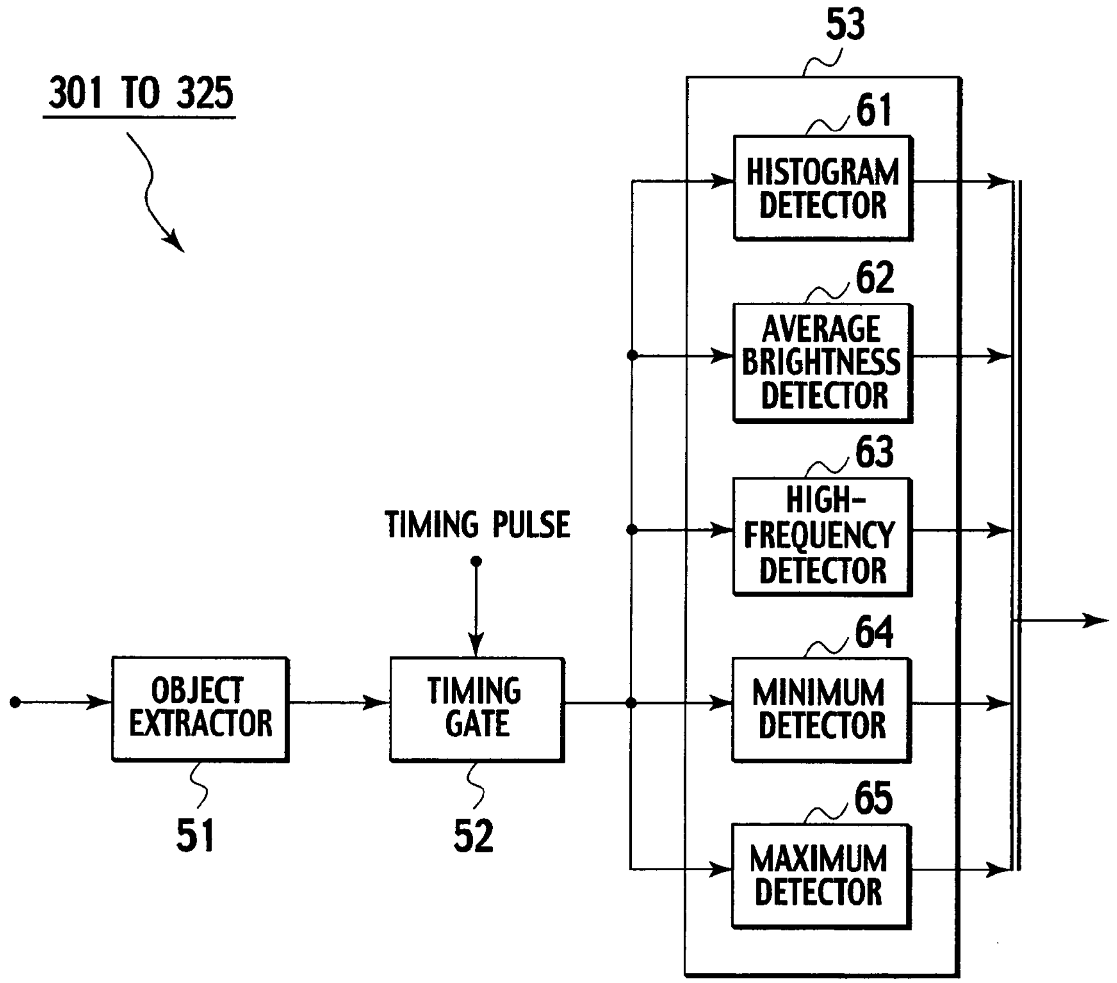
FIG. 7 is a block diagram showing one of the detectors.

FIG. 7 shows the details of one of the 1st detectors 301 to 25th detector 325. The detector has a first object extractor 51, a timing gate 52, and a feature detector 53. The timing gate 52 controls the passage of an image signal from the video camera 2 according to the timing pulses shown in FIGS. 5 and 6.

An image signal is passed through the detection zones depicted with the dotted quadrangles in FIGS. 5 and 6. The signal limited in the detection zones is subjected to various filtering processes mentioned below to extract a hand of the user 3 photographed with the video camera 2.

Figure 8:
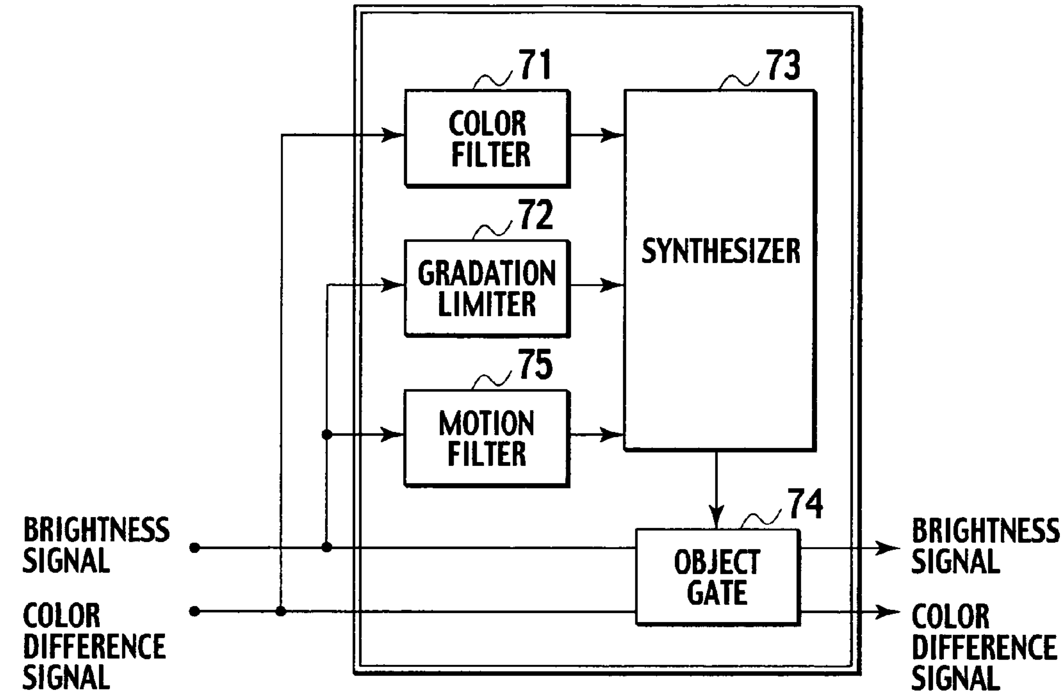
FIG. 8 is a block diagram showing a configuration of an object extractor shown in FIG. 7.

The first object extractor 51 has a filter suitable for filtering the feature of an objective image. According to this embodiment, the first object extractor 51 carries out a filtering process suitable for a skin color and a filtering process for detecting a motion. FIG. 8 shows the details of the first object extractor 51. The first object extractor 51 has a color filter 71, a gradation limiter 72, a motion filter 75, a synthesizer 73, and an object gate 74.

Figure 9:
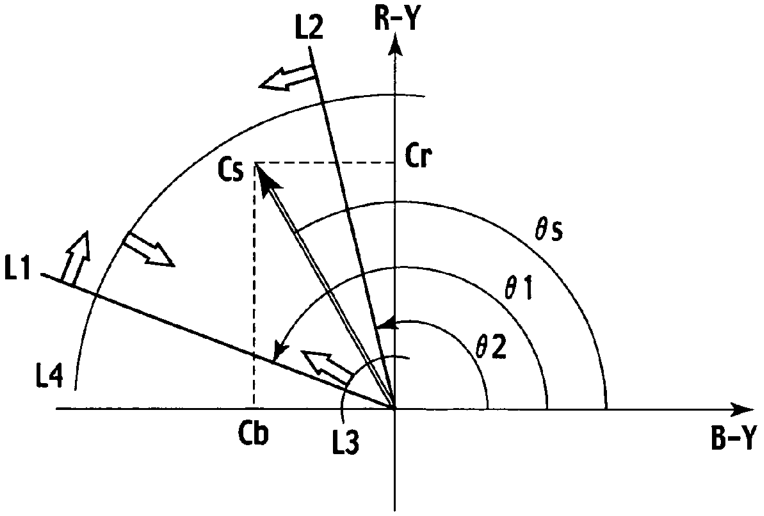
FIG. 9 is a view explaining the hue and saturation degree of an object to be extracted with a color filter shown in FIG. 8.

The color filter 71 will be explained with reference to FIG. 9 that shows a color difference plane with an ordinate representing an R−Y axis and an abscissa representing a B−Y axis. Every color signal in television signals is expressible with a vector on the coordinate system of FIG. 9 and can be evaluated from polar coordinates. The color filter 71 limits the hue and color depth (degree of saturation) of a color signal consisting of color difference signals. In FIG. 9, a hue is expressed with a left-turn angle with the B−Y axis in the first quadrant serving as a reference (zero degrees). The degree of saturation is a scalar quantity of a vector. The origin of the color difference plane has a saturation degree of 0 with no color. The degree of saturation increases as it separates away from the origin, to increase the depth of color.

In FIG. 9, the color filter 71 passes a hue that falls in a range smaller than an angle of θ1 that defines an equal hue line L1 and larger than an angle of θ2 that defines an equal hue line 12. Also, the color filter 71 passes a color depth that falls in a range larger than an equal saturation degree line L3 and smaller than an equal saturation degree line L4. This range in the second quadrant corresponds to a skin-color range, i.e., the color of a human hand to be extracted according to this embodiment. This color range to be extracted does not limit the present invention.

The color filter 71 calculates an angle and a saturation degree according to color difference signals (R−Y, B−Y) from the video camera 2 and determines whether or not the color difference signals are within the range surrounded by the equal hue lines and equal saturation degree lines mentioned above.

Figure 10:
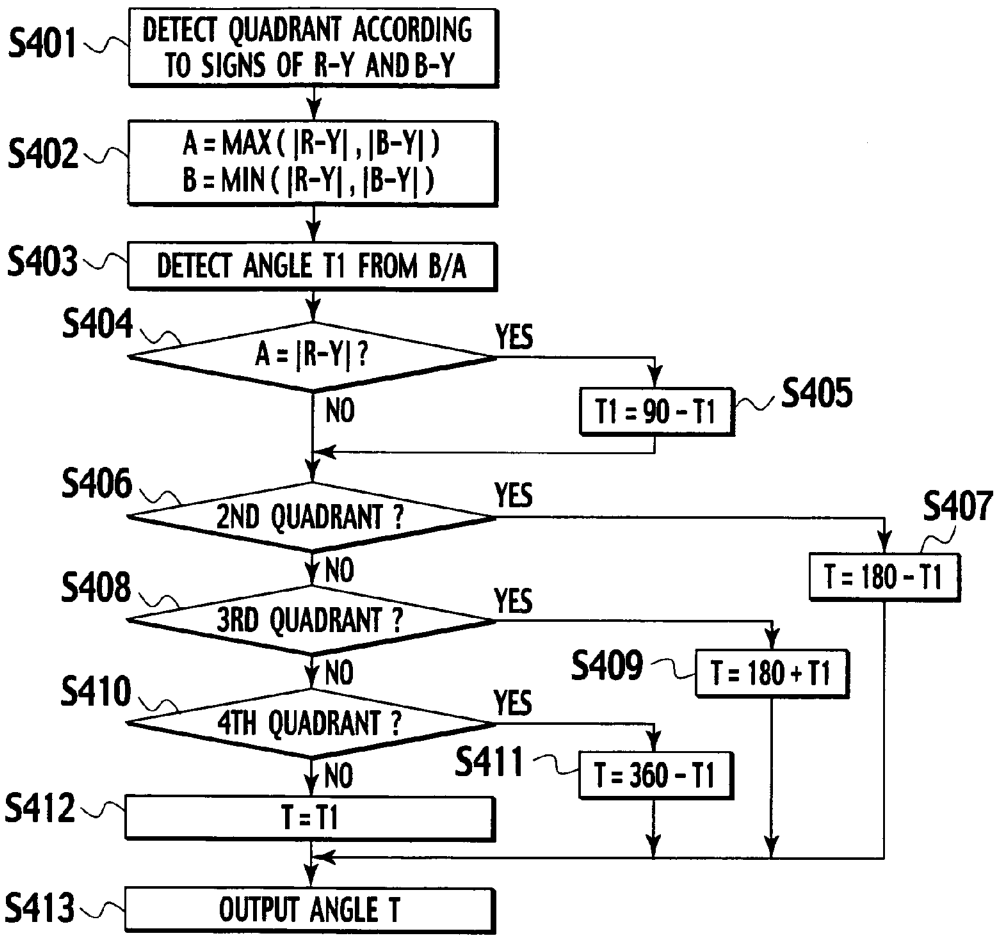
FIG. 10 is a flowchart showing a process of calculating a hue according to color difference signals.

An example of the angle calculation is shown in FIG. 10. Steps shown in FIG. 10 calculate, for each input pixel, an angle formed in the color difference plane of FIG. 9. The angle calculation steps shown in FIG. 10 may be realized by software or hardware. According to this embodiment, the steps of FIG. 10 are realized by hardware.

In FIG. 10, step S401 refers to the signs of color difference signals R−Y and B−Y of each input pixel and detects a quadrant in the color difference plane where the hue of the input pixel is present.

Step S402 defines a larger one of the absolute values |R−Y| and |B−Y| of the color difference signals R−Y and B−Y as A and a smaller one thereof as B.

Step S403 detects an angle T1 from B/A. As is apparent in step S402, the angle T1 is within the range of 0° to 45°. The angle T1 is calculable from a broken line approximation or a ROM table.

Step S404 determines whether or not A is equal to |R−Y|, i.e., whether or not |R−Y|>|B−Y|. If |R−Y|>|B−Y| is not true, step S406 is carried out. If |R−Y|>|B−Y| is true, step S405 replaces the angle T1 with (90−T1). Then, $\tan^{-1}((R-Y)/(B-Y))$ is calculated.

The reason why step S403 sets the range of 0° to 45° for detecting the angle T1 is because the inclination of the curve $\tan^{-1}((R-Y)/(B-Y))$ sharply increases to such an extent that is improper for the angle calculation.

Step S406 employs the quadrant data detected in step S401 and determines if it is the second quadrant. If it is the second quadrant, step S407 sets T=180−T1. If it is not the second quadrant, step S408 determines whether or not it is the third quadrant. If it is the third quadrant, step S409 sets T=180+T1.

If it is not the third quadrant, step S410 checks to see if it is the fourth quadrant. If it is the fourth quadrant, step S411 sets T=360−T1. If it is not the fourth quadrant, i.e., if it is the first quadrant, step S412 sets T=T1. At the end, step S413 outputs, for the pixel, the angle T in the color difference plane of FIG. 9.

With the steps mentioned above, an angle of the input color difference signals R−Y and B−Y in the color difference plane is found in the range of 0° to 360°. Steps S404 to S412 correct the angle T1 detected in step S403 to an angle T. Steps S404 to S411 correct the angle T1 according to a proper one of the first to fourth quadrants.

A color depth or a saturation degree is calculated as follows:

$$Vc=sqrt(Cr\times Cr+Cb\times Cb)$$

where Vc is a scalar quantity of a vector to indicate a saturation degree, Cr is an R−Y axis component of a color signal, Cb is a B−Y axis component as shown in FIG. 9, and "sqrt( )" is an operator to calculate a square root.

This process may be carried out by software or hardware. The multiplication and square root operations are difficult to realize by hardware and involve a large number of steps if realized by software. Accordingly, the above-mentioned process may be approximated as follows:

$$Vc=\max(|Cr|,\ |Cb|)+0.4\times\min(|Cr|,\ |Cb|)$$

where max (|Cr|, |Cb|) is an operation to select a larger one of |Cr| and |Cb| and min(|Cr|, |Cb|) is an operation to select a smaller one of |Cr| and |Cb|.

Thereafter, it is evaluated whether or not the angle (hue) T and saturation degree Vc are within the range of equal hue line angles θ1 to θ2 and within the range of equal saturation angle (color depth) lines L3 to L4. The color filter 71 of FIG. 8 passes any signal that is within these ranges.

Figure 11:
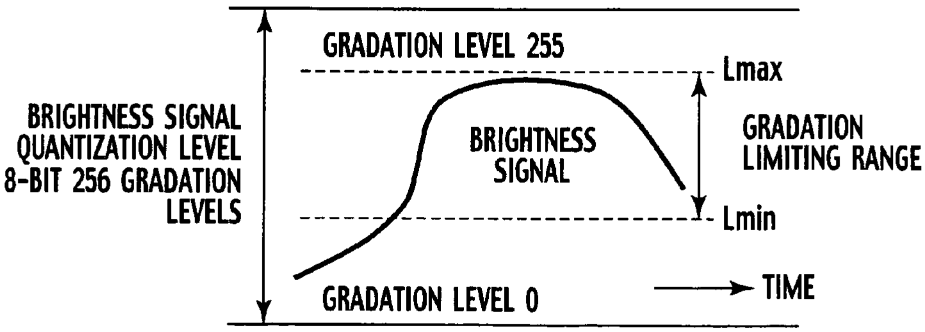
FIG. 11 is a view showing a brightness signal level of an object extracted with a gradation limiter shown in FIG. 8.

The gradation limiter 72 of FIG. 8 is to limit specific gradation levels in a brightness signal as shown in FIG. 11. In the case of an 8-bit digital signal, there are 256 gradation levels ranging from 0 to 255. To limit a range of gradation levels, a maximum level Lmax and a minimum level Lmin are set to pass a brightness signal within this range.

Figure 12:
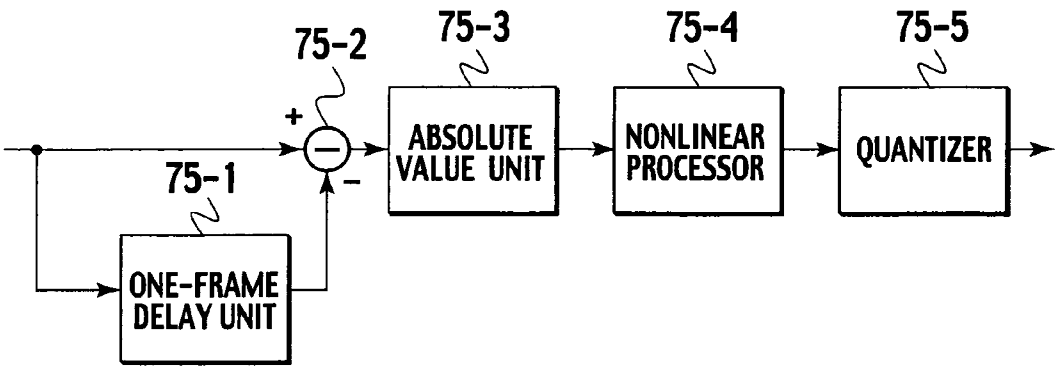
FIG. 12 is a block diagram showing a configuration of an motion filter shown in FIG. 8.

The motion filter 75 of FIG. 8 will be explained with reference to FIGS. 12 and 13. In FIG. 12, the motion filter 75 has a one-frame delay unit 75-1, a subtracter 75-2, an absolute value unit 75-3, a nonlinear processor 75-4, and a quantizer 75-5, to detect an image motion from the input brightness signal.

The one-frame delay unit 75-1 delays an image signal provided by the video camera 2 by one frame. The delayed image signal is sent to the subtracter 75-2. The subtracter 75-2 calculates a difference between an image signal from the video camera 2 and the delayed image signal from the one-frame delay unit 75-1 and sends the difference to the absolute value unit 75-. The sign of the subtraction is not particularly defined. The differential signal may have a positive or negative value depending on signal levels, and therefore, the absolute value unit 75-3 provides an absolute value of the differential value provided by the subtracter 75-2. The absolute value is sent to the nonlinear processor 75-4.

Figure 13:
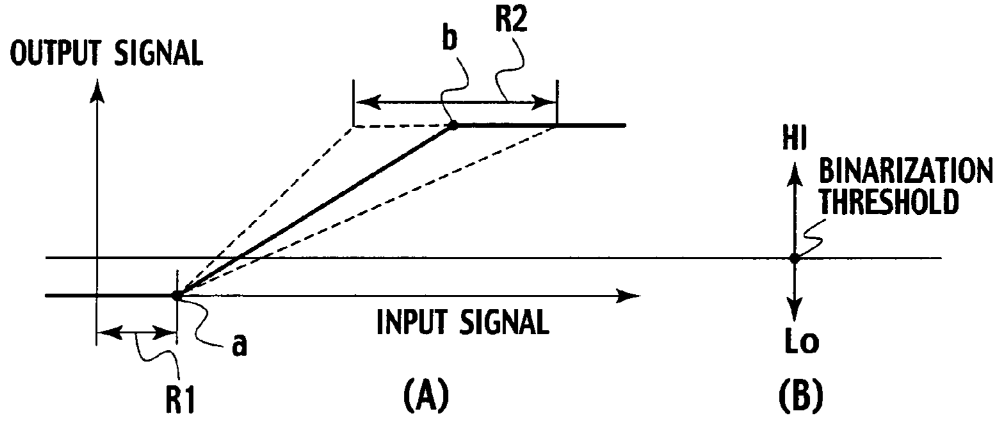
FIG. 13 is a characteristic diagram showing the motion filter.

The nonlinear processor 75-4 carries out a nonlinear process on the absolute value according to an input/output characteristic shown in FIG. 13. In FIG. 13, a graph (A) shows, on an abscissa, the absolute value of the differential signal provided by the absolute value unit 75-3, and on an ordinate, a signal provided by the nonlinear processor 75-4. Values a and b in the graph (A) vary within ranges R1 and R2, respectively.

An output signal from the nonlinear processor 75-4 is supplied to the quantizer 75-5, which binarizes the output signal according to a threshold shown in a graph (B) of FIG. 13.

The synthesizer 73 of FIG. 8 receives signals from the color filter 71, gradation limiter 72, and motion filter 75 and provides an intraregional pulse. Namely, if there are a signal passed through the color filter 71, a signal passed through the gradation limiter 72, and a signal passed through the motion filter 75, the synthesizer 73 provides a high-level pulse.

The intraregional pulse from the synthesizer 73 is supplied to the object gate 74. If the intraregional pulse is at high level, the object gate 74 passes the brightness signal and color difference signals. If the intraregional pulse is at low level, the object gate 74 blocks the input signals (brightness signal and color difference signals) and outputs signals of predetermined values. According to the embodiment, the signals of predetermined values are a black-level brightness signal and color difference signals of saturation degree of zero.

The color filter 71 limits the hue (angle) and saturation degree of input color difference signals. The gradation limiter 72 limits a range of gradation levels of an input brightness signal. The motion filter 75 limits the brightness signal based on an image motion.

Limiting a hue and a saturation degree through the color filter 71 may pickup a human skin color. The human skin color, however, differs depending on a degree of tan or a race. Namely, there are various skin colors. According to control signals from the CPU 20, the color filter 71 adjusts a hue and saturation degree and the gradation limiter 72 adjusts a gradation range for a brightness signal, to detect a human hand. In addition, the motion filter 75 extracts and identifies the human hand according to an image motion.

Figure 14:
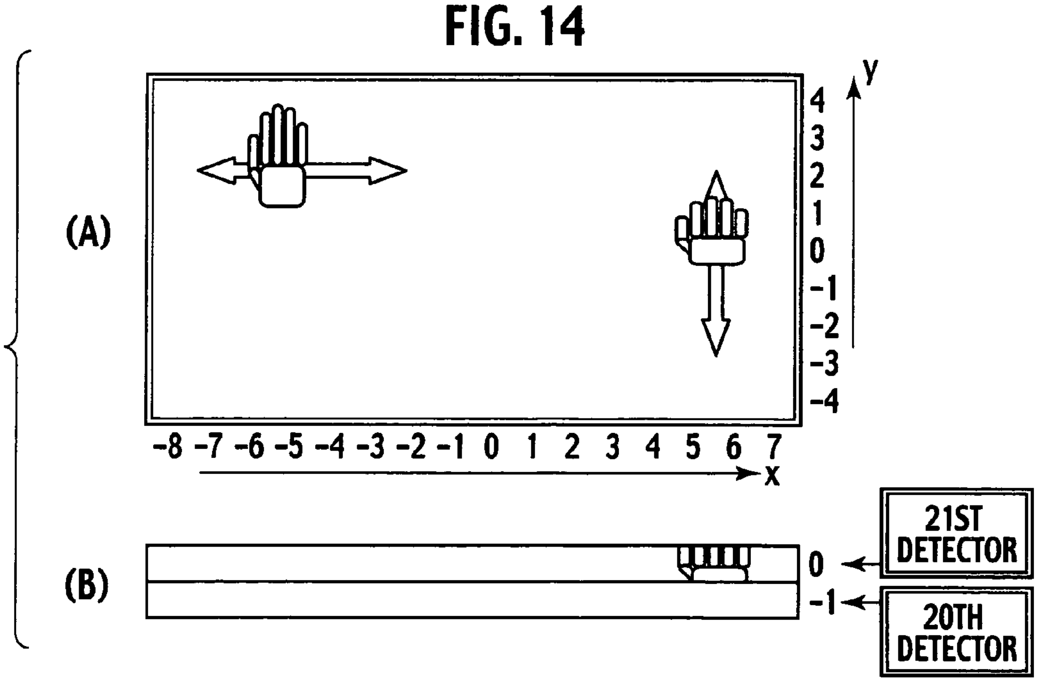
FIG. 14 is a view showing an output from the object extractor displayed on the display.

In FIG. 14, a view (A) shows an image displayed on the display 23 according to output signals from the first object extractors 51. The first object extractors 51 pick up a hand image from an image photographed with the video camera 2 and display the hand image on the display 23. The remaining part of the image other than the hand image is represented with a brightness signal having a black level, and therefore, nothing is displayed in the remaining part. The picked-up signals are used to analyze a feature of the hand image, a position of the hand on the display 23, and a motion of the hand, to recognize an intended motion conducted by the user 3.

In FIG. 14, a view (B) shows an image based on an output signal from the timing gate 52 of the 21st detector 321 assigned to the detection zone having a y-coordinate of 0 and an image based on an output signal from the timing gate 52 of the 20th detector 320 assigned to the detection zone having a y-coordinate of −1. These detectors are activated according to corresponding timing pulses.

Figure 15:
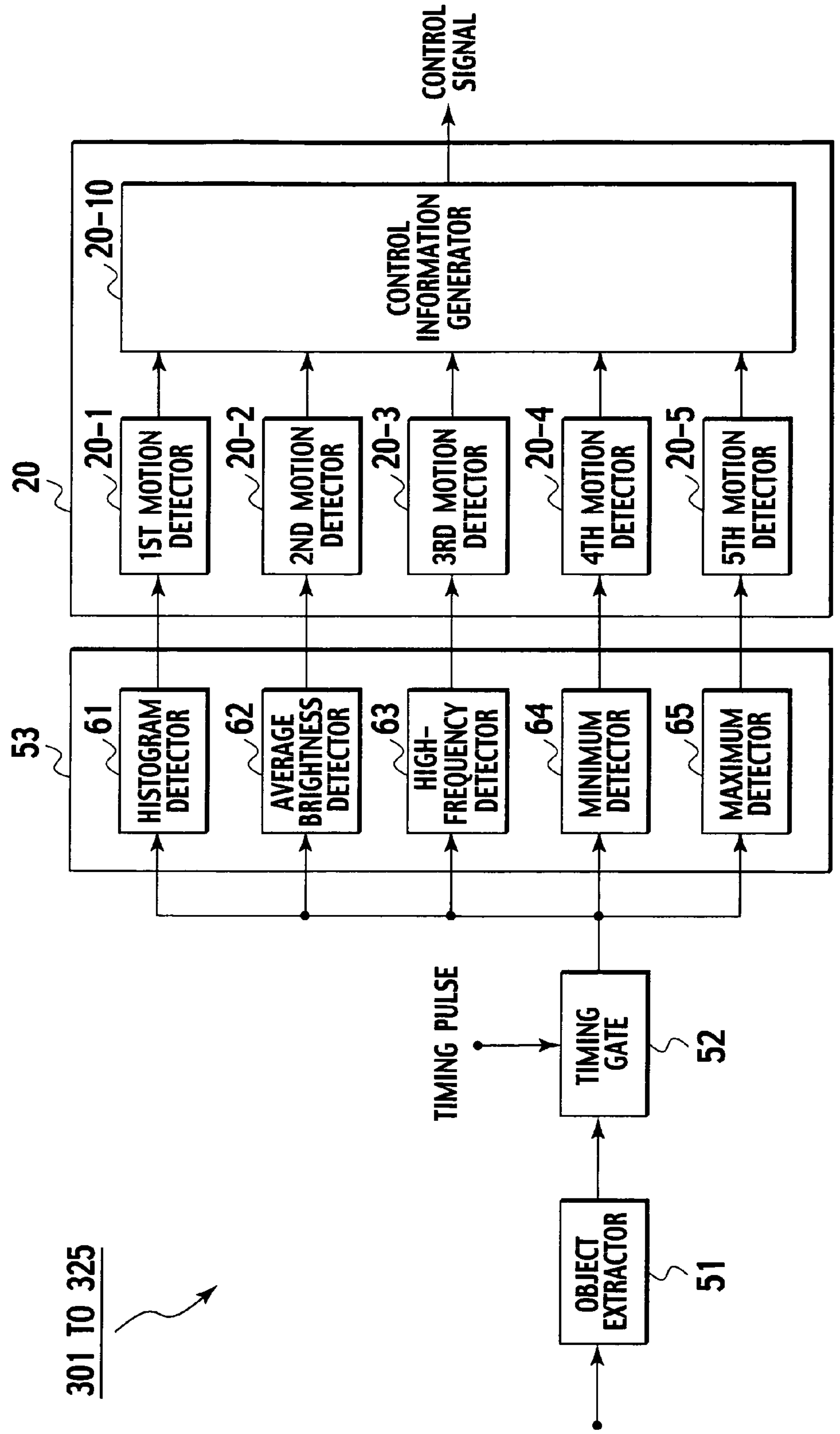
FIG. 15 is a block diagram showing a configuration of a control information determination unit (CPU) shown in FIG. 2.

Based on the signal of the view (A) in FIG. 14, the feature detector 53 carries out a filtering process to detect features. The feature detector 53 contains functional blocks as shown in FIG. 15, to detect various features from an image. The functional blocks include a histogram detector 61, an average brightness (average picture level (APL)) detector 62, a high-frequency detector 63, a minimum detector 64, and a maximum detector 65. An image has other features. According to the embodiment, detection signals generated by the detectors 61 to 65 are used so that the first to fifth motion detectors 20-1 to 20-5 may generate detection signals representative of a hand area detected in the detection zones, to determine whether or not the image includes a hand and recognize a motion of the hand.

The histogram detector 61, average brightness (APL) detector 62, high-frequency detector 63, minimum detector 64, and maximum detector 65 of the embodiment are formed by hardware. These components provide data (detection signals) representative of features in the detection zones field by field or frame by frame, i.e., every vertical period and send the data to the CPU 20 through a CPU bus.

The CPU 20 stores the data sent from the detectors 61 to 65 as variables and processes the variables with software.

The histogram detector 61 separates the gradation levels of a brightness signal provided by the timing gate 52 into, for example, eight stepwise groups, counts the number of pixels belonging to each group, and provides the first motion detector 20-1 with data indicative of a histogram per field or frame. The average brightness detector 62 adds up gradation levels of each field or frame, divides the sum by the number of pixels, and provides the second motion detector 20-2 with the average brightness level of the field or frame.

The high-frequency detector 63 employs a spatial filter (two-dimensional filter) to extract high-frequency components and provides the third motion detector 20-3 with the frequencies of the high-frequency components per field or frame. The minimum detector 64 provides the fourth motion detector 20-4 with a minimum gradation level of the brightness signal of the field or frame. The maximum detector 65 provides the fifth motion detector 20-5 with a maximum gradation level of the brightness signal of the field or frame.

The first to fifth motion detectors 20-1 to 20-5 store the received data as variables and process the variables with software. A hand motion detecting process to be explained later is carried out with software according to the embodiment. The CPU 20 includes a control information generator 20-10 to generate control signals according to detection signals from the first to fifth motion detectors 20-1 to 20-5.

Figure 16A:
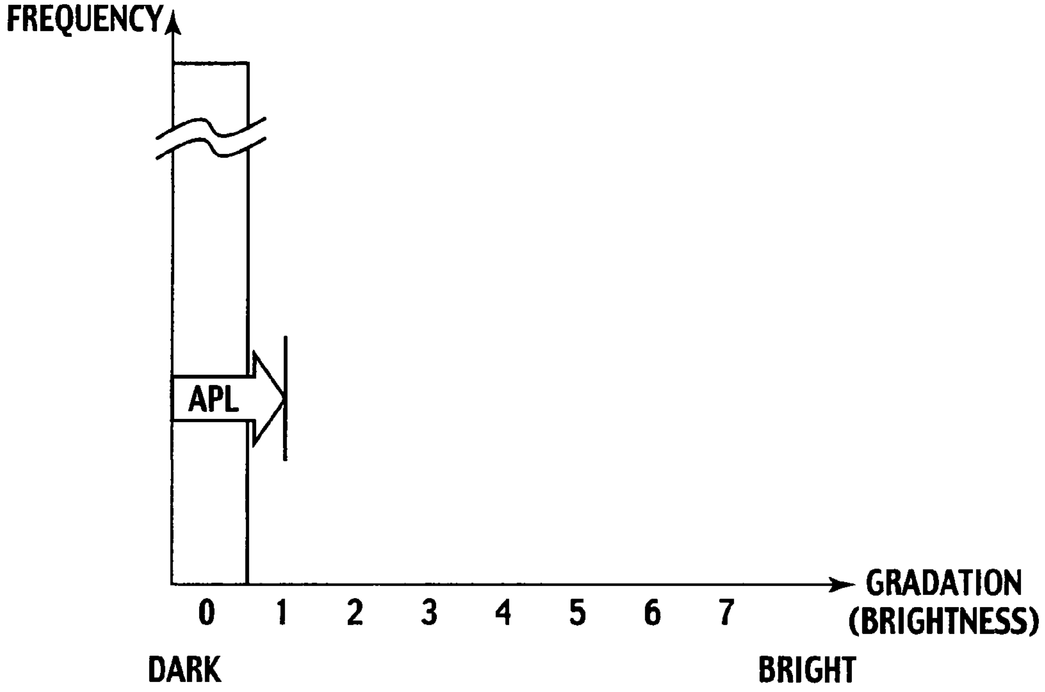
FIGS. 16A and 16B are views showing models of output signals from a histogram detector and an average brightness detector contained in a feature detector shown in FIG. 15.
Figure 16B:
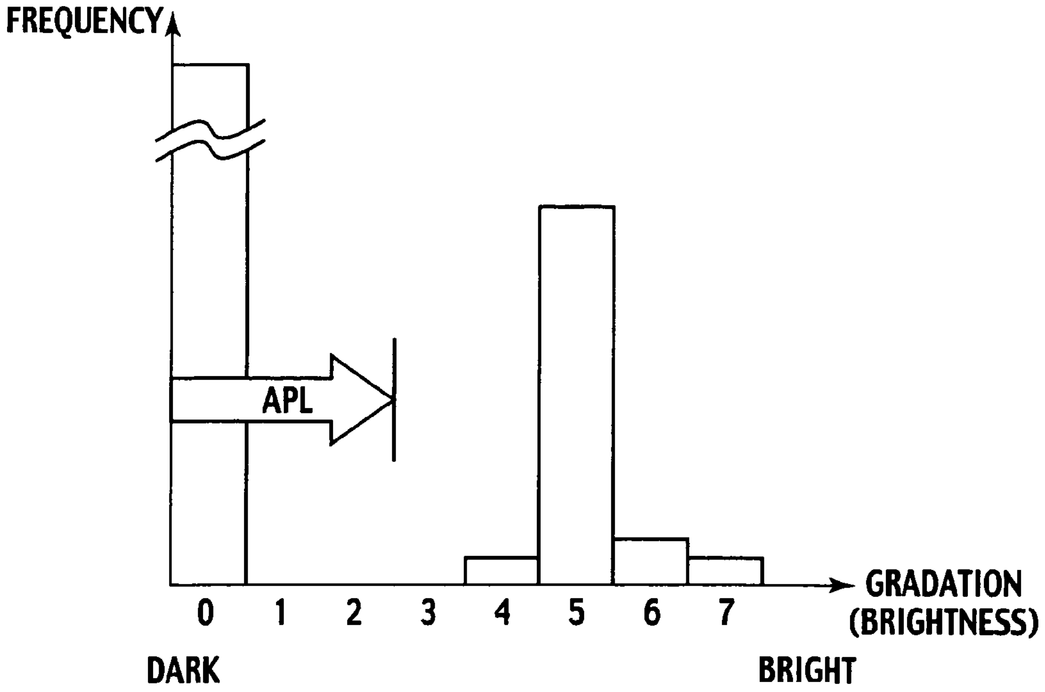

FIGS. 16A and 16B show models of output data from the histogram detector 61 and average brightness detector 62 of the feature detector 53. In each of FIGS. 16A and 16B, an abscissa indicates gradation (brightness) levels separated into eight stepwise groups 0 to 7 and an ordinate indicates the frequency of a gradation level group. The average brightness (APL) is indicated with an arrow so that the size thereof is visible.

FIG. 16A shows outputs from the histogram detector 61 and average brightness detector 62 contained in the 20th detector 320 shown in the view (B) of FIG. 14. In the view (B) of FIG. 14, the hand is not present in the detection zone of the 20th detector 320, and therefore, the first object extractor 51 detects no hand. Namely, an output signal from the first object extractor 51 is masked to represent a black level. This is the reason why the histogram shown in FIG. 16A includes only data of a lowest gradation level of 0. Since the signal from the first object extractor 51 represents only a black level, the APL is zero. However, the APL arrow in FIG. 16 A does not have a zero length but has a short length to clearly indicate the low-level signal.

FIG. 16B shows outputs from the histogram detector 61 and average brightness detector 62 contained in the 21st detector 321 shown in the view (B) of FIG. 14. In the view (B) of FIG. 14, the first object extractor 51 of the 21st detector 321 detects a hand that is present in the detection zone of the detector 321. Accordingly, the output of the histogram detector 61 shown in FIG. 16B includes a distribution of gradation levels corresponding to the brightness of the hand, in addition to a masked black level of gradation level 0. The APL arrow in FIG. 16B is long because of an increased average brightness due to the signal components corresponding to the hand.

According to the embodiment, output data from the histogram detector 61 excluding data of the lowest gradation level (0) is summed up to provide data representative of a hand area in the detection zone. More precisely, the object extractor 51 of a detector assigned to a given detection zone provides an output signal containing an extracted hand. According to the output signal, the histogram detector 61 generates first detection data. According to the first detection data, the first motion detector 20-1 generates second detection data indicative of an area of the extracted hand.

The histogram detector 61 may provide data consisting of two gradation levels including a black level and the other level representative of all components except black. The frequencies of the two gradation levels are calculated to extract a hand that is present in the corresponding detection zone. In this case, first detection data provided by the histogram detector 61 is simplified to have two gradation levels of 0 and the other. Based on this first detection data, second detection data indicative of a hand area is generated.

According to the embodiment, the histogram detector 61 provides first detection data, and according to the first detection data, the first motion detector 20-1 provides second detection data. This does not limit the present invention. The feature detector 53 in each of the detectors 301 to 325 provides first detection data, and according to the first detection data, the CPU 20 generates second detection data.

Figure 17A:
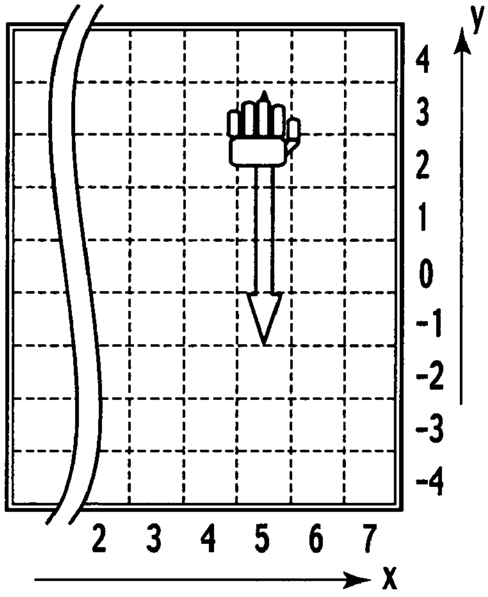
FIGS. 17A to 17D are views explaining relationships between a vertically moving hand displayed on the display and detection zones.
Figure 17B:
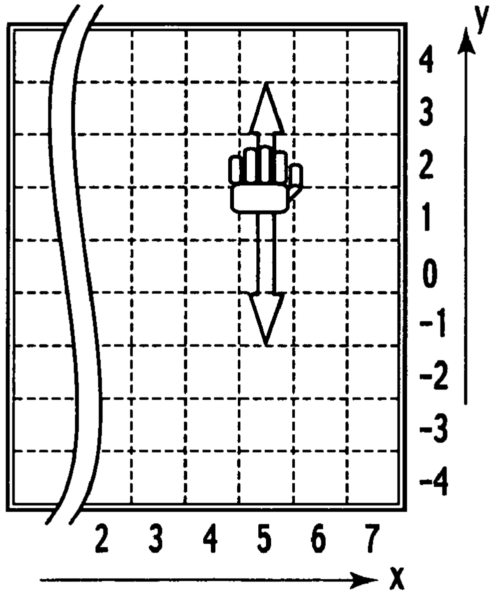
Figure 17C:
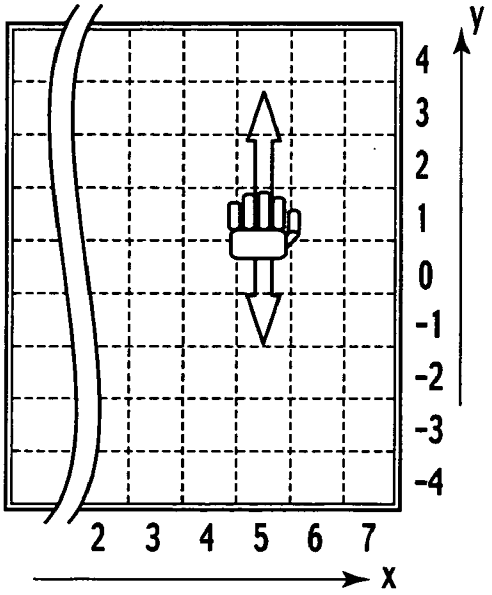
Figure 17D:
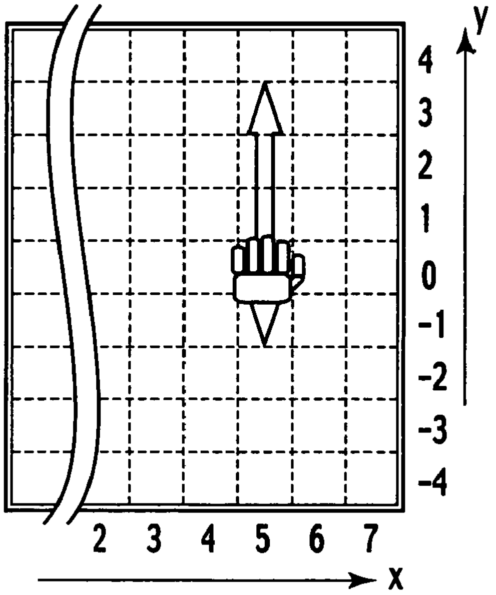

FIGS. 17A to 17D show examples of images of a hand photographed with the video camera 2. In these examples, the user 3 vertically moves the hand in an photographing area of the video camera 2. Moving directions of the hand are indicated with arrows. The detection zones are represented with x- and y-coordinates. FIGS. 17A to 17D show four positions of the moving hand, respectively. In FIG. 17A, the hand is at an uppermost position. In FIG. 17B, the hand is slightly moved downwardly. In FIG. 17C, the hand is farther moved downwardly. In FIG. 17D, the hand is at a lowermost position.

According to the embodiment, the hand is vertically moved four times. Namely, the hand is moved four cycles, each cycle consisting of the motions of FIGS. 17A, 17B, 17C, 17D, 17D, 17C, 17B, and 17A. During the vertical motion, the hand is substantially immobile in the x-axis direction. Namely, the hand is substantially at the same x-coordinate. In connection with the y-axis, the coordinate of the hand varies. Detection data along the y-axis repeats four cycles between the top and bottom peaks, and the detectors assigned to the detection zones on the y-axis provide varying output values.

FIG. 18 is a table showing output values provided by the histogram detectors 61 of the detectors 301 to 325 and data obtained by processing the output values. These data pieces are obtained from the vertical hand motions shown in FIGS. 17A to 17D. The leftmost column of the table shows items and columns on the right side of the leftmost column show data values of the items changing according to time.

"Cycle" in the item column indicates cycle numbers of the vertical hand motion. The table shows first two cycles among the four cycles. In the item column, "n" is an image frame number. A standard video signal involves a frequency of 60 Hz. If an interlace method is employed, one frame consists of two fields and one vertical period is based on a frequency of 60 Hz.

In the item column, "ph" is a position of the vertically moving hand, and A, B, C, and D correspond to the positions shown in FIGS. 17A, 17B, 17C, and 17D, respectively. In the item column, "x(i)" (i=−8 to +7) are second detection data pieces obtained from first detection data pieces provided by the histogram detectors 61 of the first to 16th detectors 301 to 316, respectively. Similarly, "y(j)" (j=−4 to +4) are second detection data pieces obtained from first detection data pieces provided by the histogram detectors 61 of the 17th to 25th detectors 317 to 325, respectively. Here, the first detection data pieces are obtained from the corresponding detection zones, and the second detection data pieces obtained from the first detection data pieces represent hand areas. In the item column, "XVS," "XVSG, " "XG," "YVS," "YVSG, " and "YG" to be explained later in detail are data obtained by processing the data provided by the detectors 301 to 325.

In the examples shown in FIGS. 17A to 17D, the hand is vertically moved. On the x-axis, there is no change in the position of the hand, and therefore, there is no change in the data of the items x(i). As shown in FIGS. 17A to 17D, the hand moves at the x-coordinates of 4 to 6 around the x-coordinate of 5. In the table of FIG. 18, the items x(4), x(5), and x(6) show hand-detected values. The other items x(i) each have 0 because of masking by the first object extractors 51, except the items x(1), y(−2), and y(−3) in the frame number 11.

The example mentioned above is an ideal case. If any object having a skin color is moving in the vicinity of the hand of the user 3, the object is detected at coordinates other than the coordinates of the detection zones in which the hand is detected, to cause noise in detecting the motion of the hand. It is important to suppress such noise and recognize the motion of the hand as control information.

Since the hand is vertically moved, data in the items y(j) vary. In FIG. 17A, the hand is at the y-coordinates of 2 and 3, and therefore, the items y(2) and y(3) in the frame number 0 of FIG. 18 contain detected values. Similarly, the h and detected in FIGS. 17B, 17C, and 17D provide detected values in the corresponding items y(j).

Values of the data (second detection data) in the items x(i) and y(j) of FIG. 18 are based on signals detected by the histogram detectors 61. This embodiment divides a screen of the display 23 by 16 in the x-axis direction and by 9 in the y-axis direction to form the 25 detection zones. The 16 and 9 detection zones cross each other to form 144 sections. If any one section among the 144 sections is totally covered with a hand, it is assumed that the section has a value of 100. Based on this assumption, the scale of each first detection data piece is adjusted to provide a second detection data piece. Namely, the second detection data is generated from the first detection data, which has been produced from an output signal representative of a hand detected in the corresponding detection zone, and indicates an area of the hand in the detection zone.

As mentioned above, outputs from the first to 25th detectors 301 to 325 are used to provide the second detection data. The second detection data pieces are summed up to provide data indicative of a barycentric shift. According to the embodiment, changes in the barycentric data are more important than changes in the second detection data. Based on output signals from the detection zones in which a hand is detected, a barycenter of the hand-detected detection zones, or a barycenter of the hand is found and evaluated.

In a frame number "n," a barycenter XG of the hand on the x-axis is found as follows:

$$XG(n) = \frac{XVSG(n)}{XVS(n)} = \frac{\sum_{i=-8}^{7} i \times x(n, i)}{\sum_{i=-8}^{7} x(n, i)} \tag{1}$$

where XVS is the sum total of second detection data calculated from output signals of the first object extractors 51 of the x-axis detectors (first to 16th detectors 301 to 316) and XVSG is the sum total of values obtained by multiplying the second detection data derived from the x-axis detectors by the x-coordinates of the corresponding detection zones.

In FIG. 18, values in the item XG each are 5 except the frame number 11, and therefore, the x-coordinate of the barycenter of the hand is 5. Around the x-coordinate of 5, data related to the hand is distributed.

In the frame number "n," a barycenter YG of the hand on the y-axis is found as follows:

$$YG(n) = \frac{YVSG(n)}{YVS(n)} = \frac{\sum_{j=-4}^{4} j \times y(n, j)}{\sum_{j=-4}^{4} y(n, j)} \tag{2}$$

where YVS is the sum total of second detection data related to the y-axis detectors (17th to 25th detectors 317 to 325) and YVSG is the sum total of values obtained by multiplying the second detection data derived from the y-axis detectors by the y-coordinates of the corresponding detection zones.

In FIG. 18, a value in the item YG in the frame number 0 is 2.5 to indicate that the barycenter of the hand has the y-coordinate of 2.5. In each of the other frames, a value in the item YG indicates a y-coordinate of the barycenter of the hand in the frame. In the example of FIG. 18, values in the item YG are within the range of 0 to 2.5 except the frame number 11. Variations in the values of the item YG indicate that the hand is vertically moving.

Figure 19:
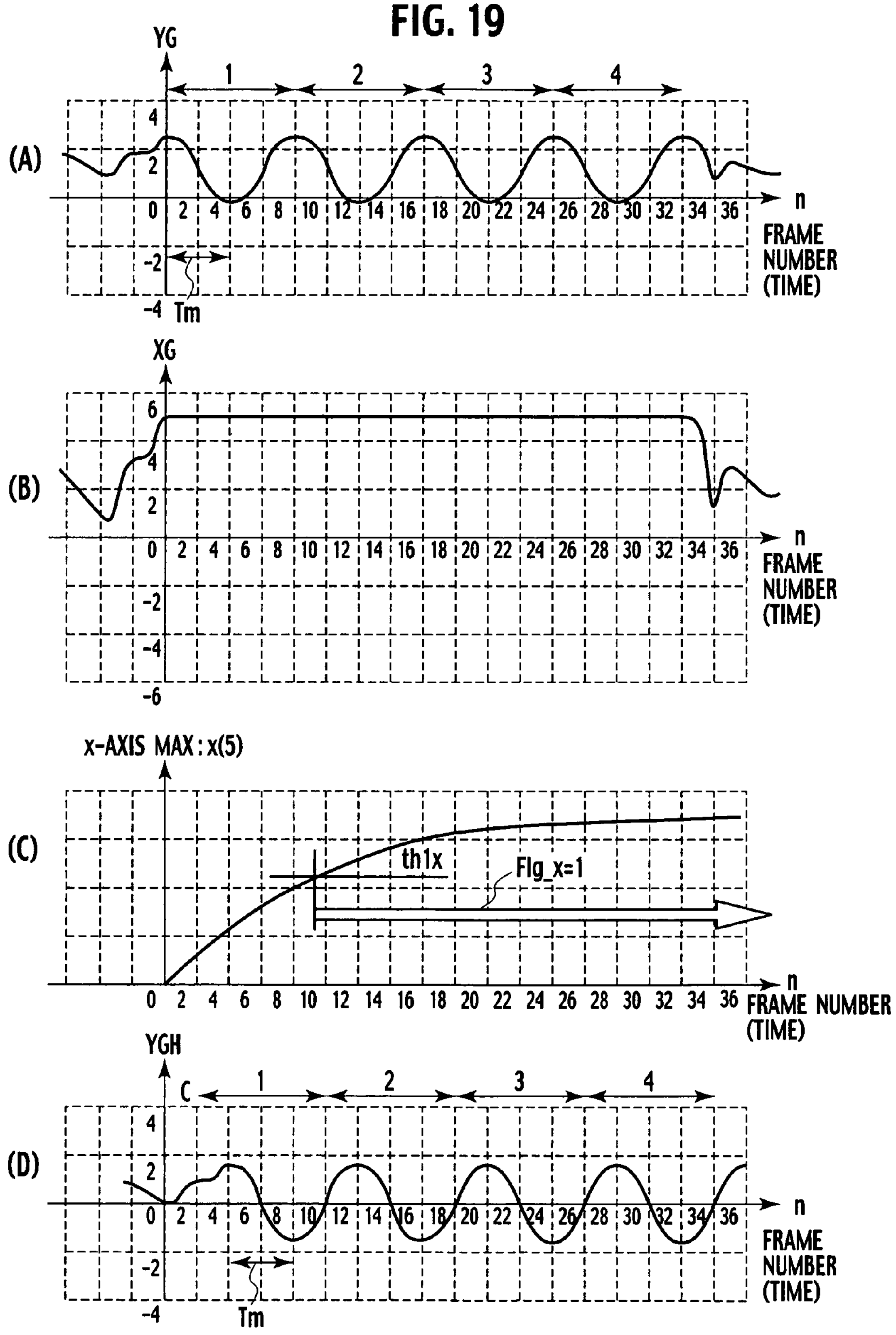
FIG. 19 is time charts showing changes in the barycentric coordinates of the vertically moving hand.

This embodiment analyzes the variations in the barycenter YG to recognize a hand motion and uses it as control information. FIG. 19 shows time charts showing variations in the coordinates of the barycenter of the hand. The chart (A) in FIG. 19 shows y-coordinate variations of the barycenter of the hand corresponding to the values in the item YG of FIG. 18. The chart (A) waves between 0 and 2.5 in four cycles. The chart (B) in FIG. 19 shows x-coordinate variations of the barycenter of the hand corresponding to the values in the item XG of FIG. 18. As shown in FIGS. 17A to 17D, the hand is vertically moved around the barycenter having the x-coordinate of 5 and no variations are observed in a horizontal direction. Accordingly, the x-axis variations show a straight line at a constant level in principle as shown in the chart (B) of FIG. 19.

The waveforms of FIG. 19 are analyzed along the x- and y-axes. Before that, a protection against erroneous recognition will be explained. In FIG. 18, the first cycle shows ideal data obtained when a hand is vertically moved. The hand is extracted at the x-coordinates of 4, 5, and 6, and at the other x-coordinates, each data piece in the items x(i) is zero. Similarly, each y-coordinate is zero except for the y-coordinates corresponding to the detection zones in which the hand has been detected. In practice, however, unwanted data (noise) other than data related to the hand is sometimes passed through the various filtering processes of the first object extractor 51.

In the second cycle of FIG. 18, the frame number 11 involves a second detection data piece having a hand area value of 100 in the item x(1), a second detection data piece having a hand area value of 50 in the item y(−2), and a second detection data piece having a hand area value of 50 in the item y(−3). These data pieces may deviate the barycenter coordinates of the detected hand. As shown in FIG. 17A to 17D, the x-coordinate of the barycenter of the hand is constant at 5. However, the value in the item XG of the frame number 11 in FIG. 18 is 3.361. The y-coordinate of the barycenter of the hand in the frame number 11 must be zero in the item YG like in the frame number 3. Actually, it is −1.02 in FIG. 18. These values indicate that the noise has an influence on the x- and y-axes.

If the noise is singular, it may be suppressed with a discrete point removing filter (median filter) frequently used in digital signal processing. If there is noise that passes through the filter or if there are a large number of noise components, the noise will deteriorate a recognition rate.

To effectively suppress noise, the embodiment closes the timing gates 52 of unnecessary detectors. In the table of FIG. 18, the second detection data pieces of each of the x-axis detectors 301 to 316 and y-axis detectors 317 to 325 are accumulated and the CPU 20 finds any detector whose cumulative value first exceeds a threshold (th1x for the x-axis detectors and th1y for the y-axis detectors). Namely, a detector that shows a maximum value is found.

In the table of FIG. 18, the second detection data derived from the first detection data provided by any one of the y-axis detectors 317 to 325 varies and the corresponding cumulative value never exceeds the threshold th1y. On the other hand, the second detection data in the item x(5) related to the 14th detector 314 at the x-coordinate of 5 shows a maximum value and the cumulative value thereof exceeds the threshold th1x at a certain time point. The CPU 20 finds this detector and determines that the hand motion is a vertical motion. For the sake of simplicity, the second detection data derived from the first detection data provided by a given detector is referred to as the second detection data of the given detector.

The chart (C) of FIG. 19 shows an accumulation of the second detection data x(5) of the 14th detector 314 at the x-coordinate of 5. The cumulative value of the detector 314 exceeds the threshold th1x in the frame 9. At this time point, an activation flag Flg_x is set from 0 to 1 and is kept at 1 for a predetermined period. Namely, the CPU 20 serves as a flag generator and generates the flag $Flg_{\_x}$ when any x-coordinate cumulative value exceeds the threshold th1x. During the period in which the flag Flg_x is 1, no object is detected in unnecessary detection zones or sections. In the example, the cumulative value exceeds the threshold th1x in the frame 9. Any cumulative value may exceed the threshold th1x within a predetermined period, to set the flag Flg_x.

The period in which the flag Flg_x is kept at 1 is defined as an activation period. The activation period is a duration necessary for recognizing a hand motion and covers, for example, four cycles. The chart (D) of FIG. 19 will be explained later.

Figure 21:
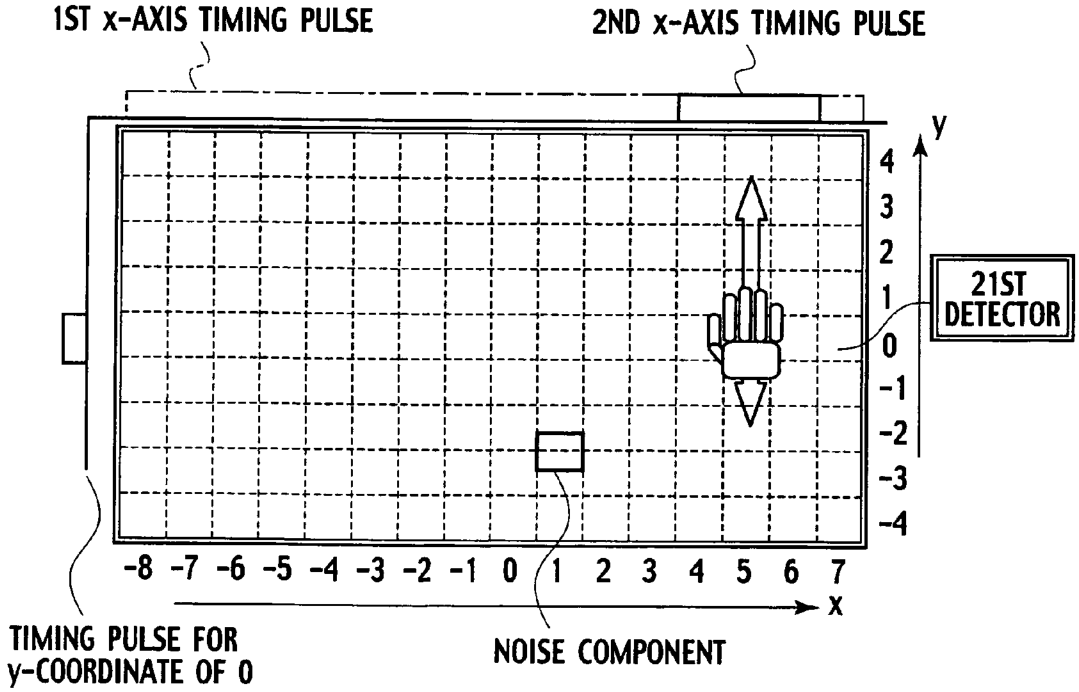
FIG. 21 is a view showing a screen and timing pulses to limit detection zones based on an activation flag (Flg_x)

FIG. 21 explains detection zones to be enabled. According to the embodiment, the enabled detection zones are used to detect a hand motion. In FIG. 21, a hand photographed with the video camera 2 vertically moves at the x-coordinate of 5. Also shown in FIG. 21 are a noise component depicted with a black frame and a timing pulse supplied to control the 21st detector 321.

A first x-axis timing pulse depicted with a dash-and-dot line along the x-axis has a pulse width covering a horizontal width of an effective image period. This first x-axis pulse is supplied to all the y-axis detectors (17th to 25th detectors 317 to 325) when the user 3 starts to move the hand.

When a cumulative value of a given detector exceeds the threshold th1x, the flag Flg_x is set to 1. Then, a second x-axis timing pulse depicted with a continuous line is generated. The second x-axis timing pulse has a pulse width covering a certain horizontal part of the effective image period and is supplied to all the y-axis detectors 317 to 325. According to the second x-axis timing pulse, the y-axis detectors 317 to 325 provide detection signals for a minimum number of detection sections necessary for detecting a hand.

A technique of generating the second x-axis timing pulse will be explained with reference to FIG. 22. Initially, the first x-axis timing pulse is supplied to the y-axis detectors 317 to 325. The first x-axis timing pulse entirely enables the x-axis width of the detection zones of the y-axis detectors 317 to 325.

When the hand motion of FIG. 21 is extracted in the detection zone of the x-coordinate of 5, the second data of the 14th detector 314 assigned to the detection zone of the x-coordinate of 5 continuously takes a maximum value (FIG. 18) When a cumulative value of the second detection data of the 14th detector 314 exceeds the threshold th1x, the CPU 20 sets the flag Flg_x to 1 and changes x-axis control data for the detection zone of the x-coordinate of 5 to 1.

The size of the hand displayed on the display 23 changes depending on a distance between the video camera 2 and the user 3. Accordingly, this embodiment sets "1" for the x-axis control data for the detection zone to which the flag-activated detector is assigned, as well as for x-axis control data for detection zones in the vicinity of the flag-activated detection zone. For example, x-axis control data for the detection zones of the x-coordinates of 4 to 6 is set to 1. At the same time, x-axis control data for the remaining detection zones is set to 0.

The CPU 20 supplies the above-mentioned x-axis control data to the timing pulse generator 12. Based on the x-axis control data, an x-axis timing pulse activator 12*x* in the timing pulse generator 12 generates the second x-axis timing pulse and supplies the same to all the y-axis detectors 317 to 325. In the example of FIG. 21, the second x-axis timing pulse has a pulse width covering the detection zones of the x-coordinates of 4, 5, and 6. In this way, the timing pulse generator 12 generates the second x-axis timing pulse whose pulse width is narrower than the first x-axis timing pulse. In response to the second x-axis timing pulse, the y-axis detectors 317 to 325 provide detection signals only for the detection sections crossing the x-coordinates of 4, 5, and 6. As a result, the noise components at the coordinates (x, y) of (1, −2) and (1, −3) shown in FIG. 21 are not detected.

After the generation of the second x-axis timing pulse, the CPU 20 carries out control according to outputs from the y-axis detectors 317 to 325 without referring to detection signals from the x-axis detectors 301 to 316. It is possible to supply no timing pulses to the timing gates 52 of the x-axis detectors 301 to 316 so that these detectors may provide no detection signals.

Figure 23:
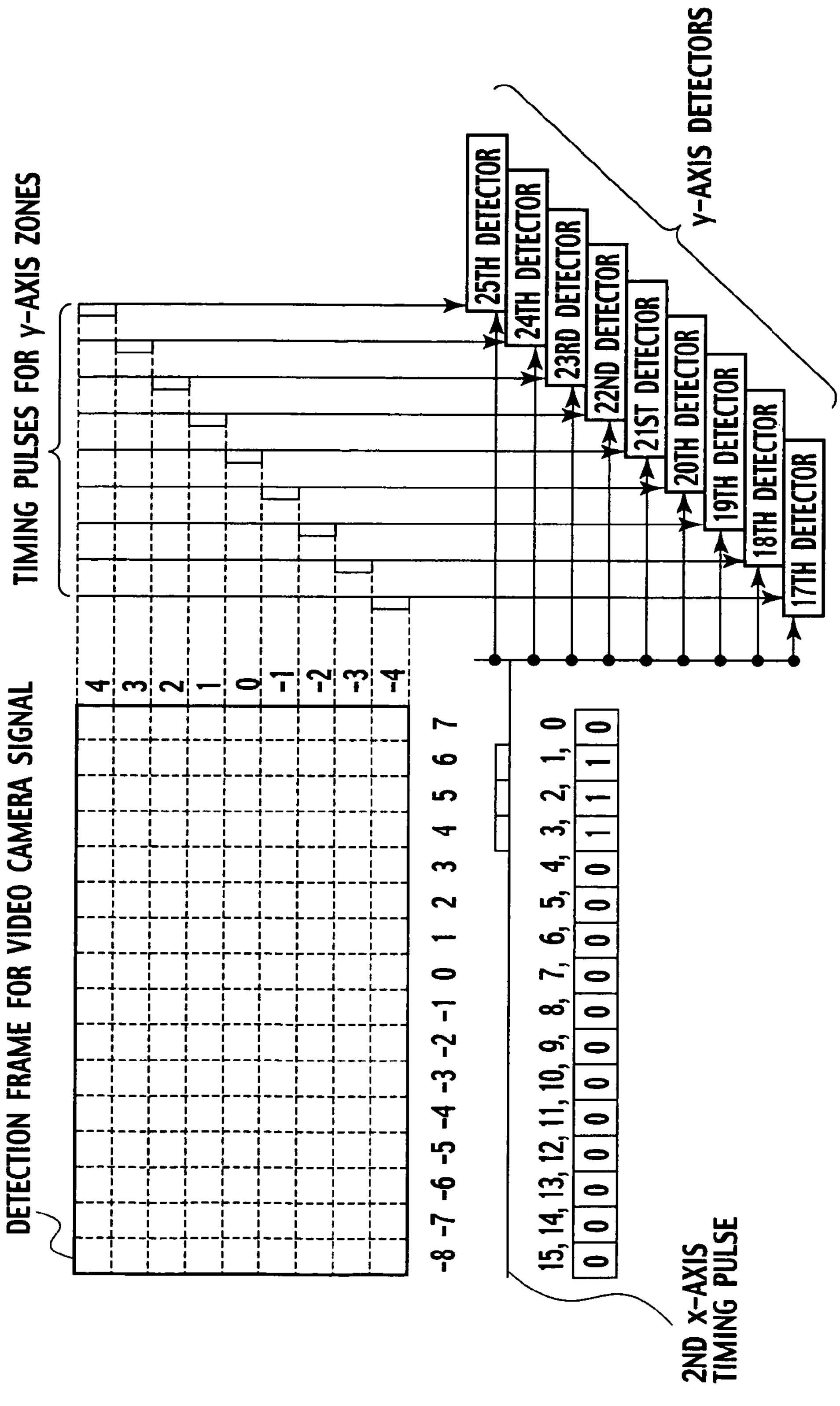
FIG. 23 is a view explaining x- and y-axis timing pulses to control the y-axis detectors.

FIG. 23 shows the second x-axis timing pulse supplied to the y-axis detectors 317 (17th) to 325 (25th) and y-axis timing pulses for the detection zones to which the y-axis detectors 317 to 325 are assigned. Each of the y-axis detectors 317 to 325 may output a detection signal related to the three sections where the detection zone of the detector in question crosses the x-coordinates of 4, 5, and 6. This results in not detecting unnecessary sections where no hand is detected.

Figure 22:
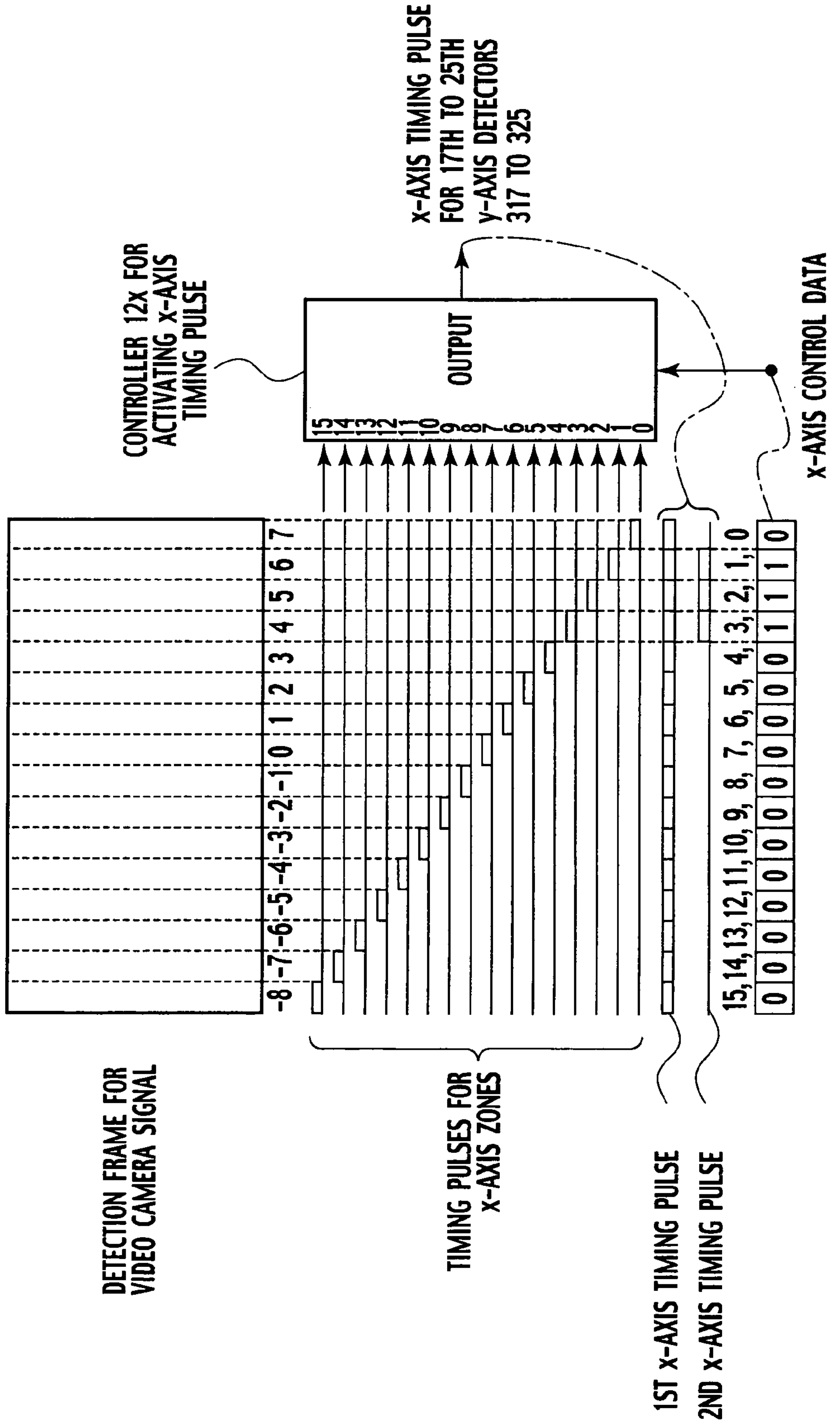
FIG. 22 is a view explaining a technique of generating x-axis timing pulses for the y-axis detectors.

As shown in FIGS. 22 and 23, the embodiment controls a pulse width in units of detection zones. The present invention can employ any technique of flexibly controlling a pulse width, for example, a technique of specifying a pulse start point and a pulse width.

FIG. 24 is a table similar to that of FIG. 18. Second detection data pieces shown in FIG. 24 are based on output signals from the detectors 301 to 325 that operate according to the second x-axis timing pulse after the 14th detector 314 sets the flag Flg_x to 1 as shown in the chart (C) of FIG. 19. Namely, detection data from unnecessary detection sections and zones are suppressed in the table of FIG. 24. In the chart (C) of FIG. 19, the cumulative value of the detector 314 exceeds the threshold th1x in the frame number 10. Accordingly, the second detection data after the frame number 10 in FIG. 24 are the unnecessary-data-limited data. In the frame number 11 of FIG. 24, data pieces in the items x(1), y(−3), and y(−2), which contain noise in the table of FIG. 18, are each zero. This is because the sections having the coordinates (x, y) of (1, −2) and (1, −3) provide no detection data due to the second x-axis timing pulse supplied to the timing gates 52 of the corresponding 18th detector 318 and 19th detector 319.

Removing the noise components results in stabilizing the barycentric values XG and YG, and therefore, the first to fifth motion detectors 20-1 to 20-5 arranged after the y-axis detectors 317 to 325 can improve a recognition rate. The influence of the noise may present up to the frame 9. However, a main purpose up to the frame 9 is to set the flag Flg_x, and therefore, any noise that may not vary a maximum cumulative value will not affect hand motion detection.

The first to fifth motion detectors 20-1 to 20-5 in the CPU 20 receive the data shown in FIG. 24 and process the data. Returning to FIG. 19, a process of detecting a hand motion will be explained.

The chart (A) of FIG. 19 shows variations in the y-coordinate YG of the barycenter and the chart (B) of FIG. 19 shows variations in the x-coordinate XG of the barycenter. The waveforms of the charts (A) and (B) involve no noise. The chart (C) of FIG. 19 shows a cumulative value of the output signal of the 14th x-axis detector 314. When the cumulative value exceeds the threshold th1x, the flag Flg_x is set to 1. Sections where the detection zone corresponding to the flag-generated detector and the vertical detection zones in the vicinity of the flag-generated-detector-corresponding detection zone cross the horizontal detection zones are defined as enabled detection sections. The detection sections other than the enabled detection sections are disabled by the second x-axis timing pulse supplied to the y-axis detectors 317 to 325. Namely, the disabled detection sections are not used for detecting a hand, and therefore, the hand detecting operation is not affected by noise.

If the waveform shown in the chart (C) of FIG. 19 continuously exceeds the threshold th1x, the second x-axis timing pulse is continuously supplied to the y-axis detectors 317 to 325, to continuously disable the unnecessary detection sections, thereby continuously avoiding the influence of noise. If the waveform shown in the chart (C) of FIG. 19 drops below the threshold th1x, the cumulative value is reset. A reference value to reset the cumulative value is not limited to the threshold th1x.

Thereafter, the waveform shown in the chart (A) of FIG. 19 is subjected to a DC offset suppressing process to make an average of the waveform substantially zero. This process employs a high-pass filter shown in FIG. 20.

Figure 20:
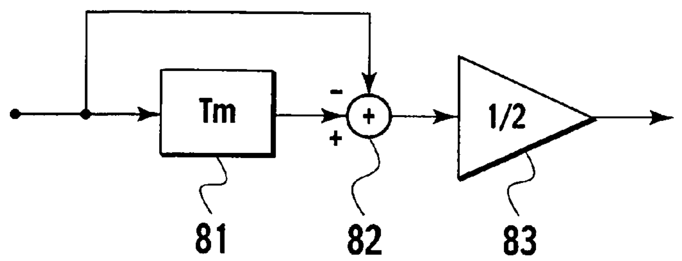
FIG. 20 is a block diagram showing a configuration of a high-pass filter.

In FIG. 20, a delay unit 81 enforces a delay of four frames (time Tm) according to this embodiment. A subtracter 82 finds a difference between the delayed signal and a signal that is not delayed. Here, a sign is not important to obtain a final result. Lastly, a ½ multiplier 83 adjusts scale. The waveform shown in the chart (A) of FIG. 19 is passed through the high-pass filter of FIG. 20 into the waveform shown in the chart (D) of FIG. 19 having an average of nearly zero. This high-pass filtering eliminates y-axis positional information and provides a wave form appropriate for analyzing a hand motion. In the chart (D) of FIG. 19, the barycenter YGH on the ordinate is obtained by carrying out the high-pass filtering on the barycenter YG on the ordinate of the chart (A) of FIG. 19.

Returning to FIG. 15, the first to fifth motion detectors 20-1 to 20-5 will be explained. The motion detectors 20-1 to 20-5 are provided with a cross-correlation digital filter (not shown). According to the embodiment, a hand must vertically or horizontally be moved four times to recognize a motion of the hand, and hand motions to be recognized are predetermined. The cross-correlation digital filter finds a cross-correlation between a typical signal waveform representative of a predetermined motion (vertical motion) and a detection signal waveform that is generated by the motion detectors 20-1 to 20-5 according to detection signals from the detectors 301 to 325. According to the cross-correlation, a coincidence degree is evaluated to recognize a hand motion and control information corresponding to the hand motion.

Figure 25:
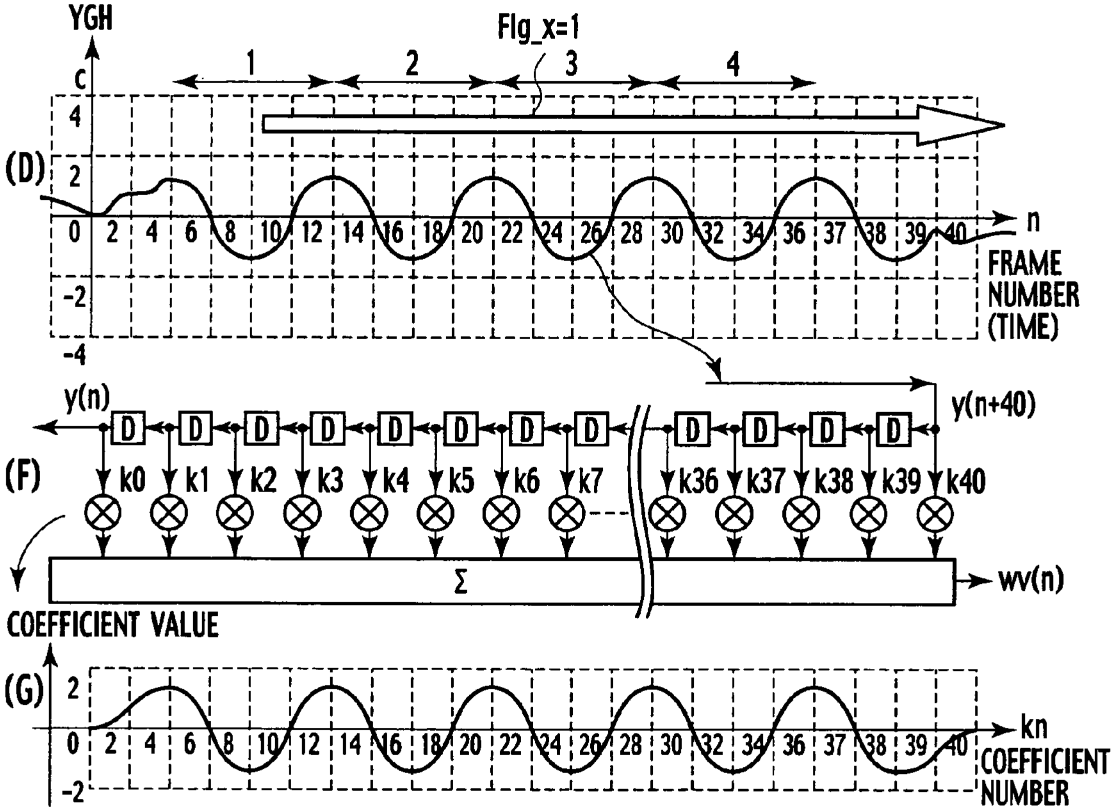
FIG. 25 is a view explaining a cross-correlation digital filter for a vertical hand motion.

According to the embodiment, a waveform shown in a chart (G) of FIG. 25 is used as a reference waveform representative of a vertical hand motion, i.e., a typical signal waveform representative of a given motion. In (F) of FIG. 25, there are shown tap coefficients k0 to k40 of the cross-correlation digital filter corresponding to the reference waveform shown in the chart (G) of FIG. 25. A chart (D) of FIG. 25 shows a detected signal waveform supplied to the cross-correlation digital filter kn. The waveform in the chart (D) of FIG. 25 is equal to that shown in the chart (D) of FIG. 19. The cross-correlation digital filter multiplies the second detection signal of the chart (D) of FIG. 25 by the tap coefficients and the first to fifth motion detectors 20-1 to 20-5 check an output signal of the cross-correlation digital filter, to see if the hand motion of the user 3 is the vertical hand motion. The output signal wv (n) of the cross-correlation digital filter kn is obtained as follows:

$$wv(n) = \sum_{i=0}^{N-1} y(n+i)k(i) \tag{3}$$

where N is the number of taps of the digital filter, i.e., 41 (0 to 40) in this example and y(n+i) is the filtered barycenter YGH on the ordinate of the chart (D) of FIG. 25. The cross-correlation digital filter kn is operated only when the flag Flg_x is at 1.

Figure 26:
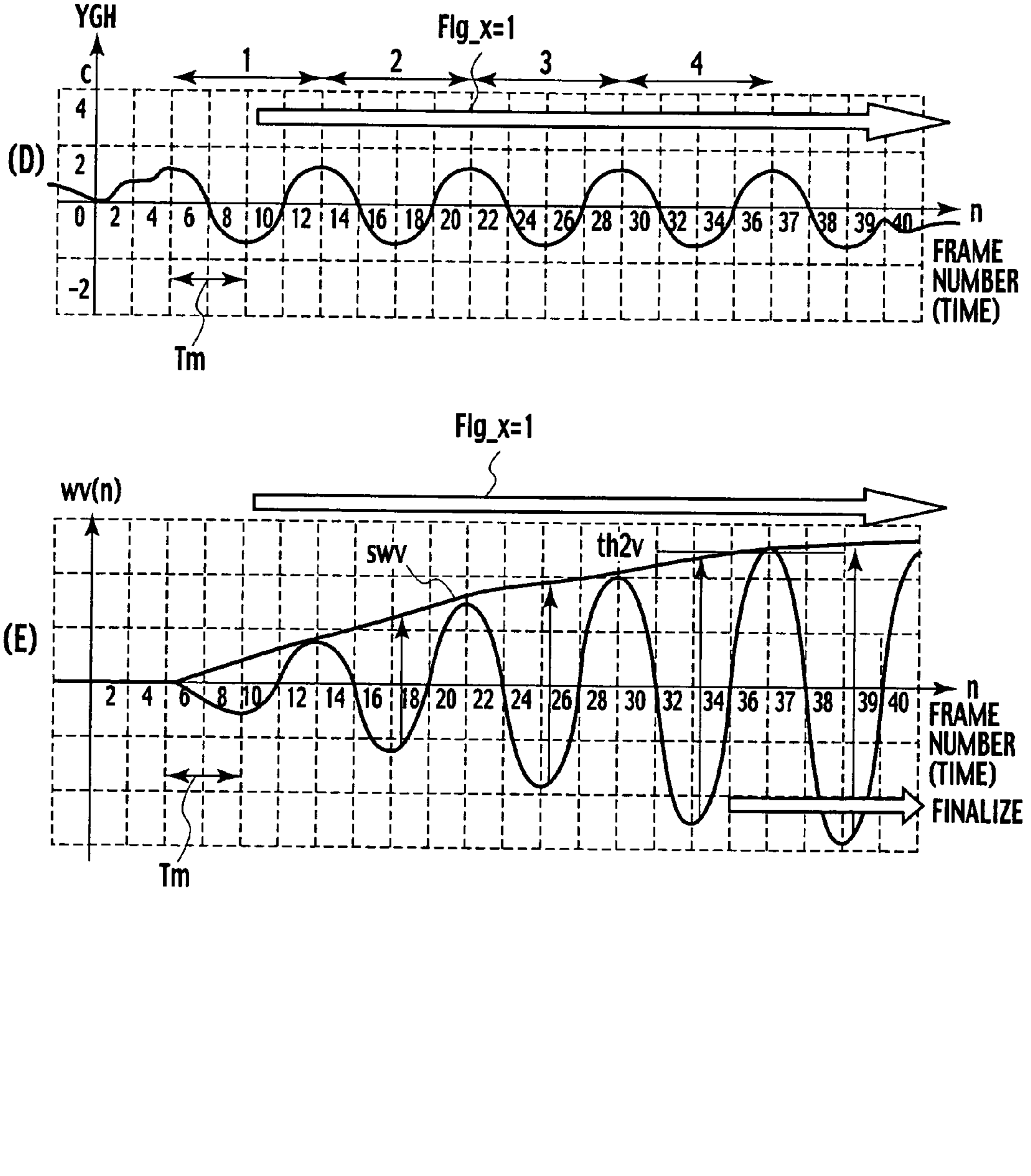
FIG. 26 is time charts showing changes in the output of the cross-correlation digital filter for a vertical hand motion.

The output signal wv (n) of the cross-correlation digital filter has a waveform shown in a chart (E) of FIG. 26. The amplitude of the waveform increases as the coincidence degree of the cross-correlation increases. A waveform shown in a chart (D) of FIG. 26 is the same as those of the charts (D) of FIGS. 19 and 25 and serves as a comparison object for the waveform shown in the chart (E) of FIG. 26. The absolute values of the output signal wv(n) are accumulated. When the cumulative value reaches a threshold th2v, it is determined that a correlation with the reference waveform is sufficient and that a predetermined motion (vertical motion in this example) has been made. In this way, the first to fifth motion detectors 20-1 to 20-5 determine, according to the detection signals provided by the detection unit 19, whether or not the motion of the user 3 is the predetermined motion.

If the detected motion is recognized as a vertical hand motion and if the flag Flg_x serving as a protection window is 1, the vertical hand motion is finalized and a control event corresponding to the vertical hand motion is carried out according to a state of the television set 1. The control event is carried out according to an output signal from the control information generator 20-10 that logically determines when any one of the motion detectors 20-1 to 20-5 is finalized.

Figure 27A:
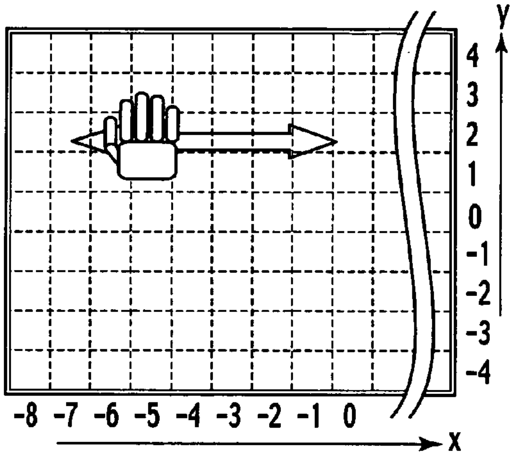
FIGS. 27A to 27D are view explaining relationships between a horizontally moving hand displayed on the display and the detection zones.
Figure 27B:
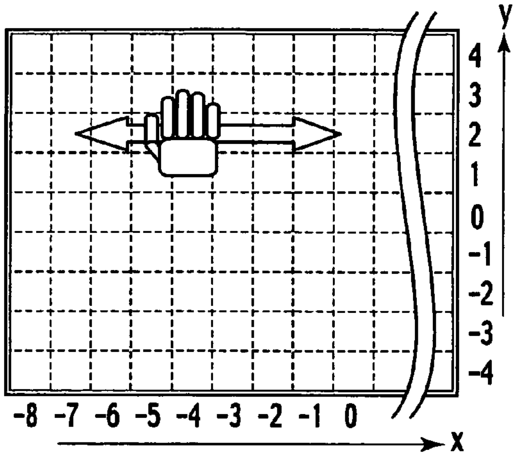
Figure 27C:
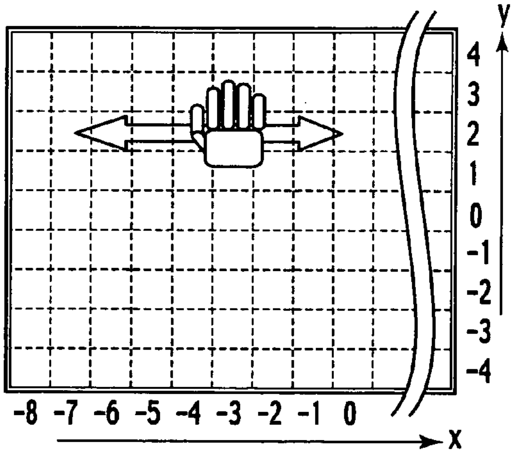
Figure 27D:
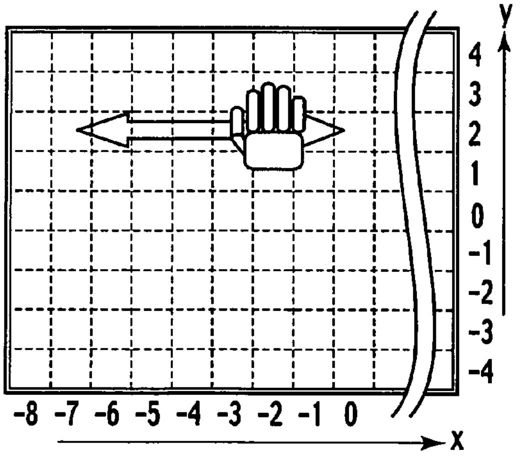

Next, a horizontal hand motion (bye-bye motion) will be explained. The embodiment automatically distinguishes the vertical and horizontal hand motions from each other. FIGS. 27A to 27D show examples of images of a hand photographed with the video camera 2. In these examples, the user 3 horizontally moves the hand in an photographing area of the video camera 2. Moving directions of the hand are indicated with arrows. The detection zones are represented with x- and y-coordinates. FIGS. 27A to 27D show four positions of the moving hand, respectively. In FIG. 27A, the hand is at a leftmost position. In FIG. 27B, the hand is slightly moved rightward. In FIG. 27C, the hand is farther moved rightward. In FIG. 27D, the hand is at a rightmost position.

According to the embodiment, the hand is horizontally moved four times. Namely, the hand is moved four cycles, each cycle consisting of the motions of FIGS. 27A, 27B, 27C, 27D, 27D, 27C, 27B, and 27A. During the horizontal motion, the hand is substantially immobile in the y-axis direction. Namely, the hand is substantially at the same y-coordinate. In connection with the x-axis, the coordinate of the hand varies. Detection data along the x-axis repeats four cycles between the left and right peaks, and the detectors assigned to the detection zones on the x-axis provide varying output values.

FIG. 28 is a table showing output values provided by the histogram detectors 61 of the detectors 301 to 325 and data obtained by processing the output values. These data pieces are obtained from the horizontal hand motions shown in FIGS. 27A to 27D. The table of FIG. 28 is in the same form as that of FIG. 18 and represents the horizontal hand motions.

In the examples shown in FIGS. 27A to 27D, the hand is horizontally moved. On the y-axis, there is no change in the position of the hand, and therefore, there is no change in the data of the items y(j) (j=−4 to +4). As shown in FIGS. 27A to 27D, the hand moves at the y-coordinates of 1 to 3 around the y-coordinate of 2. In the table of FIG. 28, the items y(1), y(2), and y(3) show hand-detected values. The other items y(j) each have 0 because of masking by the first object extractors 51, except the items x(7), x(4), and y(−1) in the frame number 11.

Since the hand is horizontally moved, data in the items x(i) vary. In FIG. 27A, the hand is at the x-coordinates of −6, −5, and −4, and therefore, the items x(−6), x(−5), and x(−4) in the frame number 0 of FIG. 28 contain detected values. Similarly, the hand detected in FIGS. 27B, 27C, and 27D provide detected values in the corresponding items x(i).

In a frame number "n," a barycenter XG of the hand on the x-axis is found according to the expression (1) mentioned above.

In FIG. 28, a value in the item XG in the frame number 0 is −5.3 to indicate that the barycenter of the hand has the x-coordinate of −5.3. In each of the other frames, a value in the item XG indicates an x-coordinate of the barycenter of the hand in the frame. In the example of FIG. 28, values in the item XG are within the range of −5.3 to −2.3 except the frame number 11. Variations in the values of the item XG indicate that the hand is horizontally moved.

In the frame number "n, " a barycenter YG of the hand on the y-axis is found according to the expression (2) mentioned above. In FIG. 28, values in the item YG each are 2.19 except the frame number 11, and therefore, the y-coordinate of the barycenter of the hand is 2.19. Around the y-coordinate of 2.19, data related to the hand is distributed.

Figure 29:
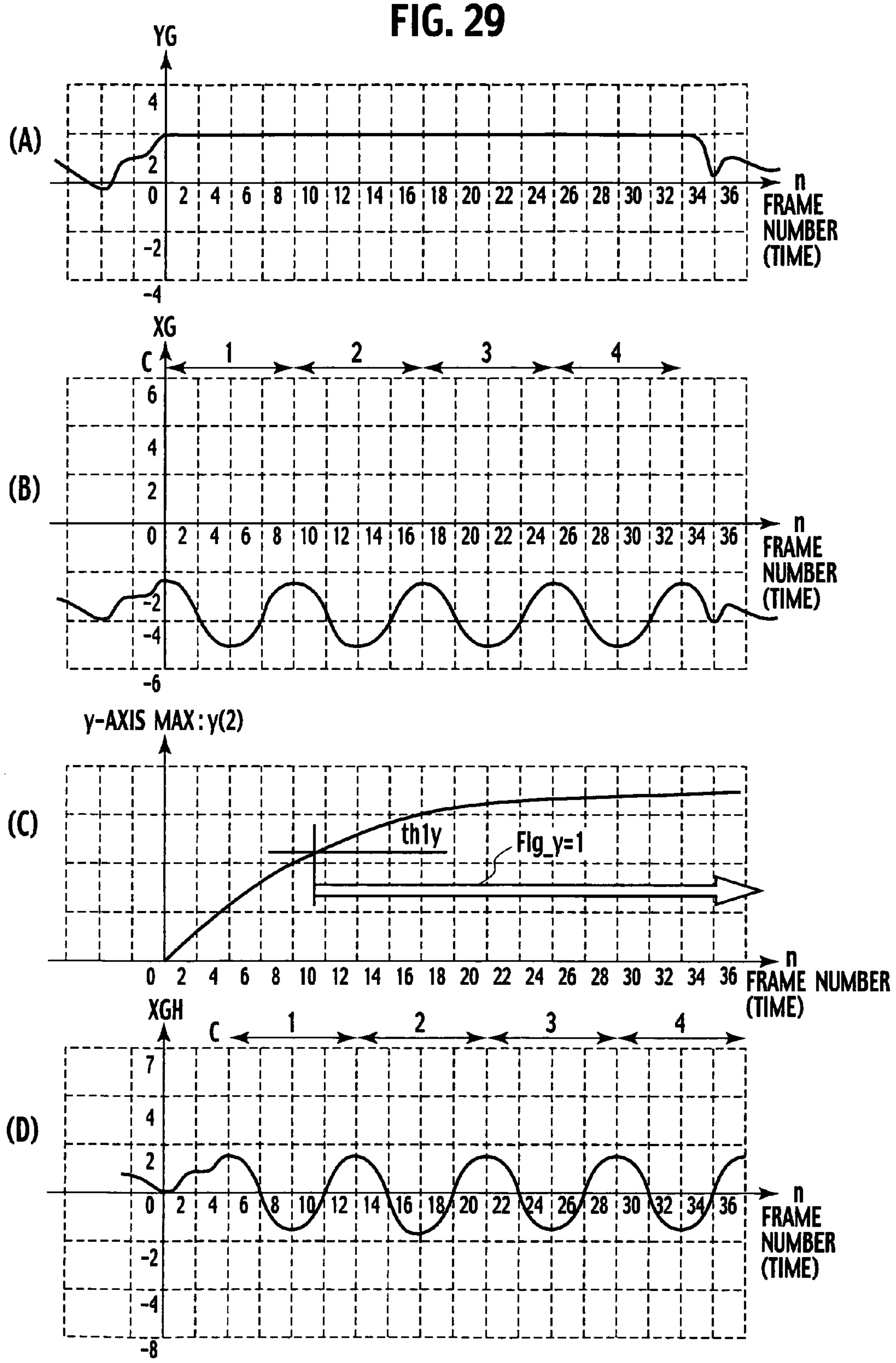
FIG. 29 is time charts showing changes in the barycentric coordinates of the horizontally moving hand.

FIG. 29 shows time charts showing variations in the coordinates of the barycenter of the hand. A chart (A) in FIG. 29 shows y-coordinate variations of the barycenter of the hand corresponding to the values in the item YG of FIG. 28. As shown in FIGS. 27A to 27D, the hand is horizontally moved around the barycenter having the y-coordinate of 2.19 and no variations are observed in a vertical direction. Accordingly, the y-axis variations show a straight line at a constant level in principle as shown in the chart (A) of FIG. 29. A chart (B) in FIG. 29 shows x-coordinate variations of the barycenter of the hand corresponding to the values in the item XG of FIG. 28. The chart (B) waves between −5.3 and −2.3 in four cycles.

The waveforms of FIG. 29 are analyzed along the x- and y-axes. In FIG. 28, the first cycle shows ideal data obtained when a hand is horizontally moved. The hand is extracted at the y-coordinates of 1, 2, and 3, and at the other y-coordinates, each data piece in the item y(j) is zero. Similarly, each x-coordinate is zero except for the x-coordinates corresponding to the detection zones in which the hand has been detected.

In the second cycle of FIG. 28, the frame number 11 involves a second detection data piece having a hand area value of 120 in the item y(−1), a second detection data piece having a hand area value of 50 in the item x(4), and a second detection data piece having a hand area value of 70 in the item x(7). These data pieces may deviate the barycenter coordinates of the detected hand. As shown in FIG. 28, the y-coordinate of the barycenter of the hand is constant at 2.19. However, the value in the item YG of the frame number 11 in FIG. 28 is 1.351. The x-coordinate of the barycenter of the hand in the frame number 11 must be −2.3 in the item XG like in the frame number 3. Actually, it is −0.45 in FIG. 28. These values indicate that noise affects the x- and y-axe data values.

Like the vertical hand motion, the horizontal hand motion closes the timing gates 52 of unnecessary detectors. In the table of FIG. 28, the second detection data pieces of each of the x-axis detectors 301 to 316 and y-axis detectors 317 to 325 are accumulated and the CPU 20 finds any detector whose cumulative value first exceeds a threshold (th1x for the x-axis detectors and th1y for the y-axis detectors). Namely, a detector that shows a maximum value is found.

In the table of FIG. 28, the second detection data derived from the first detection data provided by any one of the x-axis detectors 301 to 316 varies and the corresponding cumulative value never exceeds the threshold th1x. On the other hand, the second detection data in the item y(2) related to the 23rd detector 323 at the y-coordinate of 2 shows a maximum value and the cumulative value thereof exceeds the threshold th1y at a certain time point. The CPU 20 finds this detector and determines that the hand motion is a horizontal motion.

The chart (C) of FIG. 29 shows an accumulation of the second detection data y(2) of the 23rd detector 323 at the y-coordinate of 2. The cumulative value of the detector 323 exceeds the threshold th1y in the frame 9. At this time point, an activation flag Flg_y is changed from 0 to 1 and is kept at 1 for a predetermined period. Namely, the CPU 20 serves as a flag generator and generates the flag Flg_y when any y-coordinate cumulative value exceeds the threshold th1y. During the period in which the flag Flg_y is 1, no object is detected in unnecessary detection zones or sections. In the example, the cumulative value exceeds the threshold th1y in the frame 9. A cumulative value of any y-axis detector may exceed the threshold th1y within a predetermined period, to set the flag Flg_y.

The period in which the flag Flg_y is kept at 1 is defined as an activation period. The activation period is a duration necessary for recognizing a hand motion and covers, for example, four cycles. The chart (D) of FIG. 29 will be explained later.

Figure 30:
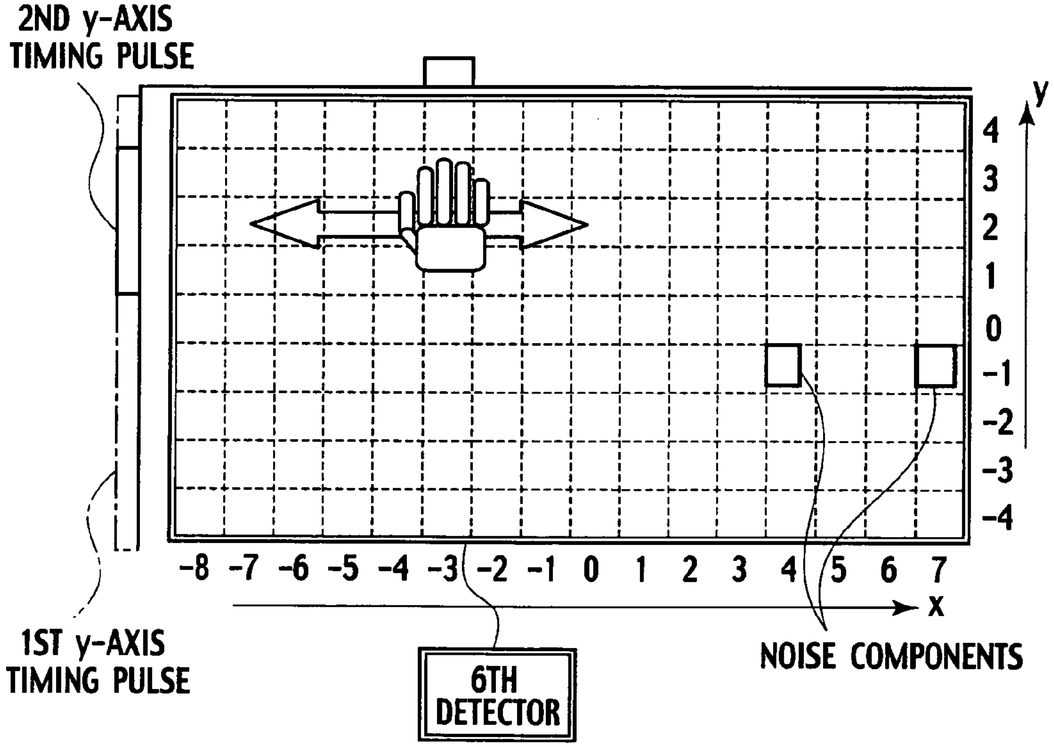
FIG. 30 is a view showing timing pulses to limit detection zones based on an activation flag (Flg_y)

FIG. 30 explains detection zones to be enabled. In FIG. 30, a hand photographed with the video camera 2 horizontally moves at the y-coordinate of 2.19. Also shown in FIG. 30 are two noise components depicted with black frames and a timing pulse supplied to control the 6th detector 306. A first y-axis timing pulse depicted with a dash-and-dot line along the y-axis has a pulse width covering a vertical width of an effective image period. This first y-axis pulse is supplied to all the x-axis detectors (1st to 16th detectors 301 to 316) when the user 3 starts to move the hand.

When a cumulative value of one of the y-axis detectors exceeds the threshold th1y, the flag Flg_y is set to 1. Then, a second y-axis timing pulse depicted with a continuous line is generated. The second y-axis timing pulse has a pulse width covering a certain vertical part of the effective image period and is supplied to all the x-axis detectors 301 to 316. According to the second y-axis timing pulse, the x-axis detectors 301 to 316 provide detection signals for a minimum number of detection sections necessary for detecting a hand.

A technique of generating the second y-axis timing pulse will be explained with reference to FIG. 31. Initially, the first y-axis timing pulse is supplied to the x-axis detectors 301 to 316. The first y-axis timing pulse entirely enables the y-axis width of the detection zones of the x-axis detectors 301 to 316.

When the hand motion of FIG. 30 is extracted in the detection zone of the y-coordinate of 2, the second data of the 23rd detector 323 assigned to the detection zone of the y-coordinate of 2 continuously takes a maximum value (FIG. 28). When a cumulative value of the second detection data of the 23rd detector 323 exceeds the threshold th1y, the CPU 20 sets the flag Flg_y to 1 and changes y-axis control data for the detection zone of the y-coordinate of 2 to 1.

The size of the hand displayed on the display 23 changes depending on a distance between the video camera 2 and the user 3. Accordingly, the embodiment sets "1" for the y-axis control data for the detection zone to which the flag-activated detector is assigned, as well as for y-axis control data for detection zones in the vicinity of the flag-activated detection zone. For example, y-axis control data for the detection zones of the y-coordinates of 1 and 3 is set to 1. At the same time, y-axis control data for the remaining detection zones is set to 0.

The CPU 20 supplies the above-mentioned y-axis control data to the timing pulse generator 12. Based on the y-axis control data, a y-axis timing pulse activator 12*y* in the timing pulse generator 12 generates the second y-axis timing pulse and supplies the same to all the x-axis detectors 301 to 316. In the example of FIG. 30, the second y-axis timing pulse has a pulse width covering the detection zones of the y-coordinates of 1, 2, and 3. In this way, the timing pulse generator 12 generates the second y-axis timing pulse whose pulse width is narrower than the first y-axis timing pulse. In response to the second y-axis timing pulse, the x-axis detectors 301 to 316 provide detection signals only for the detection sections crossing the y-coordinates of 1, 2, and 3. As a result, the noise components at the coordinates (x, y) of (4, −1) and (7, −1) shown in FIG. 30 are not detected.

After the generation of the second y-axis timing pulse, the CPU 20 carries out control according to outputs from the x-axis detectors 301 to 316 without referring to detection signals from the y-axis detectors 317 to 325. It is possible to supply no timing pulses to the timing gates 52 of the y-axis detectors 317 to 325 so that these detectors may provide no detection signals.

Figure 32:
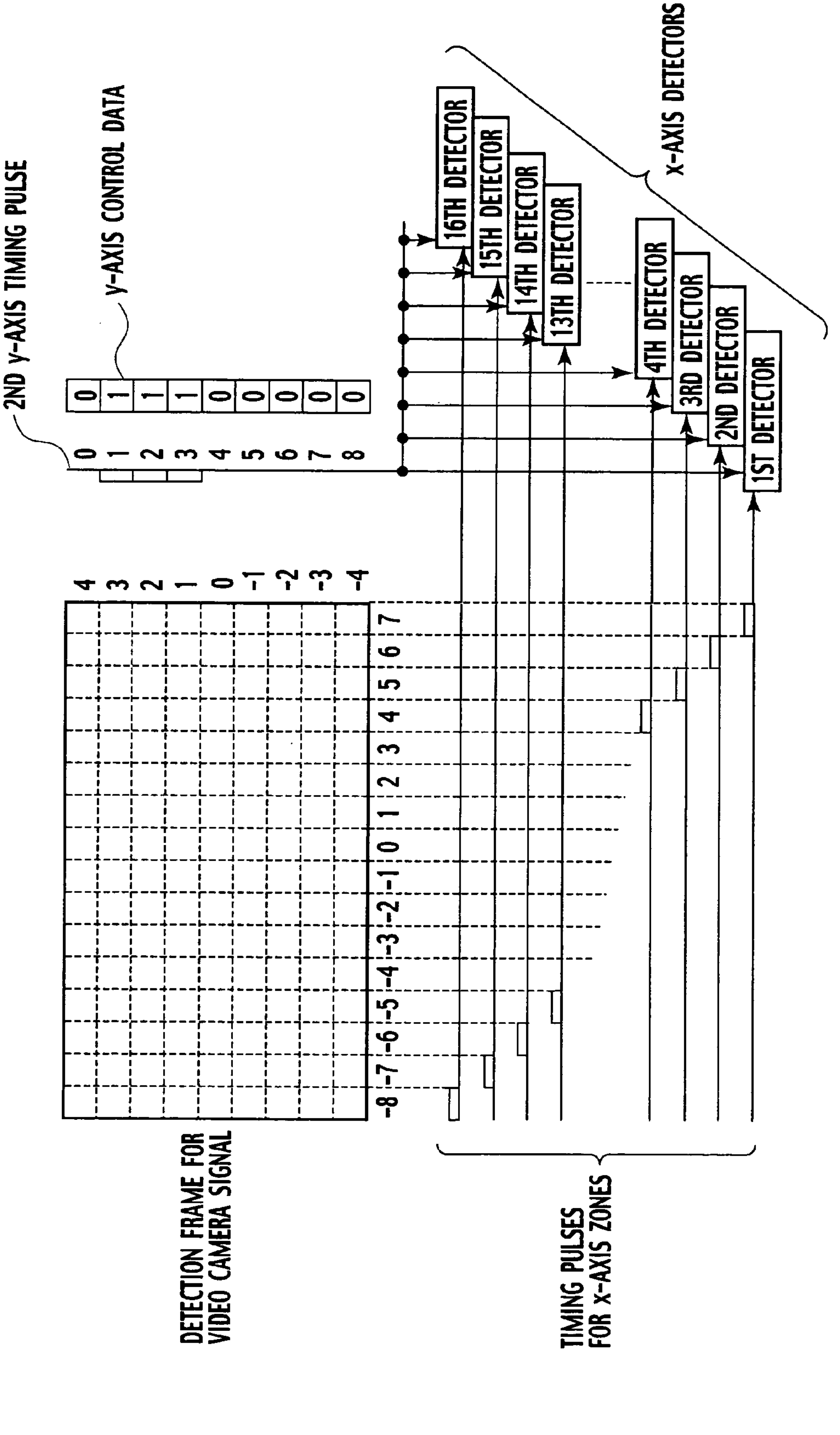
FIG. 32 is a view explaining x- and y-axis timing pulses to control the x-axis detectors.

FIG. 32 shows the second y-axis timing pulse supplied to the x-axis detectors 301 (1st) to 316 (16th) and x-axis timing pulses for the detection zones to which the x-axis detectors 301 to 316 are assigned. Each of the x-axis detectors 301 to 316 may output a detection signal related to the three sections where the detection zone of the detector in question crosses the y-coordinates of 1, 2, and 3. This results in not detecting unnecessary sections where no hand is detected.

Figure 31:
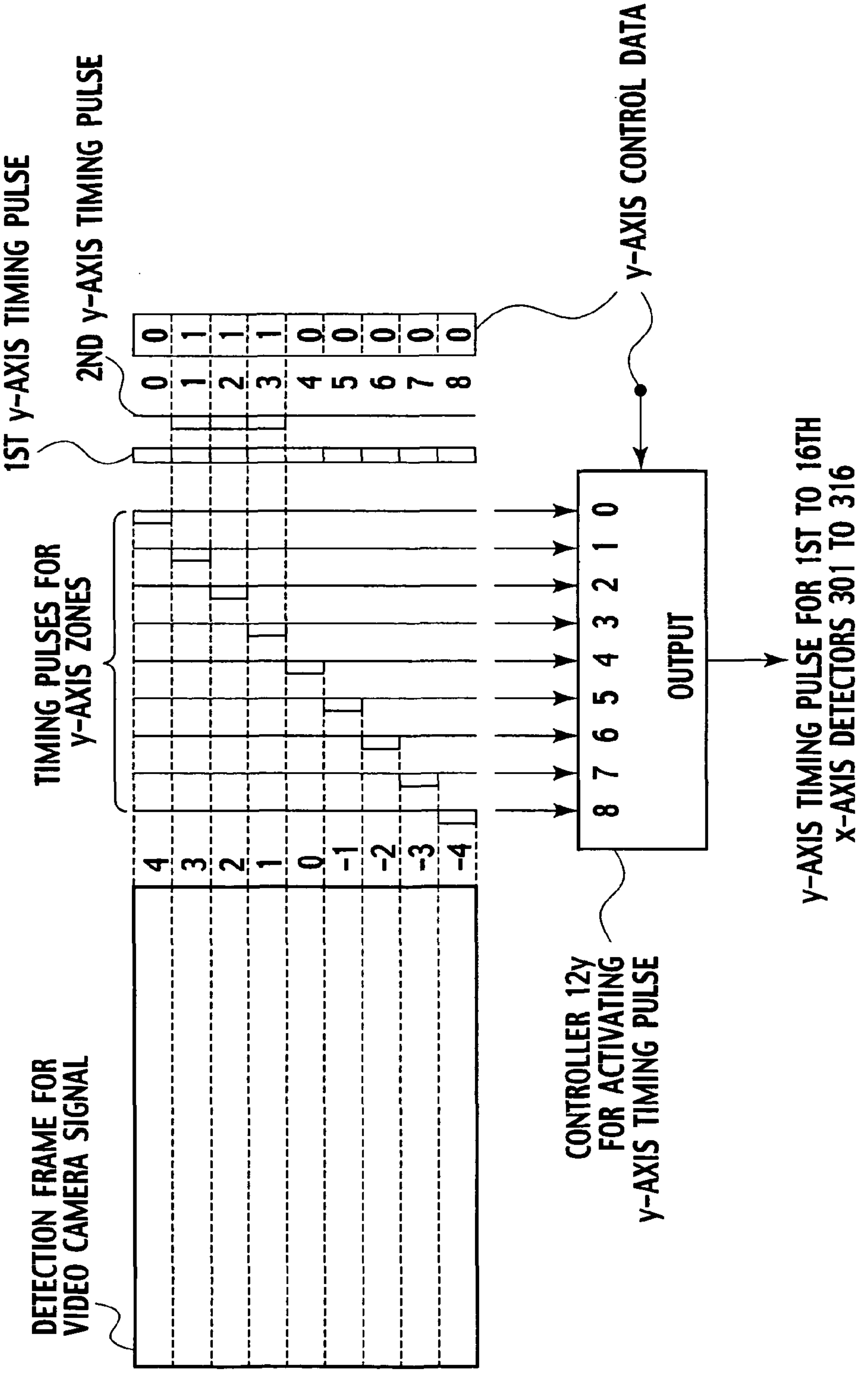
FIG. 31 is a view explaining a technique of generating y-axis timing pulses for the x-axis detectors.

As shown in FIGS. 31 and 32, the embodiment controls a pulse width in units of detection zones. The present invention can employ any technique of flexibly controlling a pulse width, for example, a technique of specifying a pulse start point and a pulse width.

FIG. 33 is a table similar to that of FIG. 28. Second detection data pieces shown in FIG. 33 are based on output signals from the detectors 301 to 325 that operate according to the second y-axis timing pulse after the 23rd detector 323 sets the flag Flg_y to 1 as shown in the chart (C) of FIG. 29. Namely, detection data from unnecessary detection sections and zones are suppressed in the table of FIG. 33.

In the chart (C) of FIG. 29, the cumulative value of the detector 323 exceeds the threshold th1y in the frame number 10. Accordingly, the second detection data after the frame number 10 in FIG. 33 are the unnecessary-data-limited data. In the frame number 11 of FIG. 33, data pieces in the items x(4), x(7), and y(−1), which contain noise in the table of FIG. 28, are each zero. This is because the sections having the coordinates (x, y) of (4, −1) and (7, −1) provide no detection data due to the second y-axis timing pulse supplied to the timing gates 52 of the corresponding 13th detector 313 and 16th detector 316. Removing the noise components results in stabilizing the barycentric values XG and YG, and therefore, the first to fifth motion detectors 20-1 to 20-5 arranged after the x-axis detectors 301 to 316 can improve a recognition rate.

The first to fifth motion detectors 20-1 to 20-5 in the CPU 20 receive the data shown in FIG. 33 and process the data. Returning to FIG. 29, a process of detecting a hand motion will be explained.

The chart (A) of FIG. 29 shows variations in the y-coordinate YG of the barycenter and the chart (B) of FIG. 29 shows variations in the x-coordinate XG of the barycenter. The waveforms of the charts (A) and (B) involve no noise. The chart (C) of FIG. 29 shows a cumulative value of the output signal of the 23rd y-axis detector 323. When the cumulative value exceeds the threshold th1y, the flag Flg_y is set to 1. Sections where the detection zone corresponding to the flag-generated detector and the horizontal detection zones in the vicinity of the flag-generated-detector-corresponding detection zone cross the vertical detection zones are defined as enabled detection sections. The detection sections other than the enabled detection sections are disabled by the second y-axis timing pulse supplied to the x-axis detectors 301 to 316. Namely, the disabled detection sections are not used for detecting a hand, and therefore, the hand detecting operation is not affected by noise.

If the waveform shown in the chart (C) of FIG. 29 continuously exceeds the threshold th1y, the second y-axis timing pulse is continuously supplied to the x-axis detectors 301 to 316, to continuously disable the unnecessary detection sections, thereby continuously avoiding the influence of noise. If the waveform shown in the chart (C) of FIG. 29 drops below the threshold th1y, the cumulative value is reset. A reference value to reset the cumulative value is not limited to the threshold th1y.

Thereafter, the waveform shown in the chart (B) of FIG. 29 is subjected to a DC offset suppressing process to make an average of the waveform substantially zero. This process employs the high-pass filter shown in FIG. 20.

The waveform shown in the chart (B) of FIG. 29 is passed through the high-pass filter of FIG. 20 into the waveform shown in the chart (D) of FIG. 29 having an average of nearly zero. This high-pass filtering eliminates x-axis positional information and provides a wave form appropriate for analyzing a hand motion. In the chart (D) of FIG. 29, the barycenter XGH on the ordinate is obtained by carrying out the high-pass filtering on the barycenter XG on the ordinate of the chart (B) of FIG. 29.

To analyze a horizontal hand motion, a cross-correlation between a typical signal waveform representative of a predetermined motion (horizontal motion) and a detection signal waveform based on actual detection signals from the detectors 301 to 325 is examined and a coincidence degree is evaluated like the case of the vertical hand motion.

Figure 34:
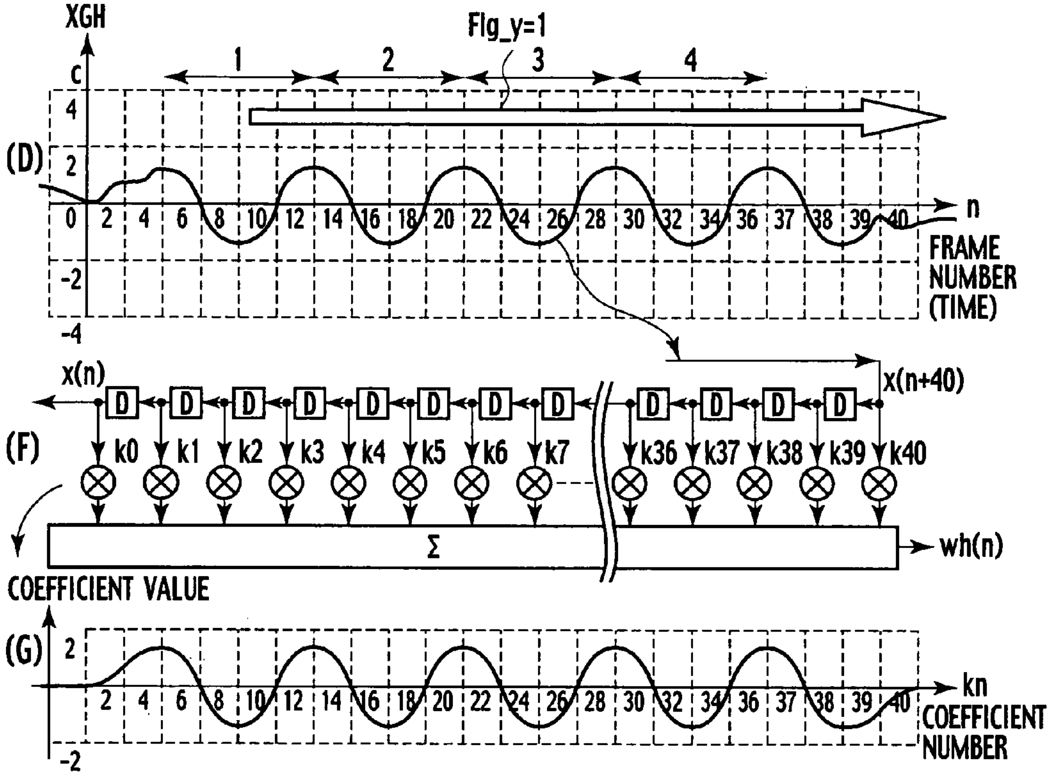
FIG. 34 is a view explaining a cross-correlation digital filter for a horizontal hand motion.

According to the embodiment, a waveform shown in a chart (G) of FIG. 34 is used as a reference waveform representative of a horizontal hand motion, i.e., a typical detection signal waveform representative of a given motion. In (F) of FIG. 34, there are shown tap coefficients k0 to k40 of the cross-correlation digital filter that correspond to the reference waveform shown in the chart (G) of FIG. 34. A chart (D) of FIG. 34 shows a detected signal waveform supplied to the cross-correlation digital filter kn. The waveform in the chart (D) of FIG. 34 is equal to that shown in the chart (D) of FIG. 29. The cross-correlation digital filter multiplies the second detection signal of the chart (D) of FIG. 34 by the tap coefficients and the first to fifth motion detectors 20-1 to 20-5 check an output signal of the cross-correlation digital filter, to see if the hand motion of the user 3 is the horizontal hand motion. The output signal wh(n) of the cross-correlation digital filter kn is obtained as follows:

$$wh(n) = \sum_{i=0}^{N-1} x(n+i)k(i) \tag{4}$$

where N is the number of taps of the digital filter, i.e., 41 (0 to 40) in this example and x(n+i) is the filtered barycenter XGH on the ordinate of the chart (D) of FIG. 34. The cross-correlation digital filter kn is operated only when the flag Flg_y is at 1.

Although the embodiment employs the cross-correlation digital filter having tap coefficients for a vertical motion and the cross-correlation digital filter having tap coefficients for a horizontal motion, the tap coefficients for a vertical motion and the tap coefficients for a horizontal motion may be stored in the CPU 20 so that one cross-correlation digital filter is selected depending on a motion. If the vertical motion and horizontal motion are considered as the same motion, the same tap coefficients may be used.

Next, the speed of a hand motion and the number of frames will be explained. A relationship between the hand motion speed and the number of frames is unchanged between a vertical hand motion and a horizontal hand motion.

According to the embodiment, the number of frames is 60 per second and four times of hand motions in vertical or horizontal direction are carried out in 32 frames for the sake of simplicity of explanation and drawings. This may also reduce the number of tap coefficients in correlation calculations.

The 32 frames correspond to about a period of 0.5 seconds which is too fast for a human motion. An actual hand motion will be slower. For example, four cycles of hand motions will take two seconds, i.e., 120 frames. To detect such a hand motion, the number of taps for correlation calculations must be increased. Namely, the number of taps must be adjusted according to a time to conduct a hand motion.

Figure 35:
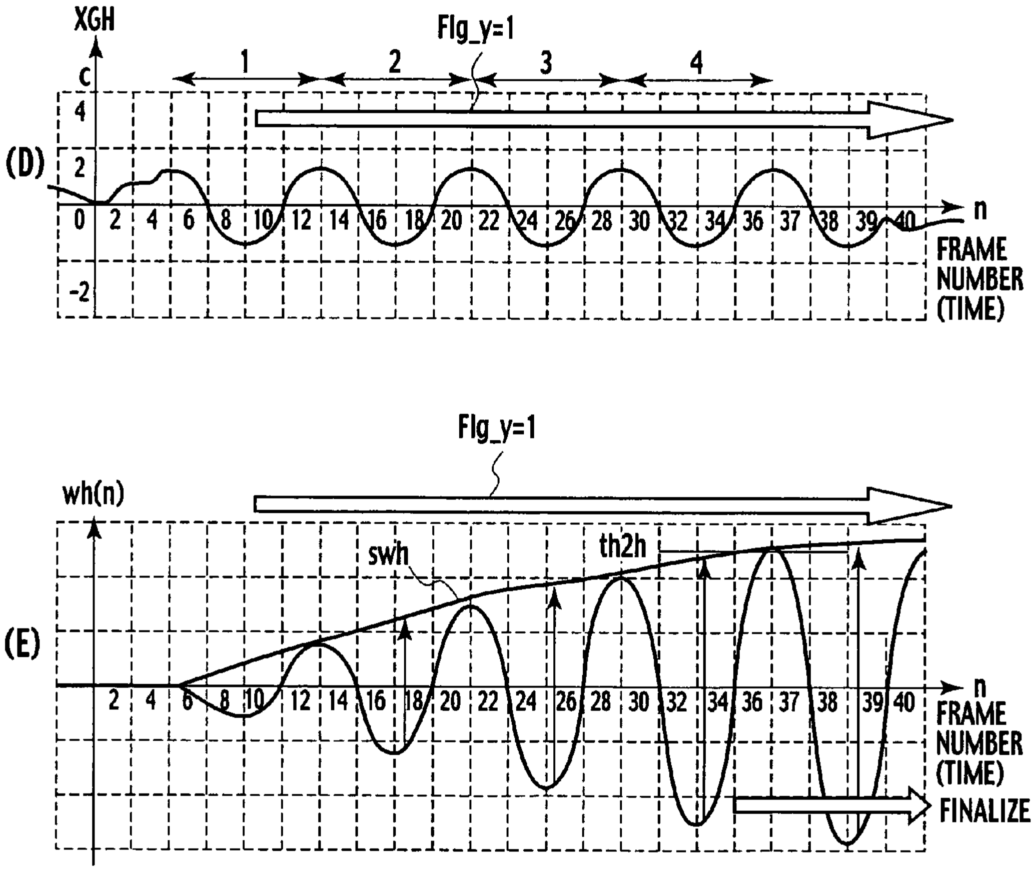
FIG. 35 is time charts showing changes in the output of the cross-correlation digital filter for a horizontal hand motion.

The output signal wh(n) of the cross-correlation digital filter for the horizontal hand motion has a waveform shown in a chart (E) of FIG. 35. The amplitude of the waveform increases as the coincidence degree of cross-correlation increases. A waveform shown in a chart (D) of FIG. 35 is the same as those of the charts (D) of FIGS. 29 and 34 and serves as a comparison object for the waveform shown in the chart (E) of FIG. 35. The absolute values of the output signal wh(n) are accumulated. When the cumulative value reaches a threshold th2h, it is determined that a correlation with the reference waveform is satisfactory and that a predetermined motion (horizontal motion) has been made. In this way, the first to fifth motion detectors 20-1 to 20-5 determine, according to detection signals provided by the detection unit 19, whether or not a motion of the user 3 is a predetermined motion.

If the detected motion is recognized as a horizontal hand motion and if the flag Flg_y serving as a protection window is 1, the horizontal hand motion is finalized and a control event corresponding to the horizontal hand motion is carried out according to a state of the television set 1. The control event is carried out according to an output signal from the control information generator 20-10 that logically determines when any one of the motion detectors 20-1 to 20-5 is finalized.

Figure 36:
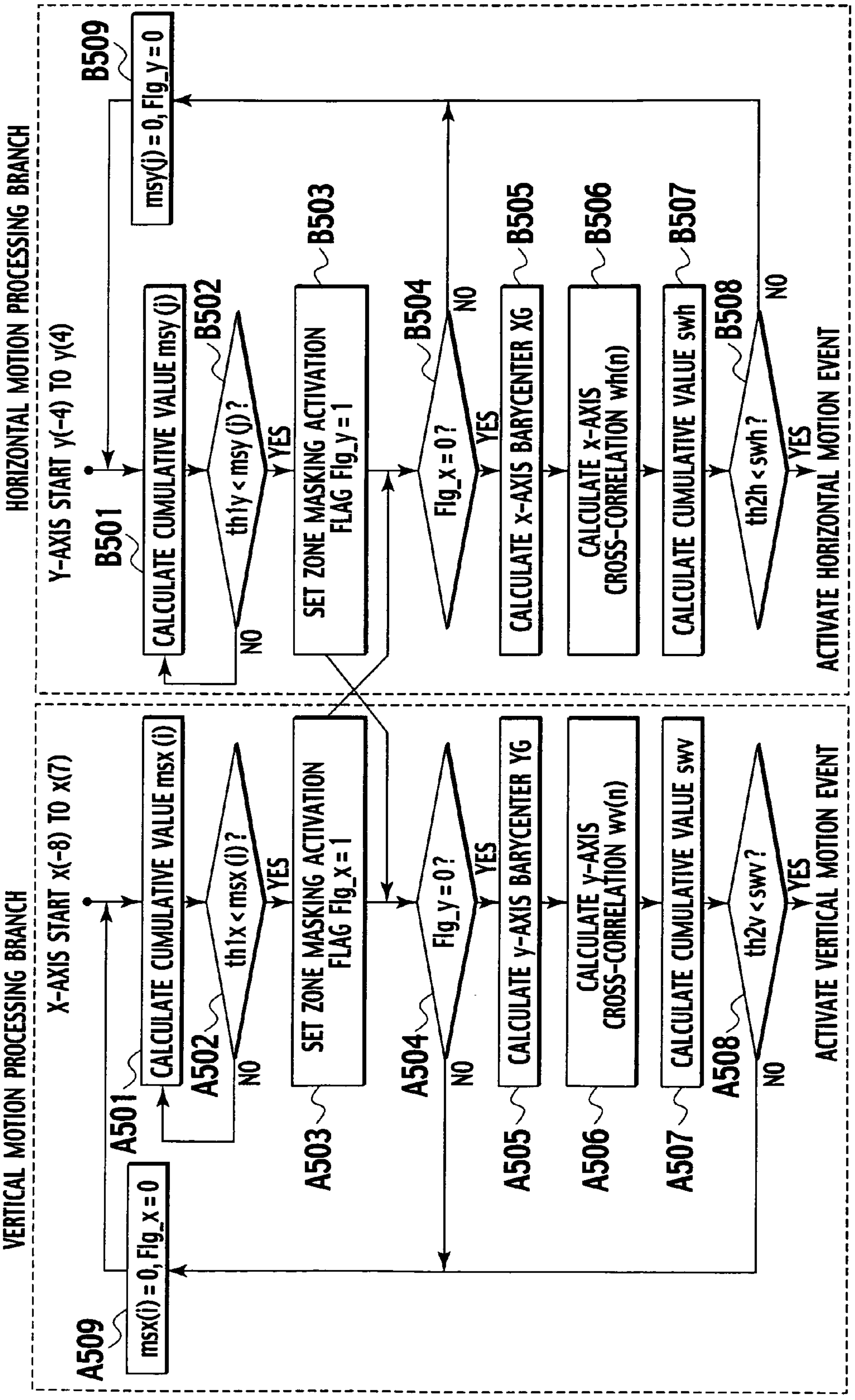
FIG. 36 is a flowchart showing a process of detecting a motion.

FIG. 36 is a flowchart showing a process of detecting vertical and horizontal hand motions according to an embodiment of the present invention. Operations carried out in the steps of the flowchart of FIG. 36 have already been explained above, and therefore, the following explanation is mainly made in connection with functions of, the steps in the flow, a recognition of control information made by the television set 1 from the vertical or horizontal hand motion, and an execution of a control event according to the recognized control information.

The flowchart of FIG. 36 is divided into two branches, one for detecting a vertical hand motion and the other for detecting a horizontal hand motion. At the start of the vertical hand motion branch, 16 pieces of second detection data x(−8) to x(7) are obtained from first detection data pieces of the x-axis detectors 301 to 316. In step A501, each of the second detection data pieces x(−8) to x(7) is accumulated frame by frame.

In step A502, it is checked to see if any one of the cumulative values msx(i) (i=−8 to +7) is equal to or larger than the threshold th1x. If step A502 is NO, i.e., if each of the cumulative values msx(i) is below the threshold th1x, step A501 is repeated. If step A502 is YES, i.e., if any one of the cumulative values msx(i) is equal to or larger than the threshold th1x, step A503 is carried out.

If any one of the cumulative values msx(i) of the x-axis detectors is equal to or larger than the threshold th1x, it is understood that the user's hand has vertically been moved. Accordingly, step A503 sets the flag Flg_x from 0 to 1 to supply a second x-axis timing pulse to the y-axis detectors 317 to 325. This results in masking the output of the x-axis detectors 301 to 316 so that no object may be detected in unnecessary detection zones or sections, thereby suppressing the influence of noise.

The horizontal hand motion branch is similarly carried out. At the start, nine pieces of second detection data y(−4) to y(4) are obtained from outputs of the y-axis detectors 317 to 325. Thereafter, steps B501 to B503 are carried out like steps A501 to A503 of the vertical hand motion branch.

If, in step B502, any one of cumulative values msy(j) (j=−4 to +4) of the y-axis detectors is equal to or larger than the threshold th1y, the flag Flg_y is set from 0 to 1 to recognize that the hand motion is horizontal.

When one of the flags Flg_x and Flg_y is set to 1, the other one is suppressed. For this, steps A504 and B504 examine the flags. For example, when the flag Flg_x is set to 1 in the vertical hand motion branch, step A504 checks to see if the flag Flg_y of the horizontal hand motion branch is 0.

If step A504 provides YES to indicate that the flag Flg_y is 0, it is determined to continuously execute the vertical hand motion branch and step A505 is carried out. If step A504 provides NO to indicate that the horizontal hand motion branch is active and the flag Flg_y is 1, step A509 is carried out to reset the cumulative values msx(i) and activation flag Flg_x to zero. Thereafter, step A501 is repeated.

In the horizontal hand motion branch, the flag Flg_y is set to 1 in step B503, and step B504 determines whether or not the flag Flg_x of the vertical hand motion branch is 0.

If step B504 provides YES to indicate that the flag Flg_x is 0, it is determined to continue the horizontal hand motion branch and step B505 is carried out. If step B504 provides NO to indicate that the vertical hand motion branch is active and the flag Flg_x is 1, step B509 is carried out to reset the cumulative values msy(j) and activation flag Flg_y to zero. Thereafter, step B501 is repeated.

If step A504 is YES, step A505 is carried out to calculate a y-axis barycenter YG shown in the table of FIG. 24 according to the expression (2). If step B504 is YES, step B505 is carried out to calculate an x-axis barycenter XG shown in the table of FIG. 33 according to the expression (1). According to the barycenter YG, step A506 carries out a cross-correlation calculation with the cross-correlation digital filter and provides an output signal wv(n). According to the barycenter XG, step B506 carries out a cross-correlation calculation with the cross-correlation digital filter and provides an output signal wh(n).

Step A507 finds the absolute values of the output signal wv(n), accumulates the absolute values, and provides a cumulative value swv. Step B507 finds the absolute values of the output signal wh(n), accumulates the absolute values, and provides a cumulative value swh.

Step A508 determines whether or not the cumulative value swv is larger than a threshold th2v. Step B508 determines whether or not the cumulative value swh is larger than a threshold th2h. If step A508 is YES, a vertical hand motion event is carried out. If step B508 is YES, a horizontal hand motion event is carried out. Although steps A504 to A508 and steps B504 to B508 have been explained in parallel, the vertical hand motion branch and horizontal hand motion branch are not simultaneously processed but only one of them is processed.

In FIG. 36, the steps that follow the cross-correlation calculation of steps A506 and B506 are separated from each other for the sake of easy understanding. Since step A504 evaluates the flag Flg_y and step B504 evaluates the flag Flg_x, to determine whether the detected hand motion is vertical or horizontal, the steps after A506 and B506 can be integrated into a single series of steps. If step A504 or A508 provides NO, step A509 is carried out to reset the cumulative values msx(i) and activation flag Flg_x to zero and return to the start. If step B504 or B508 provides NO, step B509 is carried out to reset the cumulative values msy (j) and activation flag Flg_y to zero and return to the start.

In this way, the embodiment simultaneously starts the vertical and horizontal hand action examining processes and recognizes one of them. If the recognized hand motion is vertical, i.e., the beckoning motion of FIG. 3A, a corresponding control event such as a power ON event or a menu displaying event is executed. If the recognized hand motion is horizontal, i.e., the bye-bye motion of FIG. 3A, a corresponding control event such as a power OFF event is executed.

According to an embodiment of the present invention, only one of the vertical and horizontal hand motions is employed as a predetermined motion to control an electronic appliance. In this case, step A504 or B504 may be omitted.

The first embodiment mentioned above divides a screen of the display 23 into 25 detection zones, i.e., 16 vertical detection zones (FIG. 6) and 9 horizontal detection zones (FIG. 5) and assigns the 25 detectors 301 to 325 to the 25 detection zones, respectively. This configuration of the first embodiment is advantageous in reducing hardware scale.

To improve recognition accuracy, the second embodiment explained below is appropriate. The second embodiment basically functions according to the algorithm explained with reference to the flowchart of FIG. 36. Differences of the second embodiment from the first embodiment will be explained.

Figure 37:
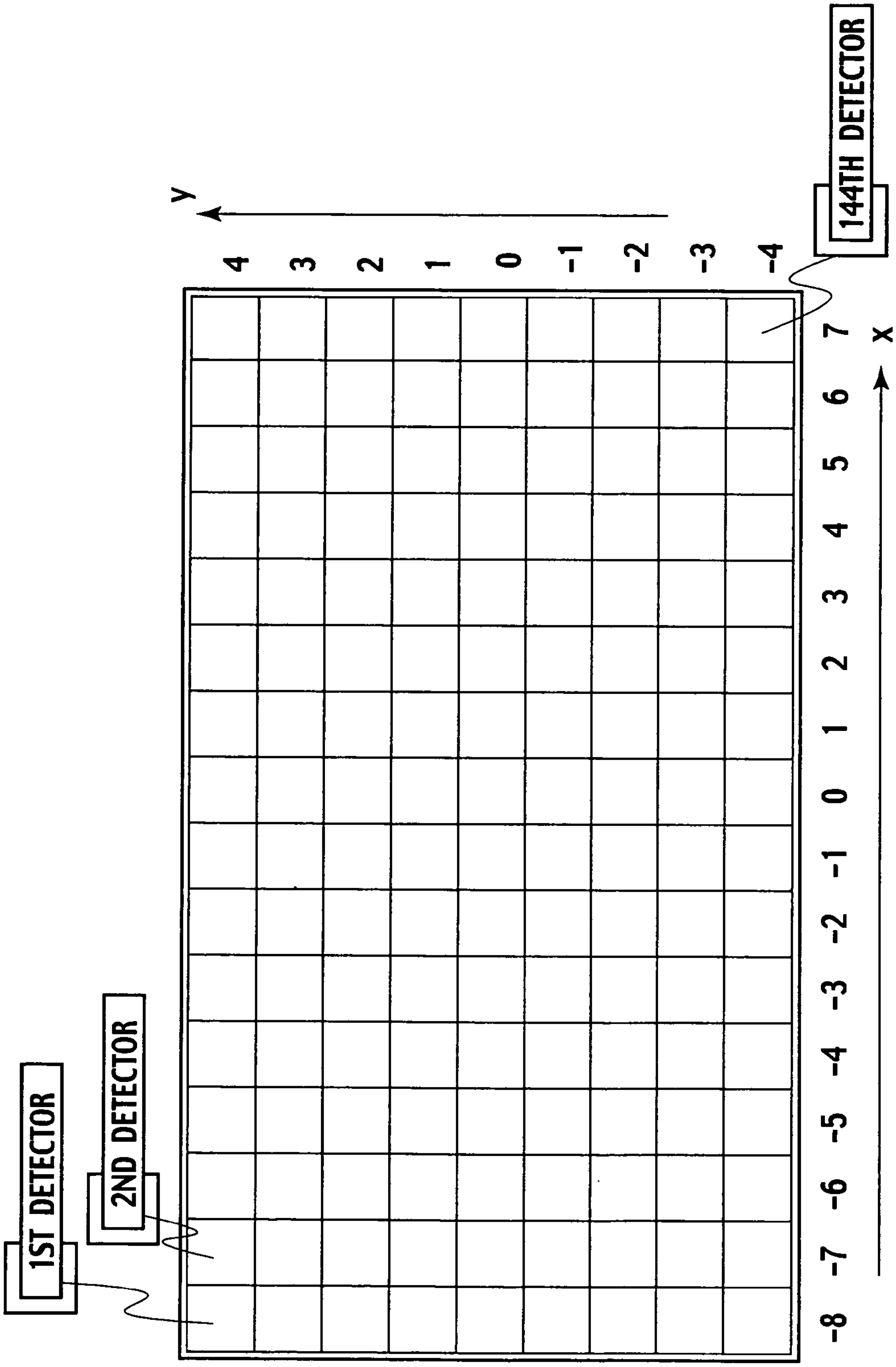
FIG. 37 is a view showing detection zones and detectors assigned to the detection zones according to a second embodiment of the present invention.

FIG. 37 shows a screen of the display 23 on which an image from the video camera 2 is displayed. The second embodiment divides the screen by 16 in a horizontal direction and by 9 in a vertical direction, to form 144 (16×9) detection zones to which 144 detectors are assigned, respectively. Namely, a detection unit 19 (FIG. 2) according to the second embodiment contains 144 detectors that supply 144 data pieces to a control information determination unit (hereinafter referred to as CPU) 200. In FIG. 37, the first detector 301 is assigned to a detection zone having coordinates (x, y) of (−8, 4) and provides a first detection data piece.

The second embodiment provides output signals from the detection zones every frame (every vertical period). The detectors are assigned to the detection zones, respectively, and data from the detection zones are supplied to the CPU 200 that processes the data with software. It is possible to arrange a buffer memory to reduce the number of detectors smaller than the number of data pieces required by hardware.

Figure 38:
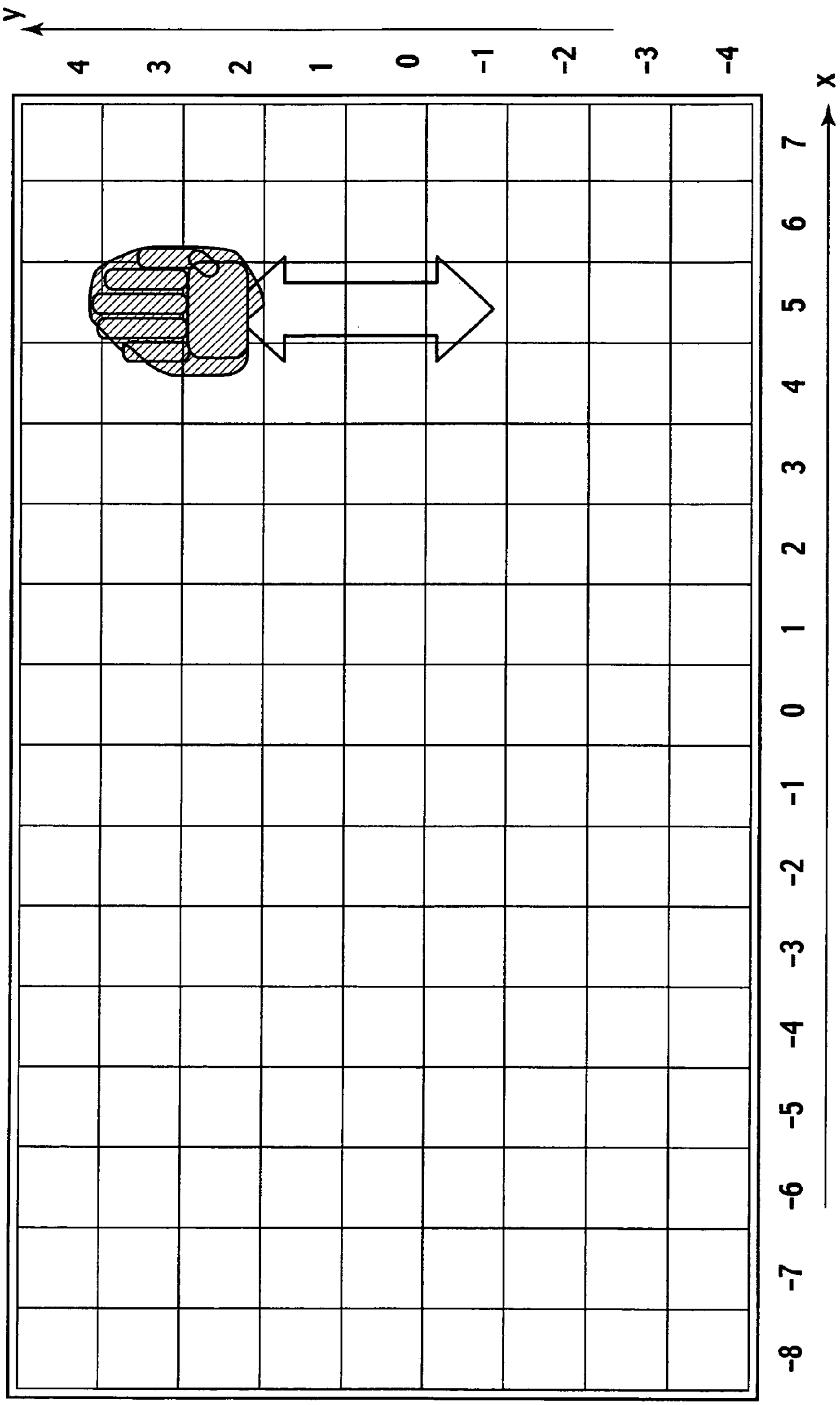
FIG. 38 is a view showing a vertically moving hand on the detection zones according to the second embodiment.

FIG. 38 shows an image of a hand photographed with the video camera 2 and displayed on the screen divided into the 144 detection zones. In this example, the hand is vertically moving. A hatched area in FIG. 38 includes a hand area and a frame-to-frame difference area caused by the motion of the hand. The first embodiment mentioned above converts the hatched area into data with use of the histogram detector 61 and the like contained in each feature detector 53 shown in FIG. 7 and transfers the data to the CPU 200 through a CPU bus.

The second embodiment may employ the same configuration as the first embodiment. However, the 144 data pieces from the 144 detectors increase hardware scale and congest bus traffic. Accordingly, the second embodiment simplifies the data. For the sake of comparison, it is assumed that the hand shown in FIG. 38 takes the same positions as those of FIGS. 17A to 17D.

Figure 39:
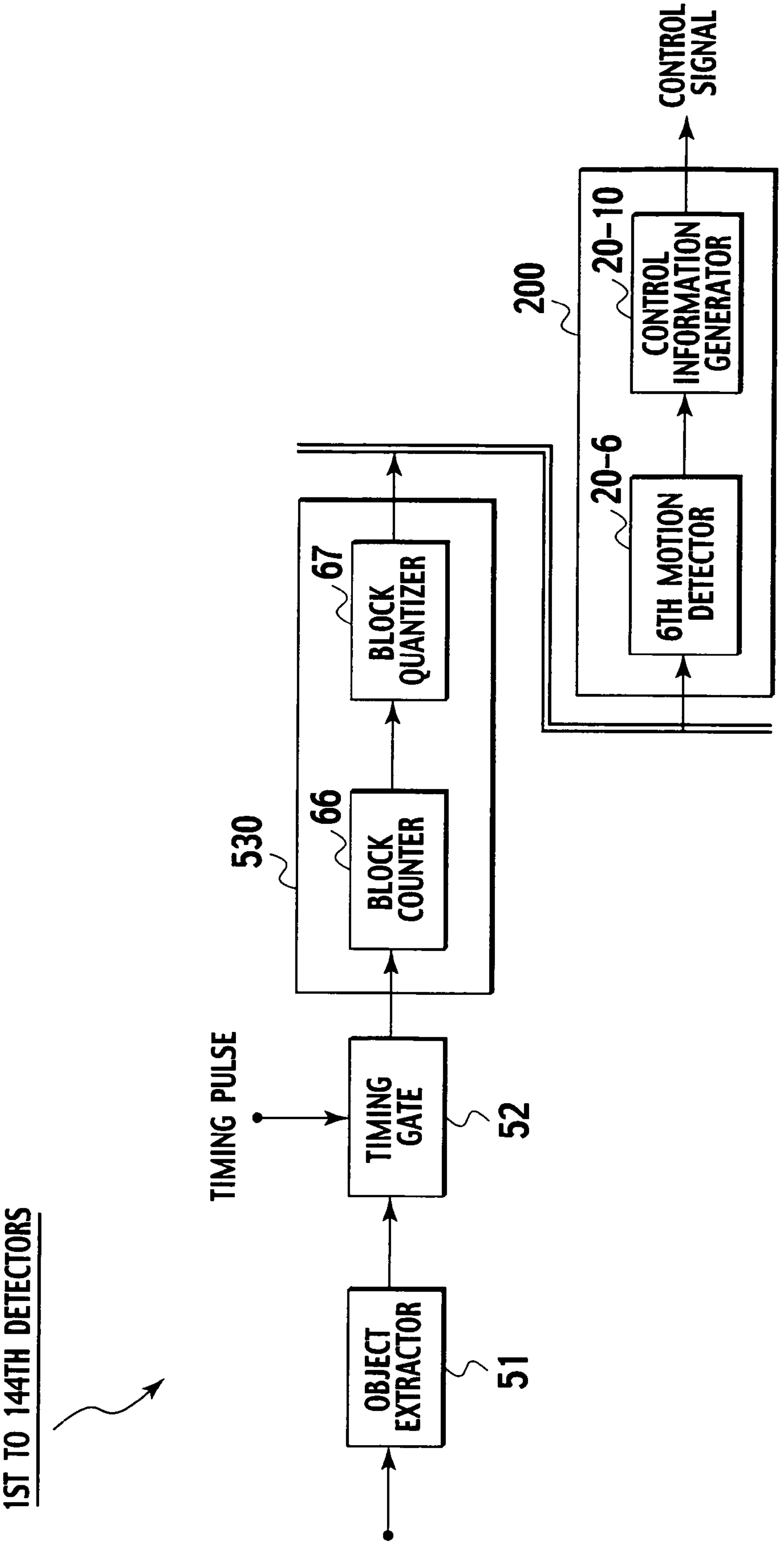
FIG. 39 is a block diagram showing one of the detectors and a feature detector 530 according to the second embodiment.

FIG. 39 is a block diagram showing the detection unit 19 and control information determination unit (CPU) 200 according to the second embodiment. The detection unit 19 includes the first to 144th detectors 301 to 444. These detectors transfer object data to a sixth motion detector 20-6 of the CPU 200. In FIG. 39, a first object extractor 51 includes, as shown in FIG. 8, a color filter 71, a gradation limiter 72, and a motion filter 75 and provides an output signal by synthesizing signals from the components 71, 72, and 75. This output signal represents an object extracted from an output image of the video camera 2.

The synthesis by the first object extractor 51 is based on a logical operation such as a logical product. Output of an object gate 74 provides the detection zones corresponding to the hatched area of FIG. 38 with a gradation level and the other detection zones with a mask level, i.e., a gradation level of 0 to indicate no object. A black level provided by the video camera 2 is equal to or larger than 0.

A feature detector 530 of FIG. 39 includes a block counter 66 and a block quantizer 67. The feature detector 530 may include a histogram detector 61 and an APL detector 62, if required.

The block counter 66 and block quantizer 67 convert output data from each first object extractor 51 into one-bit data. The block counter 66 counts the number of detection zones having a gradation level other than the mask level. An output signal from the first object extractor 51 corresponding to the detection zone counted by the block counter 66 is compared in the block quantizer 67 with a threshold. If the output signal is equal to or larger than the threshold, the quantizer 67 outputs 1, and if not, 0.

Figure 40:
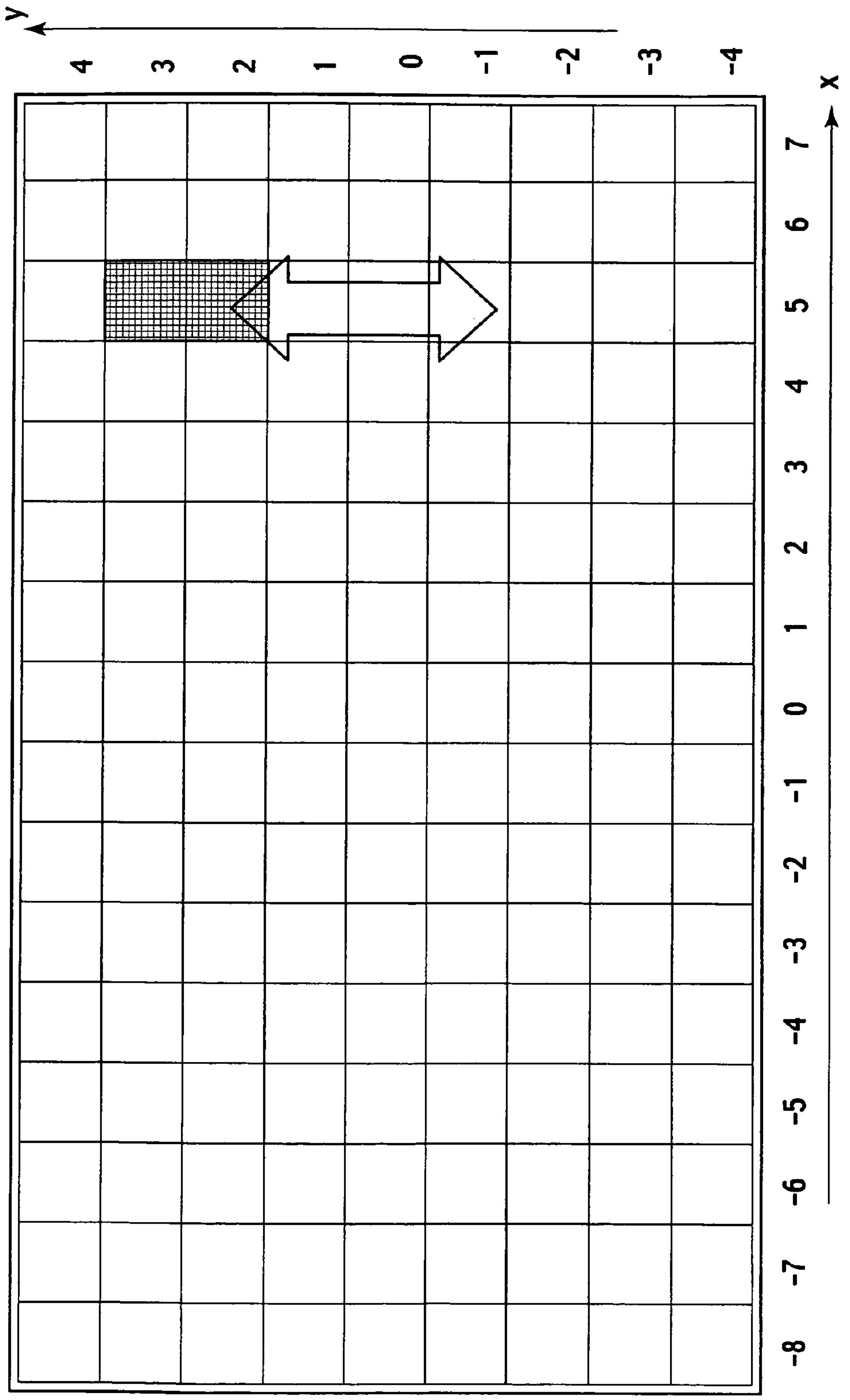
FIG. 40 is a view showing quantized detection zones according to the second embodiment.

For example, the threshold is set to ½ of the area of each detection zone. When an output signal from the first object extractor 51 assigned to one detection zone contained in the hatched area of FIG. 38 is supplied to the block quantizer 67 having such a threshold, the quantizer 67 provides an output signal of "1" representing one of the hatched detection zones shown in FIG. 40. Consequently, the block quantizer 67 provides "1" for two detection zones having the coordinates (x, y) of (5, 3) and (5, 2) and "0" for the other detection zones.

With such a threshold, the block counter 66 and block quantizer 67 provide an output of 144 bits according to outputs from the detection unit 19, thereby minimizing output data.

The CPU 200 stores 144 data pieces for each frame (vertical period) and processes them according to a motion recognition algorithm. FIG. 41 is a table showing examples of data processed in the CPU 200. Items x(−8) to x(7) are each a sum total of outputs from the detectors assigned to the all detection zones having the same x-coordinate arranged in the y-axis direction. For example, the item x(0) in a given frame number contains a sum total of second detection data obtained from first detection data provided by the detectors assigned to the detection zones having the coordinates (x, y) of (0, −4), (0, −3), (0, −2), (0, −1), (0, 0), (0, 1), (0, 2), (0, 3), and (0, 4). Since there are nine detection zones at the same x-coordinate in the y-axis direction, a maximum value of the nine second detection data pieces will be 9.

Similarly, items y(−4) to y(4) are each a sum total of outputs from the detectors assigned to the all detection zones having the same y-coordinate arranged in the x-axis direction. A maximum value of the item y(j) will be 16. As a result, the hand motion shown in FIG. 38 involves the same barycentric variations as those shown in FIG. 18. Accordingly, the data shown in FIG. 41 can be processed with a like algorithm to recognize the hand motion.

The tables of FIGS. 18 and 41 will be compared with each other. Under the frame number n=0 in FIG. 18, x(6)=x(4)=12, x(5)=120, and y(3)=y(2)=72. In FIG. 41, data pieces corresponding to these data pieces are x(6)=x(4)=0, x(5)=2, and y(3)=y(2)=1.

In FIG. 41, the data pieces are quantized into binary values. In addition, the scale of FIG. 41 differs from that of FIG. 18. However, there is no difference in the barycentric position between FIGS. 18 and 41. Namely, the sixth motion detector 20-6 of the second embodiment can recognize a hand motion according to the same algorithm as that used by the first to fifth motion detectors 20-1 to 20-5 of the first embodiment. The algorithm for the sixth motion detector 20-6 covers the barycentric calculations of the expressions (1) and (2), the cross-correlation digital filter calculation of the expression (3), and the timing pulse limitation on the timing gates 52 of detectors assigned to unnecessary detection zones. This algorithm is expressed with the flowchart of FIG. 36. According to detection signals from the detection unit 19, the sixth motion detector 20-6 determines whether or not a motion conducted by the user 3 is a predetermined motion.

A process of closing the timing gate 52 of a given detector according to the second embodiment is a masking process. This will be explained later.

The detection zones to which the detectors 301 to 444 of the second embodiment are assigned, respectively, correspond to the sections explained in the first embodiment. Accordingly, a technique of closing the timing gate 52 is the same as that of the first embodiment. A technique of disabling detectors related to unnecessary detection zones is different from that of the first embodiment.

Figure 42:
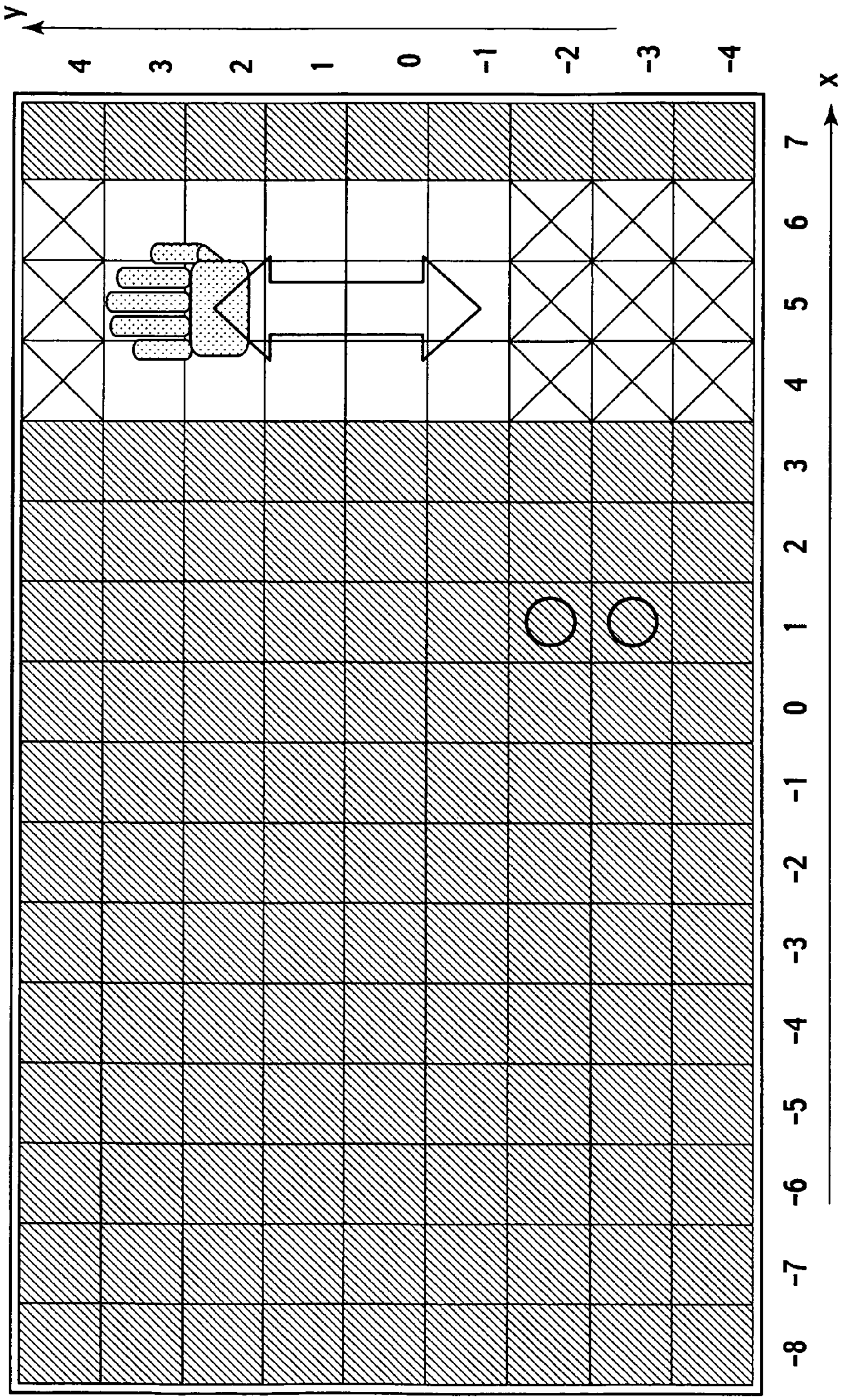
FIG. 42 is a view showing masked detection zones according to the second embodiment.

FIG. 42 shows the same vertical hand motion as that shown in FIG. 38. To recognize this hand motion, the first object extractor 51 of each detector functions. Here, an unwanted object may be present. In FIG. 42, noise represented with a black circle is present in detection zones having the coordinates (x, y) of (1, −2) and (1, −3).

Under the frame number n of 11 in the table of FIG. 41, there are x(1)=2, y(−2)=1, and y(−3)=1 to disturb the x- and y-coordinates of the barycenter and prevent a correct hand motion detection. The noise components affect the barycentric coordinates and cause a problem to the present invention that detects a hand motion according to variations in the barycenter.

The noise components can be suppressed or removed by masking detection zones other than those in which a hand motion is detected.

The masking process of the second embodiment resembles that of the first embodiment. In each of the items x(−8) to x(7), values are accumulated for a predetermined period, and if the cumulative value exceeds the threshold th1x as shown in the chart (C) of FIG. 19, the activation flag Flg_x is set to 1. According to the second embodiment, the flag Flg_x is set to 1 when the threshold th1x is exceeded by a sum total of outputs from all detectors assigned to detection zones having the same x-coordinate, and the activation flag Flg_y is set to 1 when the threshold th1y is exceeded by a sum total of outputs from all detectors assigned to detection zones having the same y-coordinate. A cumulative value may be limited when it exceeds a predetermined level.

In the chart (C) of FIG. 19, a cumulative value of the output signal x(5) from the detector assigned to the detection zone having the x-coordinate of 5 exceeds the threshold th1x in frame 10. Namely, the hand is moved in the detection zones having the x-coordinate of 5 and is detected therein.

When an output signal from a given detector exceeds the threshold th1x, the flag Flg_x is set to 1 for a predetermined period, and variations in the barycenter YG in the vertical direction (y-axis direction) shown in the chart (A) of FIG. 19 are evaluated with a cross-correlation digital filter, to recognize a hand motion representative of a control operation.

The second embodiment divides a screen of the display 23 on which an image from the video camera 2 is displayed in vertical and horizontal directions to form detection zones to which detectors are assigned, respectively. The detectors provide first detection data to the CPU 200, which processes the detection data as variables arranged in a two-dimensional matrix. Accordingly, the masking process is achievable by zeroing the variables. It is also possible to control timing pulses supplied from the timing pulse generator 12 to the timing gates 52.

According to the example shown in FIG. 41 and the chart (C) of FIG. 19, the masking process is started from the frame number 10, to suppress the noise components shown in the frame number 11 of the table of FIG. 41. In this way, the masking process is effective to suppress objects other than the hand and extract only a hand motion.

In FIG. 42, a hatched area represents detection zones disabled with the masking process. According to the table of FIG. 41, the masking process may mask all detectors except the detectors assigned to the detection zones having the x-coordinate of 5. In practice, the hand sways. Accordingly, the second embodiment excludes from the masking not only the detectors assigned to the detection zones having the x-coordinate of 5 but also the detectors assigned to the detection zones having x-coordinates of 5±1 and allows the unmasked detectors to provide detection signals.

Namely, the timing pulse generator 12 supplies timing pulses to the detectors assigned to the detection zones having the x-coordinate of 5 that have set the flag Flg_x to 1, as well as to the detectors assigned to the detection zones having the x-coordinates of 4 and 6.

Based on the table of FIG. 41, no timing pulses are supplied to the detectors assigned to the detection zones having the x-coordinates of 4 to 6 and the y-coordinates of −4, −3, −2, and 4 because the vertical hand motion does not reach these masked detection zones (each indicated with a mark "X" in FIG. 42). This results in further suppressing the influence of noise.

The masking process is achieved when the flag Flg_x is set to 1 as shown in the chart (C) of FIG. 19 by evaluating the barycenter YG shown in the chart (A) of FIG. 19 for a predetermined period before the time point when the flag Flg_x is set to 1. The CPU 200 stores values of the barycenter YG for the predetermined period in a memory (not shown), and when the flag Flg-x is set to 1, refers to the values of the barycenter YG stored in the memory. According to the second embodiment, the period of the barycenter YG to be referred to is a period indicated with an arrow 1 in the chart (A) of FIG. 19. It is determined that the detection zones having the y-coordinates of −4, −3, −2, and 4 involve no hand. Namely, it is determined that the hand is present out of the detection zones having the y-coordinates of −4, −3, −2, and 4. Based on this determination, the above-mentioned masking process is carried out.

When the hand of the user 3 is moved to conduct a predetermined motion, the second embodiment determines detection zones in which the hand is extracted and sets the detection zones as zones to pass detection signals. In connection with the remaining detection zones, the second embodiment does not supply timing pulses to the timing gates 52 of the detectors assigned to the remaining detection zones, and therefore, no detection signals are passed through these detectors. If a cumulative value of an output signal from any one of the detectors exceeds the threshold th1x, the second embodiment refers to second detection data for the predetermined period before the time point at which the threshold th1x is exceeded and determines the detection zones where the hand is present. Thereafter, the second embodiment carries out the masking process on detectors other than those corresponding to the detection zones in which the hand is present, to stop detection signals from the masked detectors, thereby suppressing noise.

The second embodiment divides a screen of the display 23 on which an image from the video camera 2 is displayed into detection zones and assigns detectors to the detection zones, respectively, to detect a hand motion. The second embodiment carries out the masking process over the two-dimensional plane where the detectors are distributed. Compared with the first embodiment, the second embodiment can more narrow detection zones where the hand is present and further reduce the influence of noise. The masking process of the second embodiment is achieved with software that is executable in parallel with the processing of data that is not masked. This improves the degree of freedom of processing.

The algorithm shown in FIG. 36 to recognize a hand motion from second detection data is executable without regard to an arrangement of detection zones. Namely, the algorithm is applicable to either of the first and second embodiments, to finalize a control operation presented with a hand motion and control the television set 1 accordingly.

Figure 43:
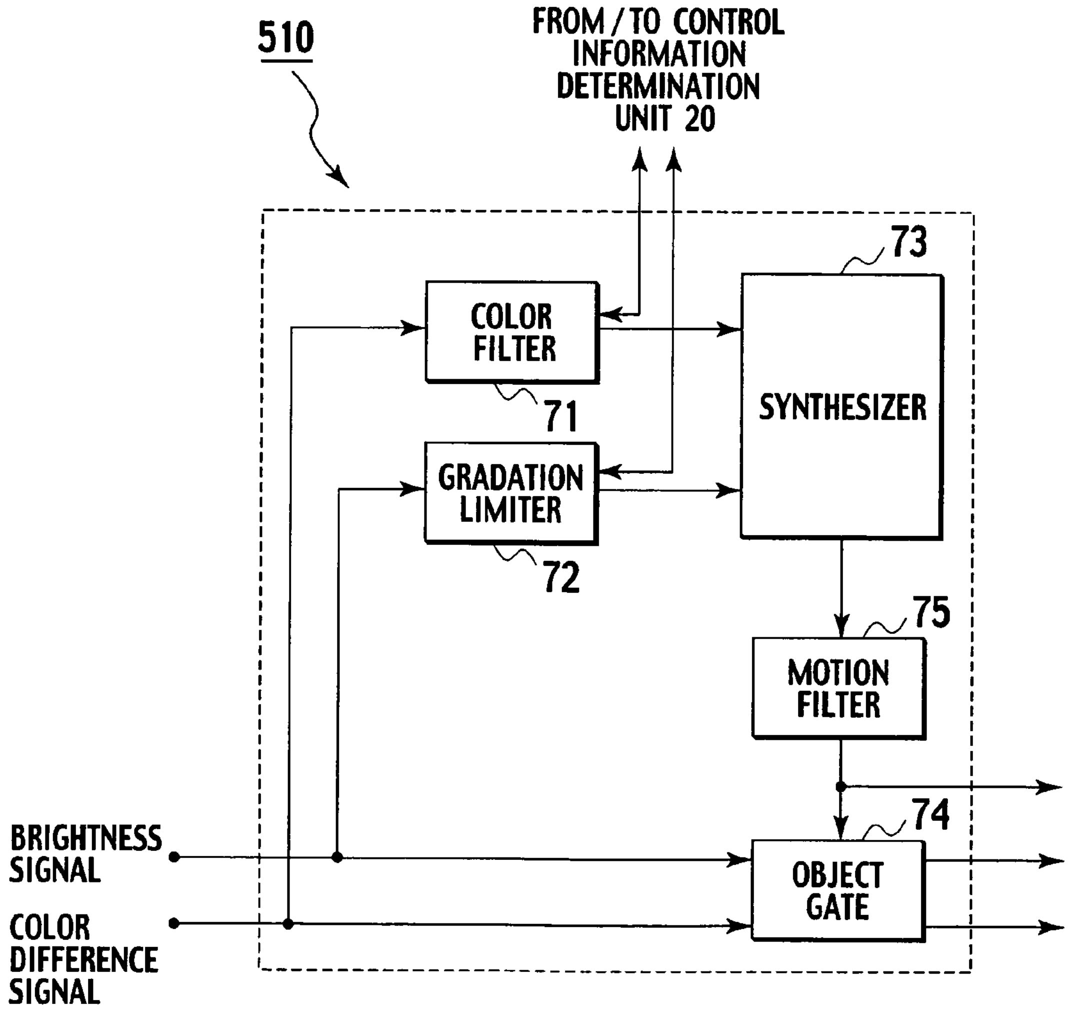
FIG. 43 is a block diagram showing a second object extractor 510 according to an embodiment of the present invention.

FIG. 43 is a view showing a second object extractor 510 that can work in place of the first object extractor 51 shown in FIG. 8. In the second object extractor 510, signals from a color filter 71 and a gradation limiter 72 are synthesized in a synthesizer 73. The synthesizer 73 is connected in series with a motion filter 75. An object gate 74 gates signals from the video camera 2.

According to the second embodiment, the block counter 66 of the feature detector 530 counts the number of detection zones whose detectors receive timing pulses. Accordingly, an output from the motion filter 75 may directly be supplied to the block counter 66 of the feature detector 530 so that the block quantizer 67 may provide hand motion data related to each detection zone.

Figure 44:
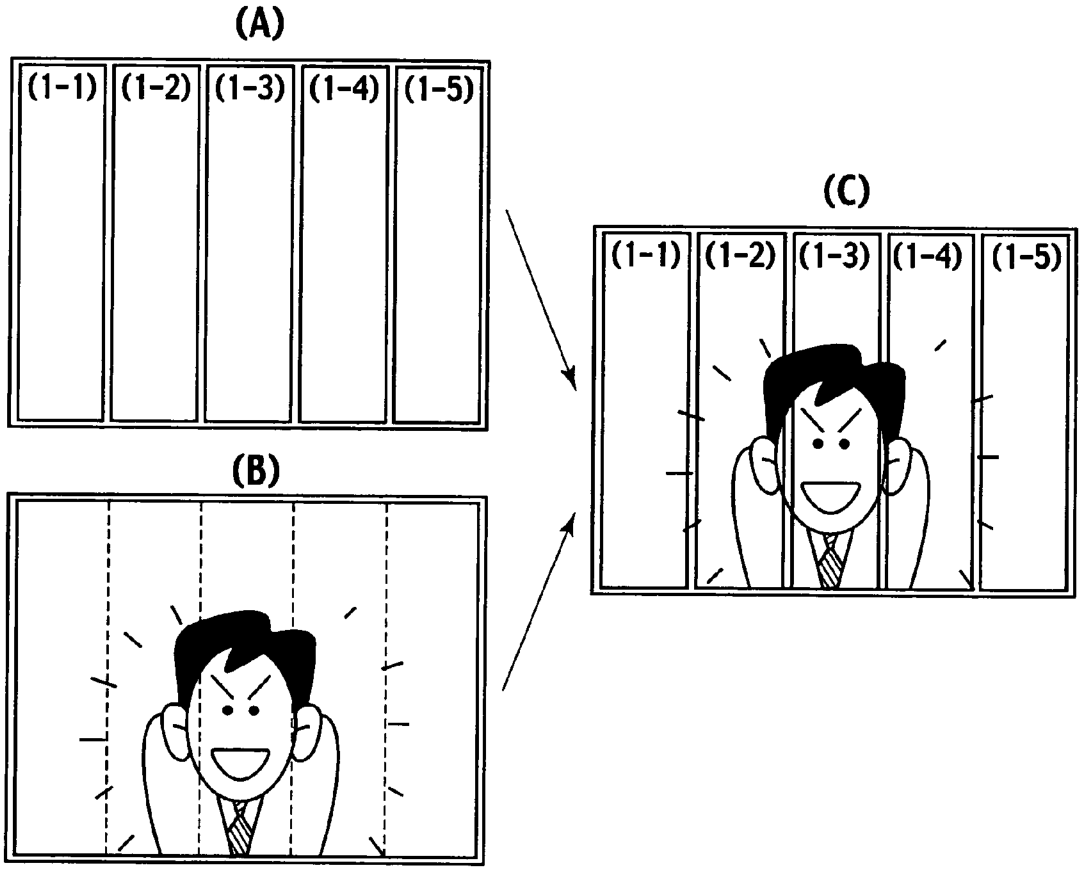
FIG. 44 is a view showing a menu screen in which an image of an operator is mixed with a menu image according to an embodiment of the present invention.

FIG. 44 is a view showing a television screen according to an embodiment of the present invention. A view (A) of FIG. 44 shows a menu screen (an operational image) provided by the graphics generator 16 (FIG. 2). The menu screen is divided into five zones 1-1 to 1-5. The user 3 carries out a predetermined motion with respect to the five zones. A view (B) of FIG. 44 shows a mirror image of the user 3 photographed with the video camera 2.

A view (C) of FIG. 44 is a mixture of the views (A) and (B) of FIG. 44 displayed on the display 23 and shows a positional relationship between the menu and the user 3. The second embodiment must have the display 23 and graphics generator 16 shown in FIG. 2.

Figure 45:
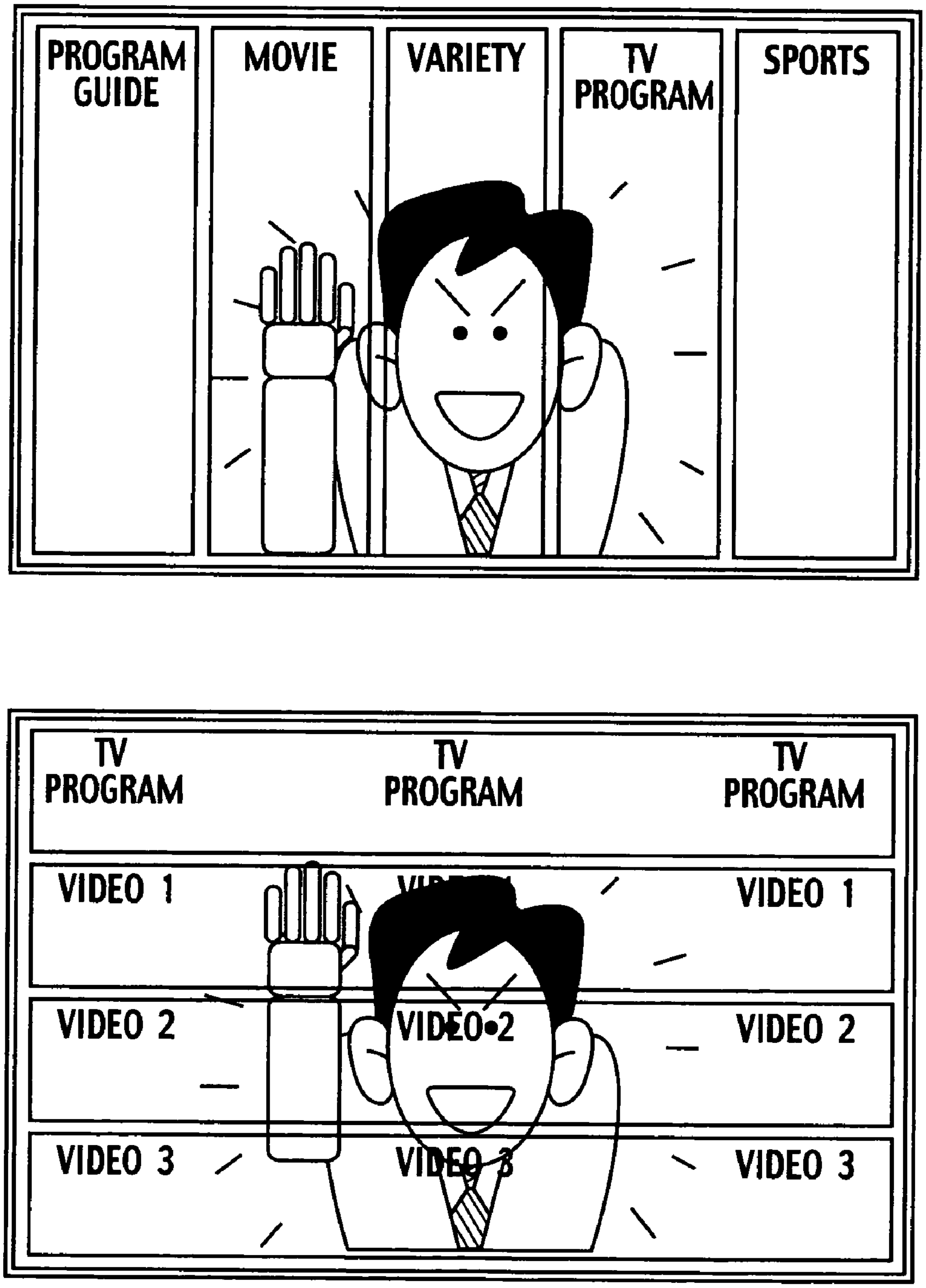
FIG. 45 is a view showing an operator carrying out a menu selecting motion according to an embodiment of the present invention.

FIG. 45 shows the user 3 who controls the television set 1 while seeing the menu and the mirror image of the user 3 displayed on the display 23. In a view (A) of FIG. 45, the user 3 vertically moves his or her hand to select a required one of items or control buttons in the menu. In the view (A) of FIG. 45, the user 3 selects a "MOVIE" button.

As explained in the first embodiment, the vertical hand motion causes a corresponding x-axis detector to provide a maximum value to set the flag Flg_x to 1. Accordingly, the graphics generator 16 may be related to the detectors assigned to the detection zones, to start a control operation corresponding to any menu button selected by the user 3.

In this way, the television set 1 according to any one of the embodiments of the present invention is controllable with a hand motion. A hand motion conducted within the photographing range of the video camera 2 can turn on/off the television set 1 or display a menu on the display 23. Vertical and horizontal hand motions are natural human motions and have meanings. For example, the vertical hand motion is a beckoning motion and the horizontal hand motion is a bye-bye motion. Employing these motions based on their meanings for controlling the television set 1 is easy to understand and easy to use.

A motion of the user 3 is detectable if the user 3 is within the photographing range of the video camera 2. The activation flag (Flg_x, Flg_y) is helpful to correctly recognize a hand motion. The present invention is applicable to selecting a menu item on a screen where a menu generated by the graphics generator 16 is displayed together with an image of the user 3 photographed with the video camera 2. The components and software of the embodiments mentioned above are usable in various ways.

Each of the above-mentioned embodiments of the present invention employs the television set 1 as an example of an electronic appliance. Application of the present invention is not limited to the television sets. The present invention is applicable to any electronic appliance by providing it with a video camera. The technique of the present invention of mixing a graphics menu with an image from the video camera 2 and allowing the user 3 to select an item in the menu is applicable to any electronic appliance having a display. The present invention provides a useful device capable of controlling an electronic appliance without a remote controller.

It should be understood that many modifications and adaptations of the invention will become apparent to those skilled in the art and it is intended to encompass such obvious modifications and changes in the scope of the claims appended hereto.

What is claimed is:

1. An electronic appliance comprising:

a display;

a video camera configured to photograph an operator who is in front of the display;

a detection unit having a plurality of detectors assigned to a plurality of detection zones, respectively, the detection zones being defined by dividing a screen of the display horizontally by N (an integer equal to or larger than 2) in a horizontal direction and vertically by M (an integer equal to or larger than 2) in a vertical direction, the plurality of detectors having a plurality of detectors assigned to each horizontal detection zone and a plurality of detectors assigned to each vertical detection zone, each of the detectors generating a first detection signal representative of a motion of an object being operated by the operator that is photographed with the video camera and is detected in the assigned detection zone;

a timing pulse generator configured to supply timing pulses to operate the detectors, wherein the timing pulse generator supplies a first horizontal pulse having a pulse width corresponding to an effective horizontal image period and a first vertical pulse having a pulse width corresponding to an effective vertical image period divided by M to each detector assigned to each vertical detection zone, and supplies a second horizontal pulse having a pulse width corresponding to an effective horizontal image period divided by N and a second vertical pulse having a pulse width corresponding to an effective vertical image period to each detector assigned to each horizontal detection zone;

a signal generator configured to generate a second detection signal according to the first detection signal, the second detection signal indicating an area on the detection zones covered by the object;

an accumulator configured to accumulate the second detection signals of each detector;

a flag generator configured to generate a flag when a cumulative value of one of the second detection signals accumulated for a predetermined period by the accumulator exceeds a predetermined threshold; and a controller configured to narrow the pulse width of the first horizontal pulse narrower than the pulse width corresponding to the effective horizontal image period for a predetermined period after the flag generator generates a flag to a detector assigned to a horizontal detection zone, and to narrow the pulse width of the second vertical pulse narrower than the pulse width corresponding to the effective vertical image period for a predetermined period after the flag generator generates a flag to a detector assigned to a vertical detection zone, the narrowed first horizontal pulse having a pulse width corresponding to a horizontal detection zone assigned to a flag-activated detector and adjacent detection zones in the vicinity of the horizontal detection zone assigned to the flag-activated detector, the narrowed second vertical pulse having a pulse width corresponding to a vertical detection zone assigned to a flag-activated detector and adjacent detection zones in the vicinity of the vertical detection zone assigned to the flag-activated detector.

2. The electronic appliance of claim 1, further comprising:

a mirror image converter configured to convert an image photographed with the video camera into a mirror image of the image;

an operational image generator configured to generate at least one operational image; and a mixer configured to mix a mirror image signal provided by the mirror image converter with an operational image signal provided by the operational image generator, with the mixed image provided by the mixer being displayed on the display, the detection unit generating the first detection signals representative of a motion of the displayed operator conducted with respect to the operational image.

3. The electronic appliance of claim 1, further comprising:

a generator configured to generate a vertical barycentric data by summing up the second detection signals of the detectors assigned to each vertical detection zone;

a digital filter configured to multiply the vertical barycentric data by tap coefficients representative of a first reference waveform corresponding to a first motion that is a vertical motion of an object photographed with the video camera; and a motion detector configured to determine, according to a signal waveform provided by the digital filter, whether or not the motion of the object is the first motion.

4. The electronic appliance of claim 1, further comprising:

a generator configured to generate a horizontal barycentric data by summing up the second detection signals of the detectors assigned to each horizontal detection zone;

a digital filter configured to multiply the horizontal barycentric data by tap coefficients representative of a second reference waveform corresponding to a second motion that is a horizontal motion of an object photographed with the video camera; and a motion detector configured to determine, according to a signal waveform provided by the digital filter, whether or not the motion of the object is the second motion.

5. An electronic appliance comprising:

a display;

a video camera configured to photograph an operator who is in front of the display;

a detection unit having a plurality of detectors assigned to a plurality of detection zones, respectively, the detection zones being defined by dividing a screen of the display horizontally by N (an integer equal to or larger than 2) in a horizontal direction and vertically by M (an integer equal to or larger than 2) in a vertical direction, the plurality of detectors having N×M detectors assigned to N×M detection zones, respectively, each of the detectors generating a first detection signal representative of a motion of an object being operated by the operator that is photographed with the video camera and is detected in the assigned detection zone;

a timing pulse generator configured to supply timing pulses to each detector to operate the detectors;

a signal generator configured to generate a second detection signal according to the first detection signal, the second detection signal indicating an area on the detection zones covered by the object;

an accumulator configured to accumulate a sum total of the second detection signals outputs from all detectors in each horizontal position and to accumulate a sum total of the second detection signals outputs from all detectors in each vertical position;

a flag generator configured to generate a flag when a cumulative value of one of the second detection signals accumulated for a predetermined period by the accumulator exceeds a predetermined threshold; and a controller configured to enable the second detection signals derived from specified ones of the detection zones and disable the second detection signals derived from the other detection zones, the specified ones of the detection zones being a horizontal detection zone assigned to a flag-activated detectors in a horizontal position and adjacent horizontal detection zones in the vicinity of the horizontal detection zone assigned to the flag-activated detectors or a vertical detection zone assigned to a flag-activated detectors in a vertical position and adjacent vertical detection zones in the vicinity of the vertical detection zone assigned to the flag-activated detectors.

* * * * *